(12) United States Patent
Herring

(10) Patent No.: US 6,826,123 B1
(45) Date of Patent: Nov. 30, 2004

(54) GLOBAL RECOVERY FOR TIME OF DAY SYNCHRONIZATION

(75) Inventor: Jay R. Herring, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 10/684,717

(22) Filed: Oct. 14, 2003

(51) Int. Cl.⁷ .............................. G04C 11/02; G06F 1/12
(52) U.S. Cl. ........................... 368/46; 368/47; 375/356; 709/248; 709/400; 713/400
(58) Field of Search ............................... 368/46, 47, 52, 368/55; 375/356; 709/248, 400; 713/400

(56) References Cited

U.S. PATENT DOCUMENTS

| | | | | |
|---|---|---|---|---|
| 4,633,421 A | * | 12/1986 | Watson et al. ................. 702/59 |
| 5,363,377 A | * | 11/1994 | Sharpe ......................... 370/314 |
| 5,845,198 A | * | 12/1998 | Bamburak et al. .......... 340/7.43 |
| 6,282,431 B1 | * | 8/2001 | Konno ......................... 455/425 |
| 6,449,220 B1 | * | 9/2002 | Egle et al. ..................... 368/46 |
| 6,525,995 B1 | * | 2/2003 | Diehl et al. ................... 368/47 |
| 6,545,950 B1 | * | 4/2003 | Walukas et al. ............... 368/47 |
| 6,618,815 B1 | * | 9/2003 | Atkins et al. ................ 713/400 |

\* cited by examiner

*Primary Examiner*—Vit W. Miska
(74) *Attorney, Agent, or Firm*—Lawrence D. Cutter

(57) ABSTRACT

A system and method is provided for synchronizing time of day information between and among communication adapters. Time of day information, which is desired for proper message packet ordering and delivery, is recovered in a process in which a master adapter, connected to a master node, periodically broadcasts current time of day information to slave adapters which operate to determine whether or not drift correction is to be applied.

1 Claim, 43 Drawing Sheets

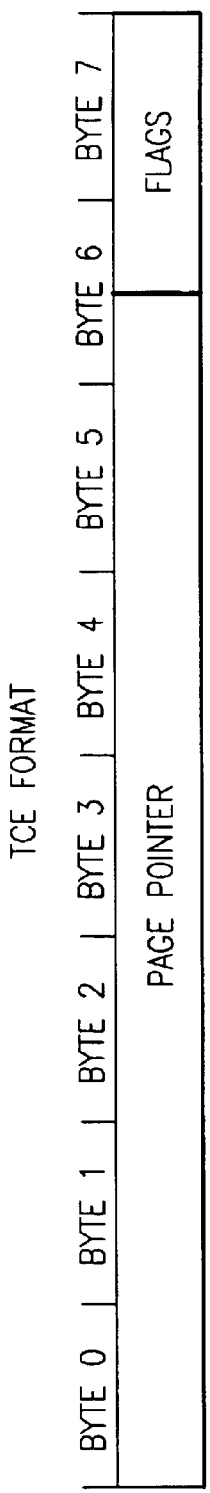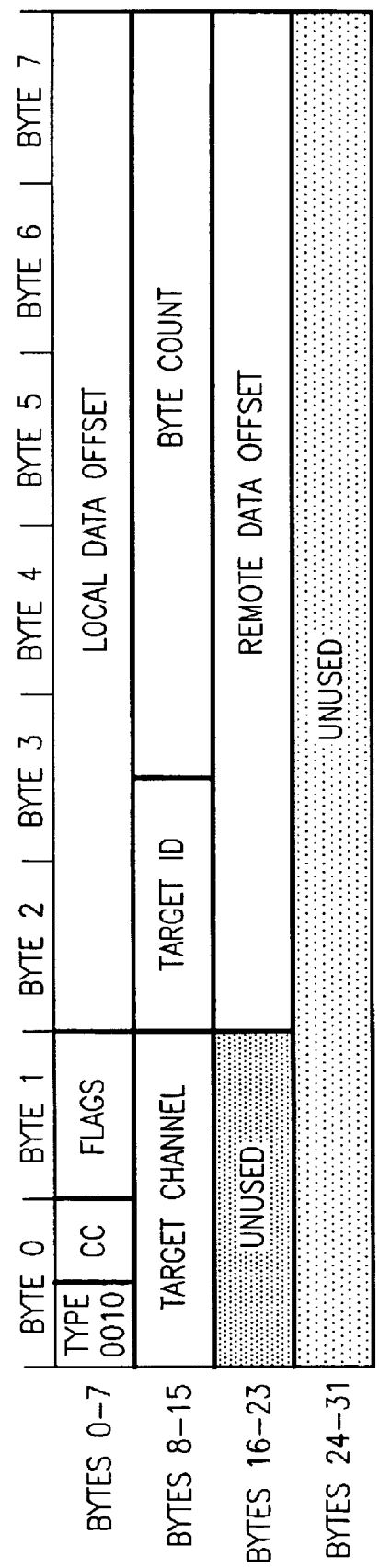

|  | BYTE 0 | BYTE 1 | BYTE 2 | BYTE 3 | BYTE 4 | BYTE 5 | BYTE 6 | BYTE 7 |
|---|---|---|---|---|---|---|---|---|
| BYTES 0-7 | TYPE 0101 / CC | FLAGS | SOURCE ID | | DATA OFFSET | | | |
| BYTES 8-15 | SOURCE CHANNEL | | | | BYTE COUNT | | | |

FIG.22

|  | BYTE 0 | BYTE 1 | BYTE 2 | BYTE 3 | BYTE 4 | BYTE 5 | BYTE 6 | BYTE 7 |
|---|---|---|---|---|---|---|---|---|
| BYTES 0-7 | TYPE 0110 / CC | FLAGS | TARGET ID | | DATA OFFSET | | | |
| BYTES 8-15 | TARGET CHANNEL | | | | BYTE COUNT | | | |

FIG.23

|        | BYTE 0 | BYTE 1 | BYTE 2 | BYTE 3 | BYTE 4 | BYTE 5 | BYTE 6 | BYTE 7 |
|--------|--------|--------|--------|--------|--------|--------|--------|--------|
| BYTES 0–7 | TYPE 0111 / CC | FLAGS | \<--- SOURCE CHANNEL ---\> | SOURCE ID | DATA OFFSET ||||
| BYTES 8–15 | SOURCE ID (cont.) ||| BYTE COUNT |||||

FIG.24

|        | BYTE 0 | BYTE 1 | BYTE 2 | BYTE 3 | BYTE 4 | BYTE 5 | BYTE 6 | BYTE 7 |
|--------|--------|--------|--------|--------|--------|--------|--------|--------|
| BYTES 0–7 | TYPE 1000 / UNUSED | UNUSED | | | DATA OFFSET ||||
| BYTES 8–15 | UNUSED ||| BYTE COUNT |||||

FIG.25

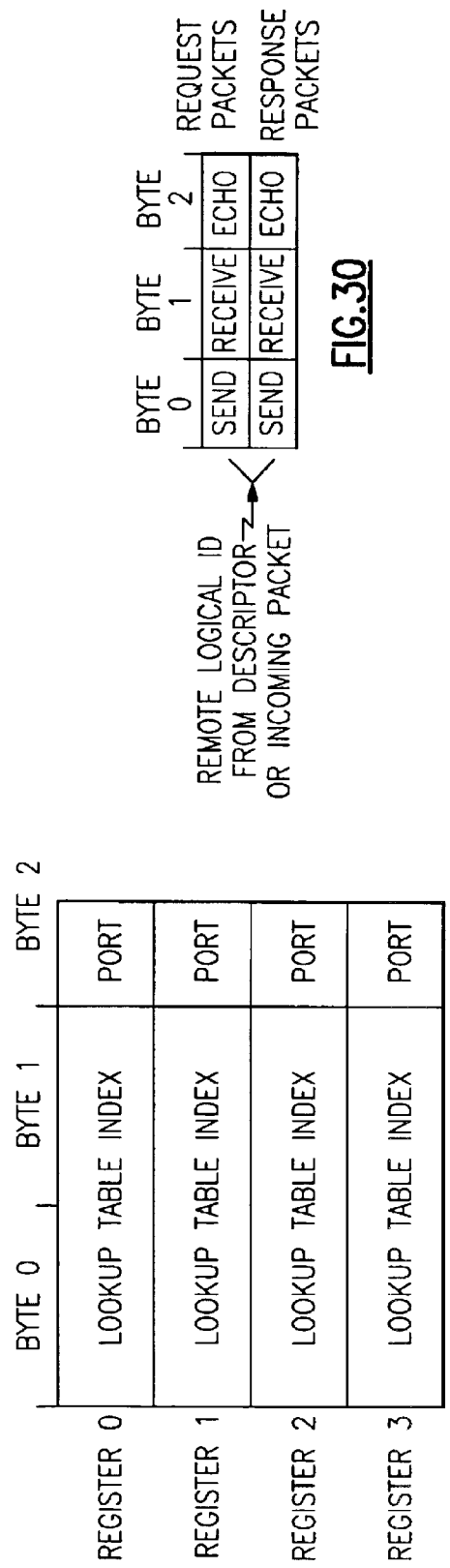

GLOBAL RECOVERY FOR TIME OF DAY SYNCHRONIZATION

BACKGROUND OF THE INVENTION

The present invention is generally directed to systems and methods for transferring messages from one autonomous data processing unit (node) to another such unit across a network. More particularly, the present invention is directed to systems and methods for message transfer in an efficient and reliable fashion without the need for the creation of extraneous message copies through a switched network in a manner that effectively handles bad paths and problems associated with message packet ordering and synchronization. Even more particularly, the present invention is directed to a communications adapter that is provided between an autonomous data processing unit and a switched network. Even more particularly, in accordance with another aspect of the present invention, a system and method are provided in which various hardware tasks associated with a specific channel are provided with a mechanism for communicating with one another in a direct memory to memory fashion. In yet another aspect of the present invention, the communication adapters are provided with mechanisms for time of day synchronization and with related mechanisms that establish backup and master/slave relationships amongst a plurality of adapters that permit designated backup adapter units to take over the communications operations of a failed adapter unit.

It is first of all desirable to place the present invention in its proper context and to indicate that it is not directed to the transfer of information within a single data processing unit. This can be likened to talking to someone in the same room. Instead the present invention is directed to the transfer of information in the form of messages or message packets through a switched network having a plurality of possible information flow paths. This can be likened to a lengthy conversation between individuals on different continents.

When information is transmitted through a switched network in the form of message packets there are many problems that can arise. First of all, it is possible that one of many message packets fails to arrive. Or, if it does arrive, an "acknowledgment of receipt" message may not make its way back to the sender, which points out the fact that this communication modality is such that a return signal acknowledging receipt is a very desirable part of the message passing protocol. Secondly, even if the message packet does arrive, it may not arrive in a desired sequence with respect to other related packets. Thirdly, there are typically many paths that a message packet may take through a switched network. The reliability of these paths is subject to change over time. Accordingly, systems for message packet transfer should take bad paths into account by identifying and tracking them as they arise.

One of the very desirable attributes of a message passing system is to have various hardware tasks associated with a specific channel to communicate with each other. However, one of the specific problems that can occur in message passing systems such as those employing communication adapters occurs when there are several tasks associated with a specific channel, and one of these tasks is copying a key control block from external memory into some local memory. In this circumstance, the other tasks need to be told to wait for this control block to get to the local memory.

One of the ways for solving this problem is via the creation of a semaphore for every potential action for every channel that is supported by the adapter. When a task wants to perform this action for a specific channel, it locks this semaphore, blocking all other tasks from performing this action to this channel. When the action has completed, the task can then leave a specific indicator (an "encode") in the semaphore, indicating to all other interested tasks that this particular action has completed. There are, however, several problems with this approach. For example, an adapter support thousands of channels or an adapter may have a large number of actions that it wants to perform on that channel (such as copying in a key control block into local memory). In this regard it is noted that locking and unlocking semaphores is usually a slow process because of the communication coordination and overhead required.

SUMMARY OF THE INVENTION

In accordance with one aspect of the present invention, there is provided a specialized hardware register, the "channel state register" (CH_STATE), which is a register that is associated with a specific channel and is only accessed by a task associated with that specific channel. Any value placed in the CH_STATE register is immediately seen only by the other hardware tasks associated with the same channel. Note that this hardware register is different from a "general purpose register" (GP register), because only those tasks that associated with a specific channel access the CH_STATE register for that channel. It is also different from a "task register" (TR register), which can only be accessed by the task associated with it. One of the key aspects of the present invention is that we are moving the communication between one task and another task into a specialized register, which is directly accessible by the associated tasks. This register is much "closer" to the processing unit than local or external memory, and hence much faster as a means of communication.)

In accordance with another aspect of the present invention communication parameters are first established which link message packet header information with desired memory locations at both ends of the communication path. The communications adapter of the present invention are provided with processing engines which are capable of accepting and acting on these parameters using commands received from the data processing nodes in a loosely coupled network.

In accordance with another aspect of the present invention the communication adapter is provided with specific hardware for processing script commands for the rapid formatting of message packet header information.

In accordance with another aspect of the present invention the communication adapter is provided with command processing capabilities which render it possible to transmit, in a single packet, in direct memory to memory fashion, information contained within disjoint (non-contiguous) regions of source memory. This is done through the use of a preload operation.

In accordance with another aspect of the present invention the communication adapter is provided with the ability to accept commands in which the desired message packet is broadcast, not to a single adapter connected to a receiving node, but to which is instead broadcast to all of the nodes in the network. Special codes used in the transfer operation are used to indicate that all of the adapters are intended as recipients of the message packet. Additionally, the presence of user keys also renders the system capable of operation in a multicast fashion as well as the originally intended broadcast mode.

In accordance with another aspect of the present invention the communication adapter the commands, data, message packets, parameters and instructions received by the adapter are processed by the adapter using a programmable instruction processor capable of recognizing commands and data for transfer of information within the message packets directly to memory locations within a targeted node.

In accordance with another aspect of the present invention the communication adapters are provided with mechanisms for the receipt of time of day information. It is this information which is important for comparing time stamp information to determine packet age. The adapters periodically receive time of day information from a master node/master adapter and determine if any broadcasts have been missed. If too many are missed, drift corrections are requested. In this way adapter synchronization is significantly improved.

In accordance with another aspect of the present invention the communication adapters are provided with internal data storage indications reflecting the status of the individual adapter as being either a master or slave adapter. In addition these indications also reflect the status of the individual adapters as being backup adapters which are capable of taking over the processing of message packet transfer.

In accordance with another aspect of the present invention the communication adapters are provided with internal memory which can be interrogated for the purpose of extracting relatively detailed indications of problems and errors that occur in packet transmission. In this way specific problems can be identified and solved, so as to increase reliability, availability and serviceability of the adapter unit.

Accordingly, it is an object of the present invention to provide a mechanism for the direct transfer of information from memory locations in one node to memory locations in another node.

It is also an object of the present to provide a communications adapter which is capable of taking over adapter operations of failed units.

It is also an object of the present to provide a communications adapter which is capable of time of day synchronization operations and which is better able to correct for temporal drift.

It is also an object of the present to provide a communications adapter which is capable of receiving and processing a wide range of commands and/or instructions (these terms being used synonymously) to effectuate a plurality of different message packet transfer modalities.

It is also an object of the present to provide a communications adapter which is capable of recognizing a wide range of error conditions and providing an interrogatable internal storage area which specifically delineates a large number of error conditions, thus reducing to a minimum the number of fatal errors or errors that result in a connection failure.

Lastly, but not limited hereto, it is an object of the present invention to improve the speed, efficiency and reliability of message packet transfer in a data processing network.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawing in which:

FIG. 18 is a map illustrating the layout, content and size of Transaction Control Element (TCE) parameters used herein;

FIG. 19 is a map illustrating the layout, content and size of parameters used in remote write operations;

FIG. 22 is a map illustrating the layout, content and size of parameters used in target of push operations;

FIG. 23 is a map illustrating the layout, content and size of parameters used in source of pull operations;

FIG. 24 is a map illustrating the layout, content and size of parameters used in target of pull operations;

FIG. 25 is a map illustrating the layout, content and size of parameters used in preloading operations;

FIG. 28 is a map illustrating the layout, content and size of parameters in the route table entry;

FIG. 29 is a map illustrating the layout, content and size of parameters in the broadcast registers;

FIG. 30 is a map illustrating the layout, content and size of parameters in the sequence table entry;

DETAILED DESCRIPTION OF THE INVENTION

Figure 1:
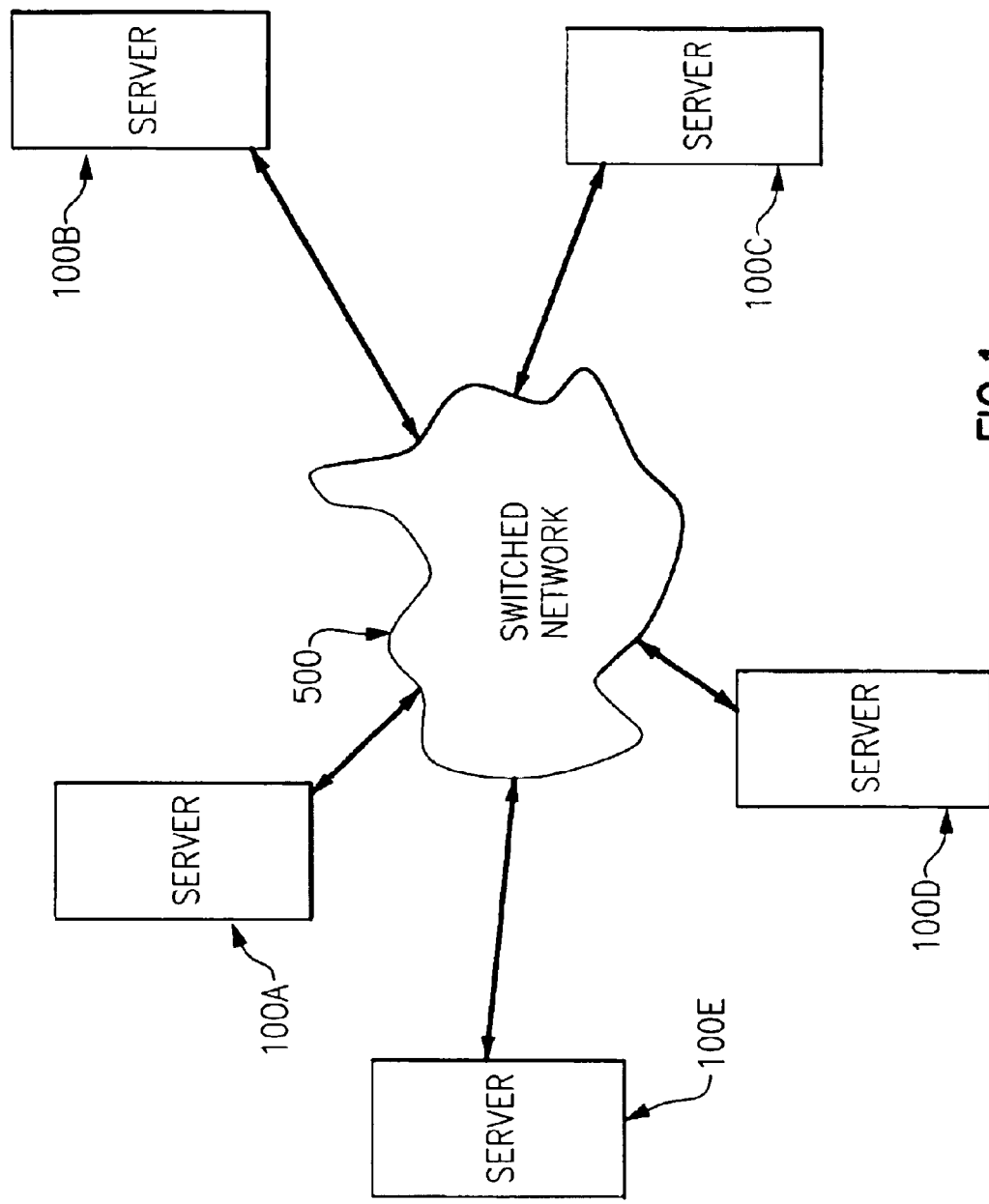
FIG. 1 is a block diagram illustrating the general environment in which various aspects of the inventions herein are employed.

The message passing function of the present invention provides a low latency, high bandwidth, reliable, scalable server interconnections for a cluster environment using message passing type software protocols. Message passing is used to exchange simple control information between tasks operating in different servers or to efficiently transfer large amounts of data used by parallel processing jobs. Each server includes one or more independent communication adapters for performing message passing. Each adapter allows blocks of memory to be moved between different servers under software control. Software defines the type of communication desired by creating a table in memory of hardware commands, called a descriptor list, and then tells the hardware to do the actual data movement while the software is working on other activity. Each adapter provides a number logical channels each of which has its own descriptor list operating independently from other channels. The hardware multiplexes activity among all active channels giving the perspective that it is simultaneously shared by many independent tasks.

The architecture of the present invention contemplates systems with hundreds of server nodes, each with a plurality of communication adapters connected to one or more switched networks. Each of the adapters includes hundreds or thousands of separate channels. In the context of the present description, the term "channel" includes "subchannels" as they occur in some large server systems such as in adapters used in the zSeries of data processing products (as manufactured and sold by the assignee of the present invention), and the term also includes a "window" in a pSeries data processing product (also manufactured and sold by the assignee of the present invention) which also includes communication adapters; additionally, the term "channel" also includes connections for an adapter that works with TCP/IP, or it could be a "Q-pair" for Infiniband adapters, and it also includes, more generically, any logical entity that represents a communication path that is independent from other similar communication paths defined between or associated with similar entities.

Because of the desire for increased performance, the adapter of the present invention physically interfaces to the server as close to the server's memory component as possible but does not have access to either the processor address translation logic or any I/O (Input/Output) bus address translation logic. The architecture of the adapter portion, therefore, includes an address translation component capable of converting effective memory addresses within a channel address space into real memory address values. This translation is used whenever the hardware needs to access descriptor lists or data areas in memory.

The Message Passing hardware of the present invention provides both send-receive and remote read/write type transfer models.

The send-receive model uses software on the sending side to describe a local memory region where hardware obtains source data. Software on the receiving side describes a memory region local to it where hardware places the data obtained from the source side. Neither side knows anything about the other side's memory other than how many bytes are to be copied. Either side can initiate the actual transfer after the two sides have defined their respective memory buffers. A push operation is initiated by the side providing the data. A pull operation is initiated by the side receiving the data.

Figure 4:
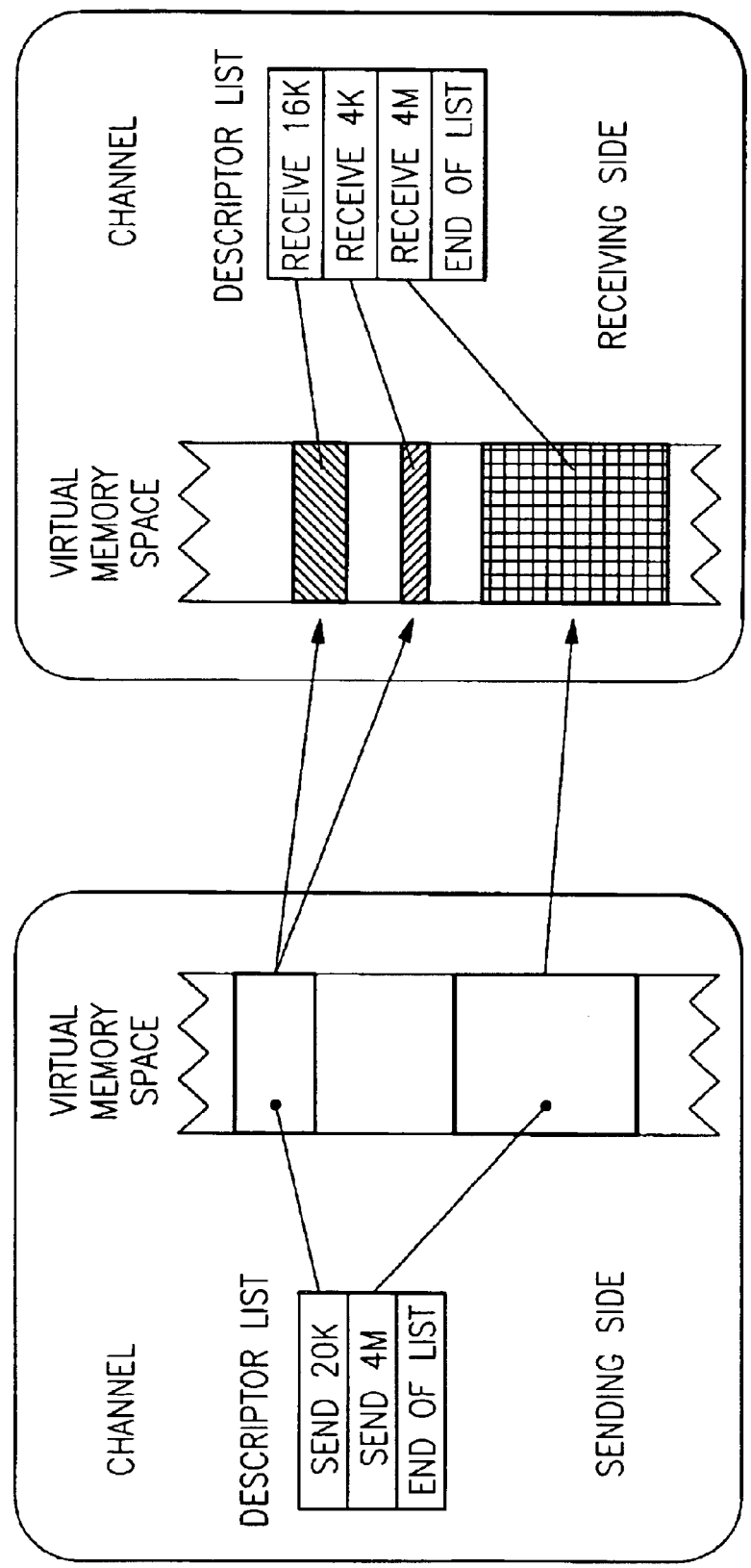
FIG. 4 is a block diagram illustrating the role of descriptor lists on the sending and receiving sides of a message packet transfer.
Figure 5:
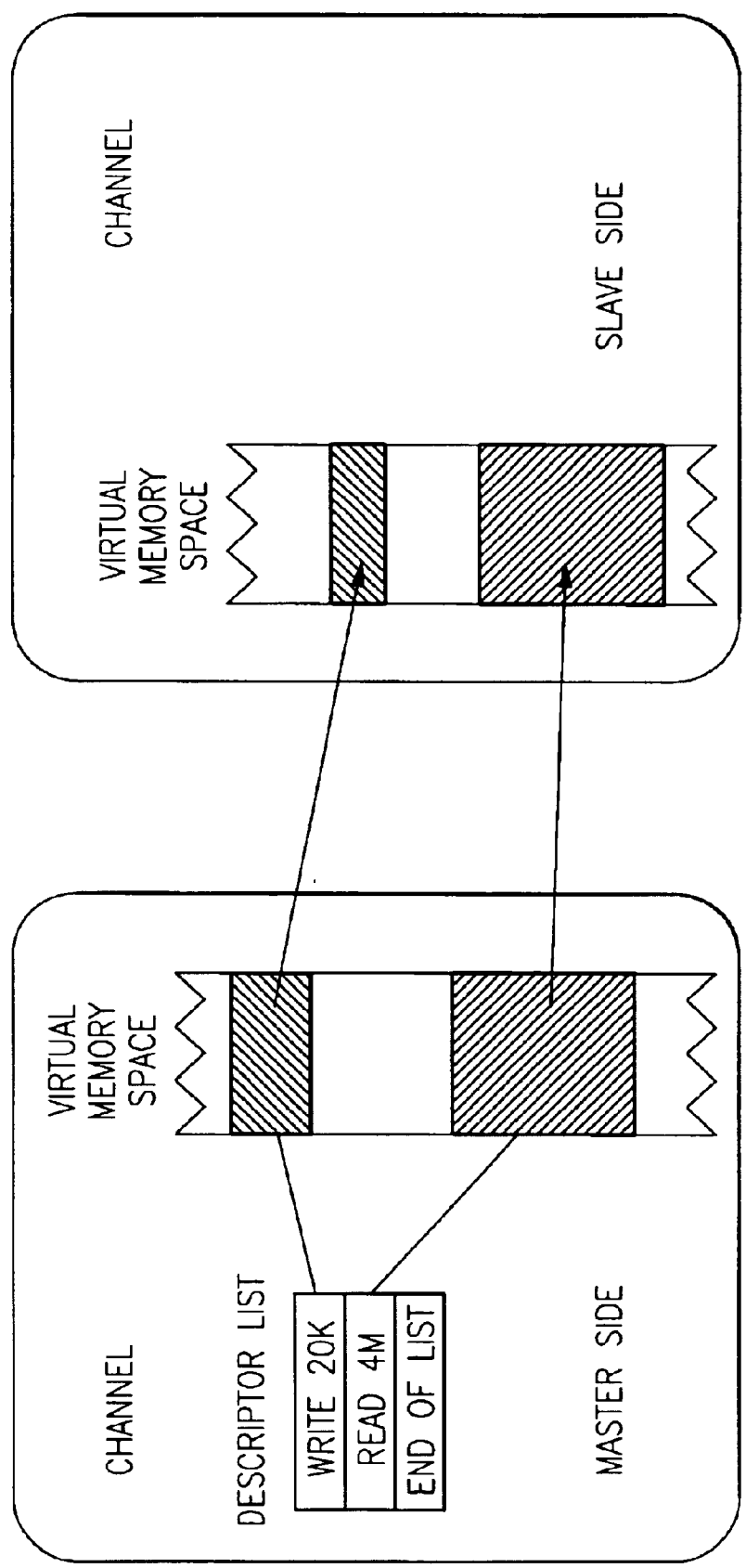
FIG. 5 is a block diagram similar to FIG. 4 but more particularly illustrating remote read-write operations.
Figure 6:
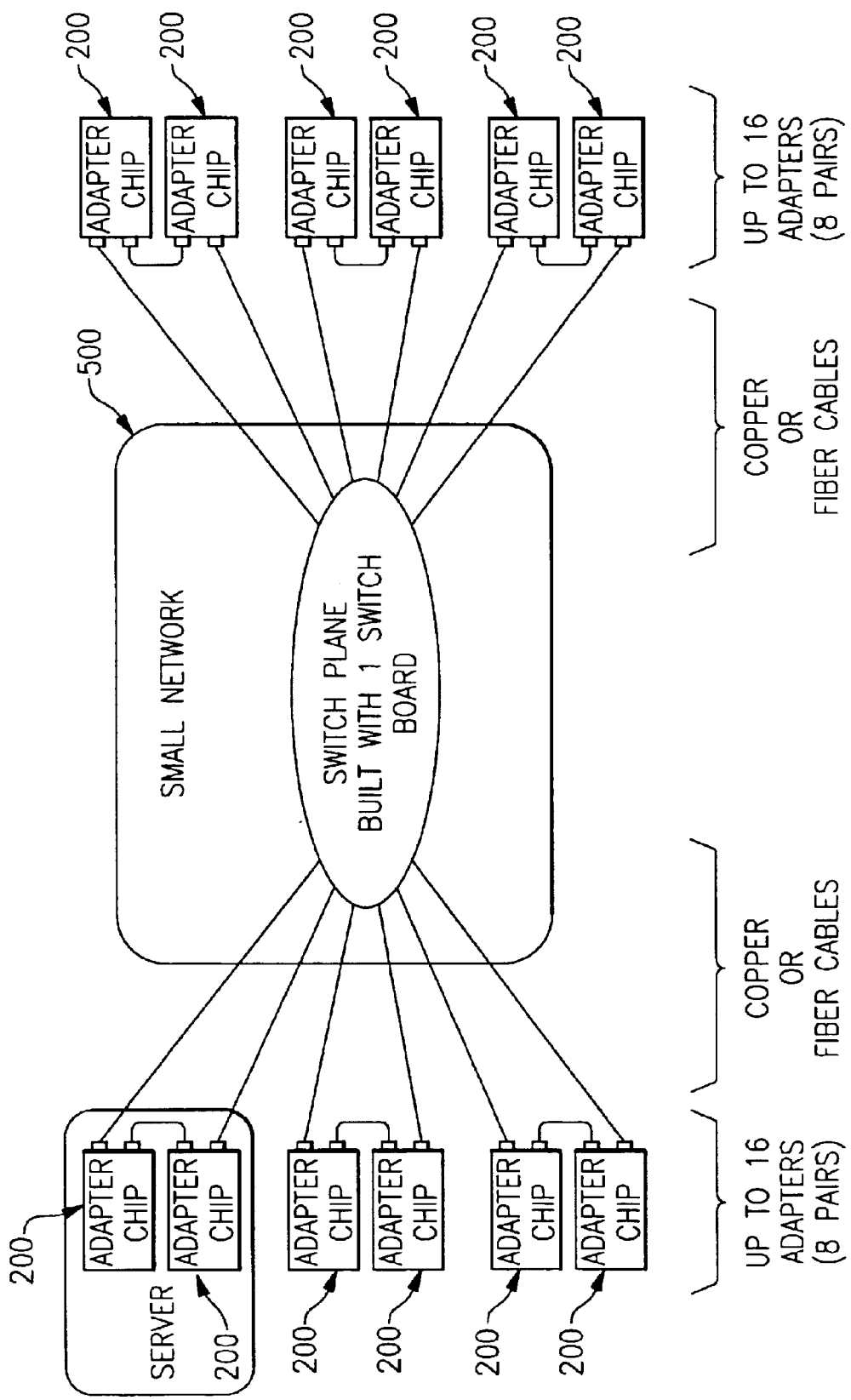
FIG. 6 is a block diagram illustrating the use of communication adapters in smaller network configurations.
Figure 7:
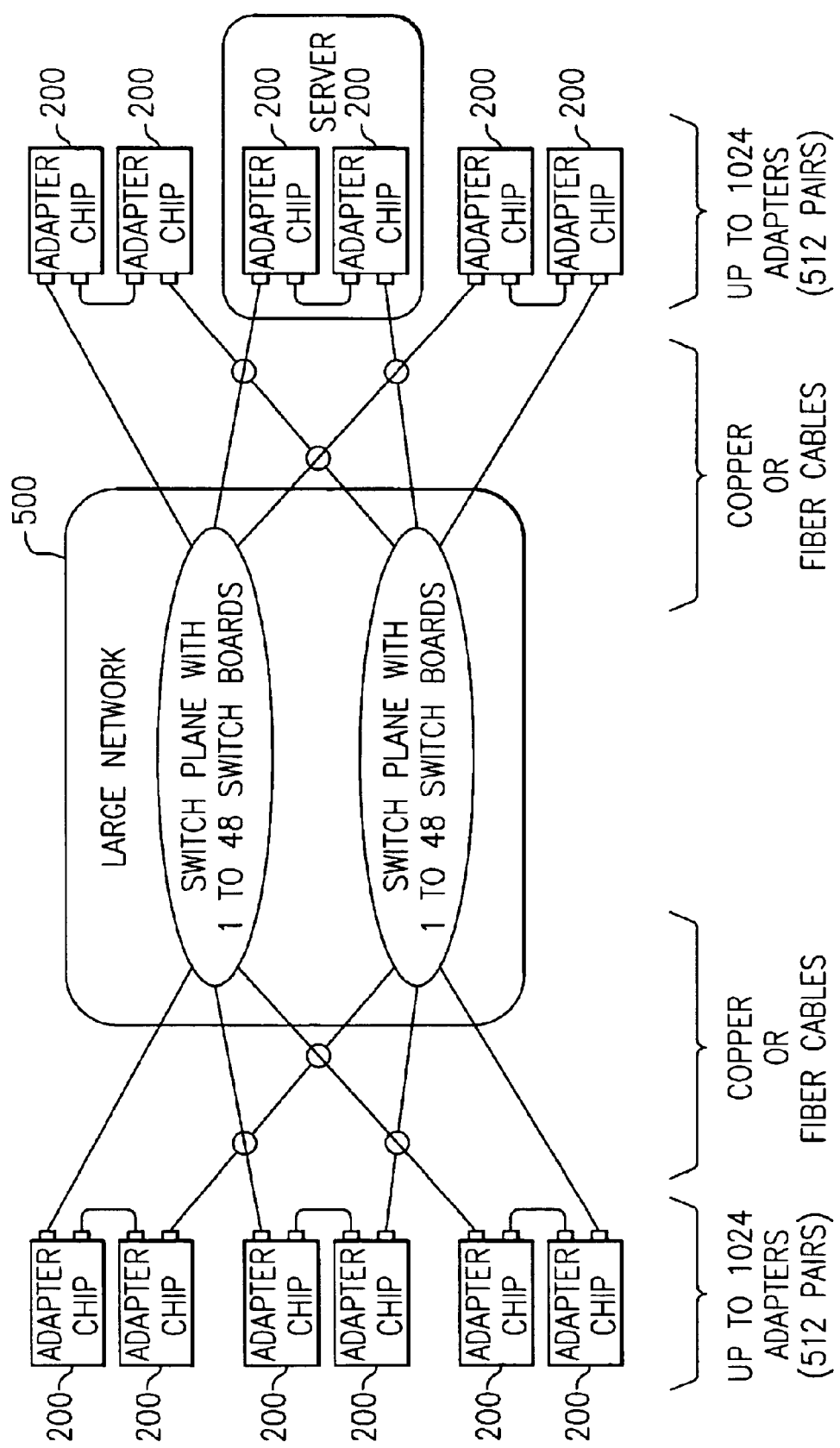
FIG. 7 is a block diagram illustrating the use of communication adapters in larger network configurations.
Figure 8:
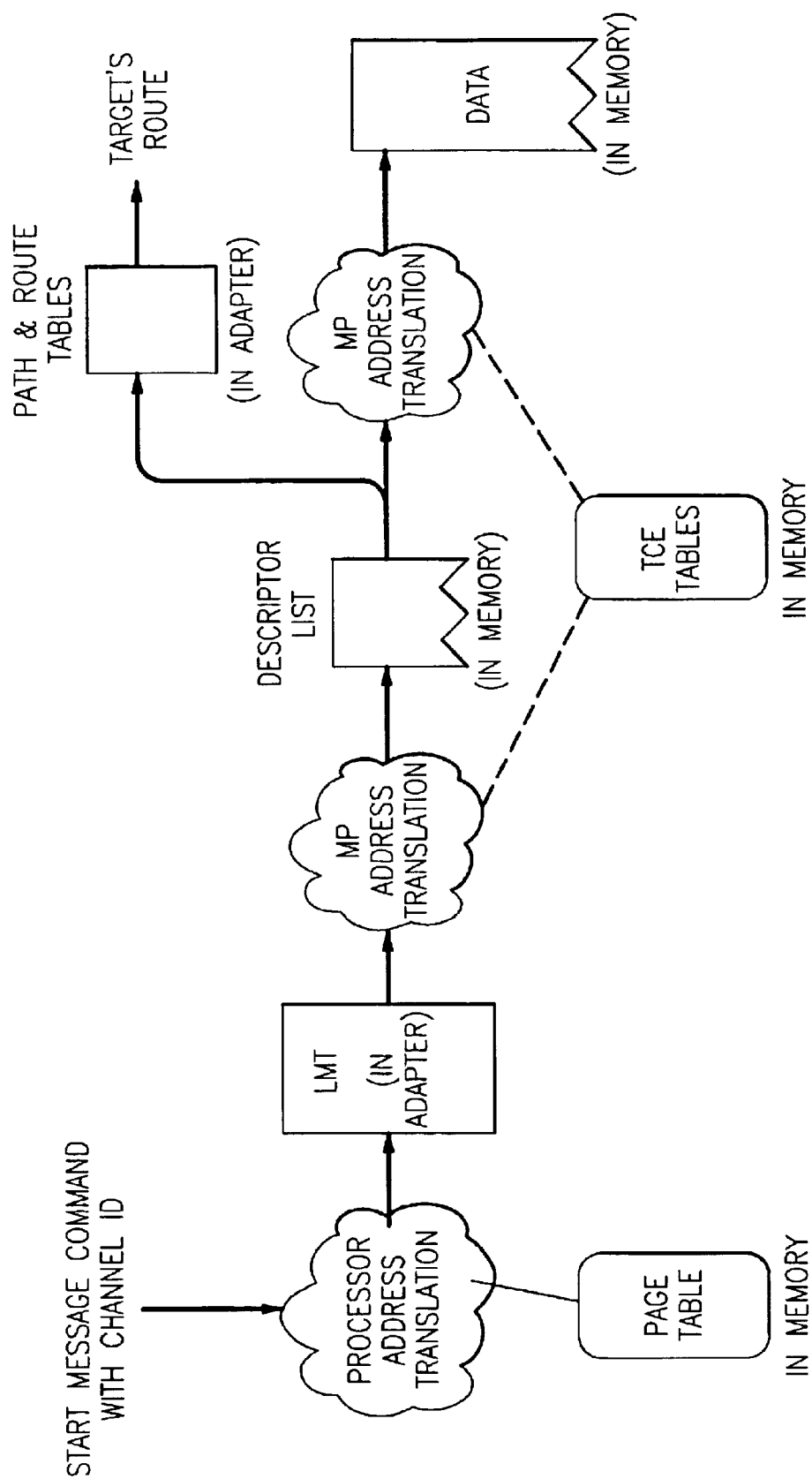
FIG. 8 is a block diagram illustrating the structure of the desired program interface that is employed to effectuate message passing protocols.

In the send-receive model employed herein each side involved in the transfer has a channel and at least one descriptor defined. The transmission can be viewed as sending a serial stream of bytes from memory on one server to memory on another server. Sending side software defines in a descriptor list where in memory the data is obtained. It may be entirely within a single consecutive block of virtual memory locations or it may be scattered in arbitrary sized pieces throughout many locations. Likewise, receiving side software establishes a descriptor list which identifies where in its local memory the data is placed. Likewise, the location may be a single memory block or the data may be scattered throughout the target server. There are no restrictions on memory addresses or transfer sizes. In the most recent embodiment of the present invention there is a current upper limit of 64 terabytes per individual descriptor. There are also cases where the sending and receiving sides have not fully communicated with each other about the exact number of bytes to be transferred. The architecture of the present invention supports a block marking function to handle these cases. The sending side marks the last byte of its transmission, thus signaling to the receiving side that it should start processing the data even though there may be space at the receiving end for more data. Similarly, the receive side may indicate that it can't handle all of the data being sent. In this situation, the receiving side discards any excess data and tells the sending side about the situation. See FIG. 4.

The channel providing data includes one or more source of push or source of pull type descriptors identifying the data to be sent depending of whether the transfer occurs as a push or pull. The channel receiving the data includes one or more target of push or target of pull type descriptors identifying where to place the data. The details associated with these descriptors are provided elsewhere herein below. Either side can request a processor interrupt following the transfer or after key parts of the transfer are complete.

The send side and receive side channels associated with push operations do not need to be tied to a single connection. They can simultaneously be used for transfers to or from multiple servers. Each element on the send side descriptor list identifies the target for that descriptor element. The list collectively transmits data to any target authorized by the operating system. The receive side channel can, with restrictions as discussed below, also be used as the target from multiple senders. The restrictions recognize that packets can be seen at the receiver intermixed from different sources.

The remote read/write model defines a master side and a slave side rather than a send and a receive side. The master has more authority and responsibility than the slave or either side in the send-receive model. The slave defines a region of memory that can be accessed externally, but is not involved in the actual transfer. Software in the master then directly accesses random locations within this region without further assistance of software on the slave side. In the remote read/write model, each side defines a channel supporting the operation. The master side builds a descriptor list identifying both the local and remote memory regions involved in the transfer plus an identification of the slave adapter and channel. That list includes one or more remote read or remote write type descriptors as further described below. The channel on the slave side does not use descriptors during remote read/write operations. In remote read/write operations, the channels used in both the master side and slave side are dedicated to the operation. Unlike push operations, the channels are not simultaneously involved with multiple independent transfers.

Figure 2:
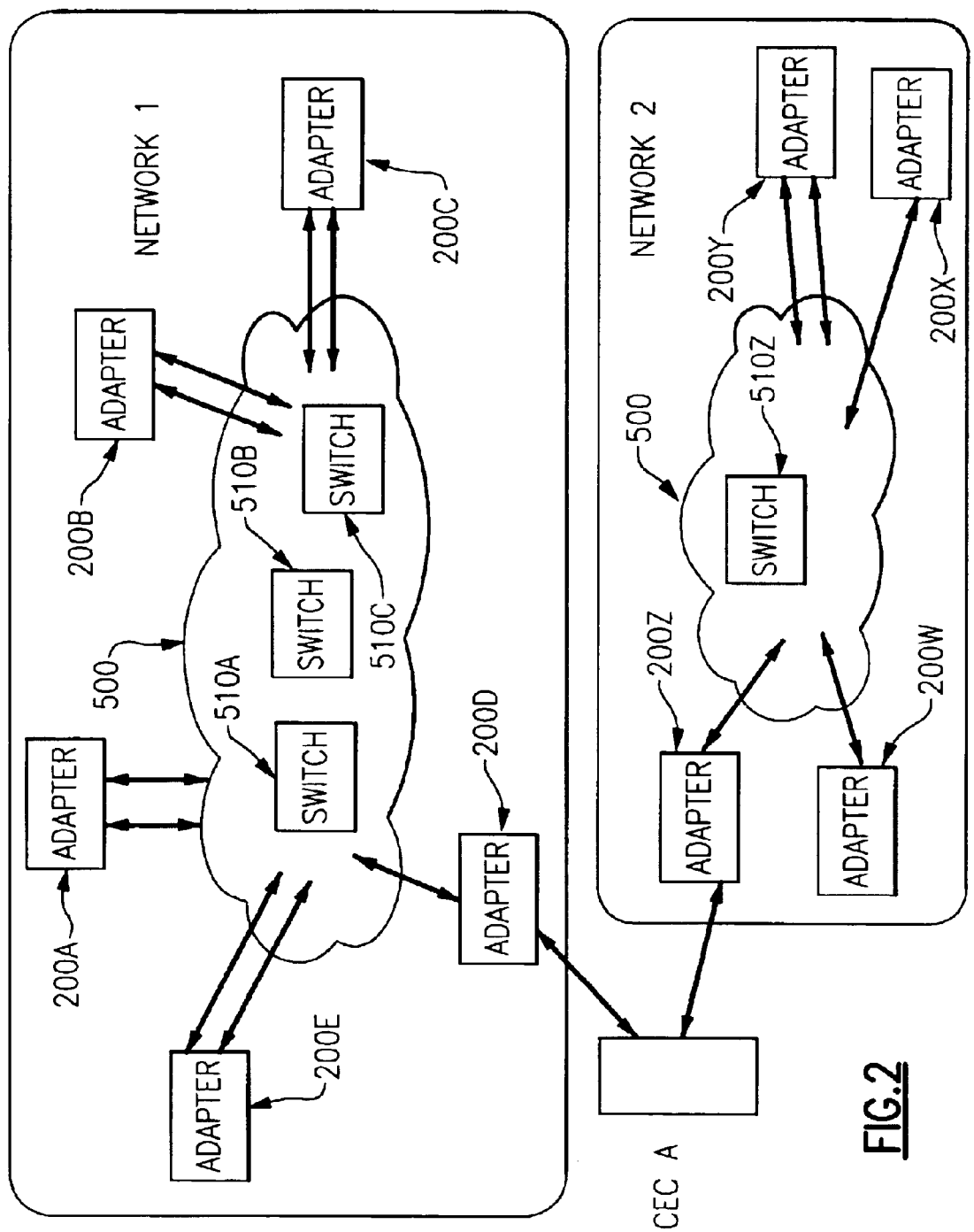
FIG. 2 is a block diagram illustrating the fact that the inventions described herein may be employed in a data processing server which is connected to a plurality of separate networks.
Figure 3:
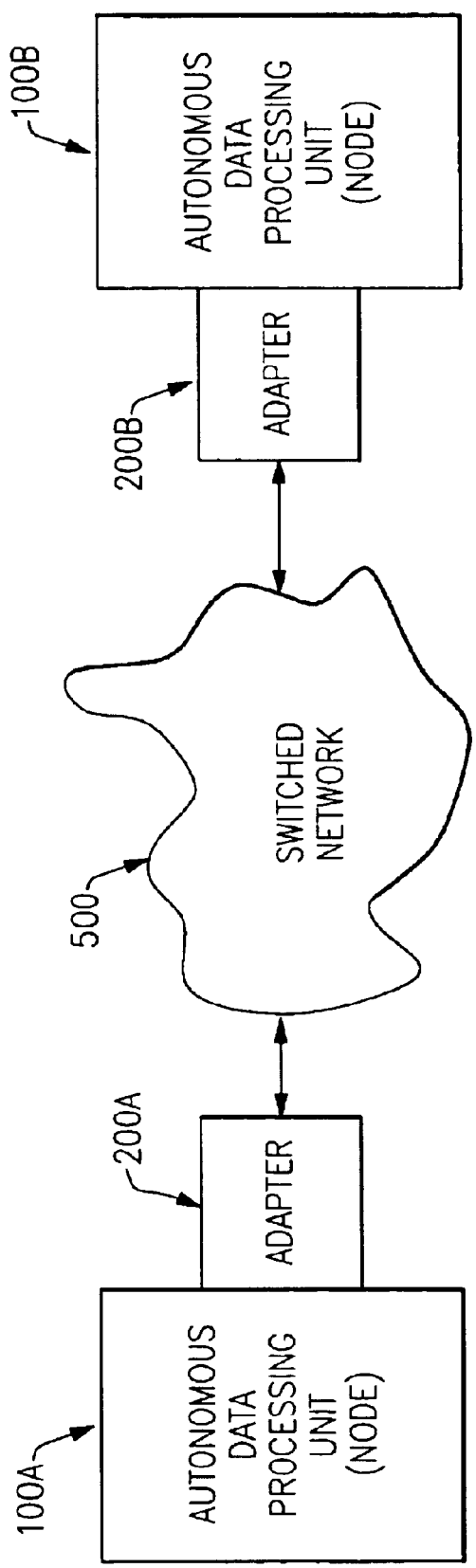
FIG. 3 is a block diagram illustrating the position and role of communication adapters in the transfer of messages between and amongst data processing nodes.

A network "fabric" as that term is employed herein typically includes anywhere from a few servers to thousands of servers. The fabric includes adapters within each server, copper cables connecting the adapters to switches, and board wiring, copper cables or fiber cables connecting switches together. The details of how the individual components are connected is not relevant to either the practice or understanding of the present invention nor to the software perspective of a message passing system, but it is nonetheless useful to have an appreciation of the basic structure and the range of its complexity. Smaller systems are configured such that every adapter communicates with every other adapter using a single fully interconnected network. Larger systems, where the cost of full interconnection becomes very high, are constructed using several independent networks. The illustration shown in FIG. 2 depicts a system with two independent networks. Server A (also referred to as CEC A, or Central Electronic Complex A) includes two message passing adapters (200D and 200Z) each connected to different independent networks. In systems contemplated for used with the present invention, each network includes up to 4,095 adapters with up to 64K adapters in the system. Each adapter may have multiple connections to the network to improve RAS (Reliability, Availability and Serviceability). Each adapter may be part of only one network. It may communicate to any adapter on that network but not to any adapter in another network. A server may include adapters associated with multiple networks. Every adapter on a single network is assigned a logical ID value from 0 to 4,094 (The exact number is not critical for the practice of the present invention in its most general embodiment). Every adapter in the system is assigned a unique physical ID value from 0 to 65,535. Software uses the logical ID values to identify two adapters on the same network involved in a data transfer. Hardware uses the physical ID value to verify that messages are delivered to the intended destination in spite of hardware failures or miswired cables.

In one preferred embodiment of the present invention, each server includes one or more adapter pairs. The adapter pair share two external links and are connected together with a link contained within the server. See FIGS. 6, 7, 13, 34 and 35. Both adapters are connected to the same network. Each network includes up to 1,024 adapters or 512 adapter pairs. Multiple networks allow use of more than 1,024 adapters. Small networks with 16 or fewer adapters are built with one plane and a single switch board. Larger networks are built with two independent switch planes, each using from 1 to 48 switch boards. Adapter pairs use the internal link to connect the two planes together extending the interconnection to 1,024 endpoints. A software convention is used where the physical ID value associated with an adapter is constructed by concatenating a four bit number identifying the network used by the adapter with the adapter's twelve bit logical ID value.

Programming Interface

This section describes the message passing hardware from a programing perspective. It describes the overall structure, functions provided along with detailed descriptions of the individual commands and various tables required to use the function.

All message passing operations reference a local channel within the local server and a remote channel usually within some other server. The remote channel may also be in another adapter within the same server or within another channel within the same adapter. A channel can be thought of as a hardware conduit to other servers that has been allocated to a specific software task. Before software uses the message passing function it obtains a channel from the operating system. This allows the operating system to establish various tables granting the user authority to access the hardware and limiting the hardware's ability to reference memory, remote servers, and remote channels when processing that channel. Once a channel is created, user level software can use the channel for internode communications without necessarily needing further operating system involvement. A user's perspective of a channel is that it establishes a memory region that both it and the message passing hardware can access. That region contains data buffers that can be exchanged with tasks running in other servers and a list of descriptors where the user defines exactly what type of operation is required. When the operating system allocates a channel it performs the following tasks:

1. Chooses an available channel among those supported by the hardware. The number of channels provided is implementation dependent. That channel has associated with it a channel number, an MMIO (Memory Mapped I/O) address range within the node's real address space, a server number within the system, and an adapter number within that server;
2. Determines the logical ID value associated with the selected adapter. This value is used in descriptors to identify a remote message passing adapter;
3. Gives user level software access to the selected channel by creating a page table entry that is used by the node's address translation mechanism. Each channel is associated with a fixed 4K page within the node's real address space. User level software controls its message passing activity for the channel by issuing MMIO type store commands to selected addresses within a 128 byte block of this page. The effective address of this block is defined by the operating system and referred to as a channel ID. The channel ID is viewed as an abstraction of the adapter identification and channel number. The operating system may choose any page within the user's address space. The translated real address value is, however, consistent with the format expected by the hardware. A successful address translation during a MMIO store operation means that the user is allowed to access the channel. The real address value resulting from the translation specifies:
   that the operation is associated with a user message passing command;
   identifies the adapter within the local server that processes the command;
   identifies the channel number within that adapter; and
   identifies the type of action desired;
4. Registers the user's memory region that's to be associated with this channel. This region holds data buffers exchanged with other servers and descriptors controlling the transfers. This step involves pinning the pages within the region and setting up the message passing address translation table that the hardware uses to convert user supplied buffer offset values placed in descriptors into real address values; and
5. Initializes the channel's Local mapping table (LMT) entry in the selected adapter. This LMT entry holds the privileged information established by the operating system for that channel plus the status of any message passing activity as determined by the hardware. The operating system identifies in the LMT the memory region associated with the channel along with pointers to the translation table and the start of the descriptor list. It also tells the hardware what kind of operations are allowed, sets user keys limiting the scope of message passing transfers, and defines the type of processor interrupts available to the channel. The LMT is discussed in more detail elsewhere herein.
5. Presents to user software:
   1. the channel ID value that is used with all user message passing commands;
   2. the local logical ID value that identifies the adapter within the local descriptors; and
   3. the user's effective address for the descriptor list.

TABLE 1

| | |
|---|---|
| channel number | Identifies the LMT array entry in the selected adapter that contains information about this channel. The value is given to user software when a channel is created. |
| user command space | The real address range associated with user level commands. Fields within the address value identify the channel and type of hardware action desired. This value is not directly given to user software. User software is instead given a virtual address that the hardware translates into this range. |
| server number | Identifies the server within the entire system that includes the Message Passing adapter associated with this channel. This value is not directly given to user software. It is used, along with the adapter number to generate a 'physical ID' value associated with the local adapter. |
| adapter number | Identifies the adapter within the selected server that controls this channel. This value is not directly given to user software. It is used to construct a page table entry associated with user commands. It is also used to construct logical and physical ID values associated with the local adapter. |

An application may use several channels. Each channel has a unique channel id value and channel number. An application uses the channel id value to reference it's own channel and uses a channel number, plus logical ID value, to refer to channel's in other servers.

In message passing transfers software defines a list of one or more descriptors in memory that tell the hardware what to do. It defines the type of transfer, direction of transfer, memory address of a local memory buffer, and size of the buffer. If this software is initiating the transfer it also supplies a remote channel/logical ID combination identifying the target of the transfer. The physical path that the transfer takes from the local hardware through the network to the target is identified by a path table and route table established by the service processor when the hardware is initialized. The logical ID value which software places in the descriptor identifies up to four entries in this route table that define alternate paths to the target plus an entry in the path table that indicates which one of these possible routes should actually be used.

Protection Mechanisms

The present invention provides protection by guarding against misbehaving or malicious software. It provides four levels of authority in order of "most trusted" to "no trust at all":
1. service processor;
2. hypervisor;
3. privileged operating system, kernel, or kernel extensions; and
4. problem state user code Service processor software has total control over the hardware. There is no mechanism for protecting against its behavior.

The operating system, running in privileged mode, controls the protection provided to problem state user code. The server may or may not include hypervisor support. In the absence of a hypervisor, the operating system has the same authority as the hypervisor would have had. With a hypervisor, which is required if the server is using logical partitions, the operating system requests Local mapping table or translation table updates from the hypervisor. This enables the hypervisor to isolate the behavior of one operating system from another within the same physical server.

User code, running in problem state, can only access memory within the local server or communicate with software running in other servers that the hypervisor and operating system have enabled.

The first level of protection is provided by the server's address translation mechanism used to convert the effective address associated with a message passing user command into the real address used by the message passing hardware. This mechanism insures that user commands can only access channels allocated to that code by the local operating system. It also insures that only authorized code can issue privileged commands to the hardware.

Once user code is given access to a channel, the message passing address translation logic insures that the user can only tell the message passing hardware to access local memory regions allocated to it for this purpose by the local operating system. Software in one server has no knowledge of or direct access to memory in another server except through channels maintained by software in the two servers. Software on each side defines the portion of its memory that can be accessed externally and defines the type of access, read or write, push or pull allowed.

There is also provided a user key protection mechanism that enables software to identify all of the channels used by a specific application letting these channels exchange information, but preventing them from communicating with other channels or letting other channels interfere with them. This mechanism uses a user key field in each channel's Local mapping table entry established by operating system or hypervisor software. Every packet includes the sending channel's user key value. A receiving adapter discards a packet if the packet's user key doesn't match the receiving channel's user key. Software can deactivate the mechanism by using a universal key value of all one's. Protection violations due to mismatched user key values are not considered severe failures. The data transfer is, of course, canceled without impacting the receive side channel and the send side descriptor is marked with the nonfatal channel unavailable condition, but the send side can continue other operations or retry the failed operation at a later time. This allows individual tasks within a larger job to start or stop at different times without requiring special interlocking procedures before attempting communications or shutting down.

Address Translation

Figure 9:
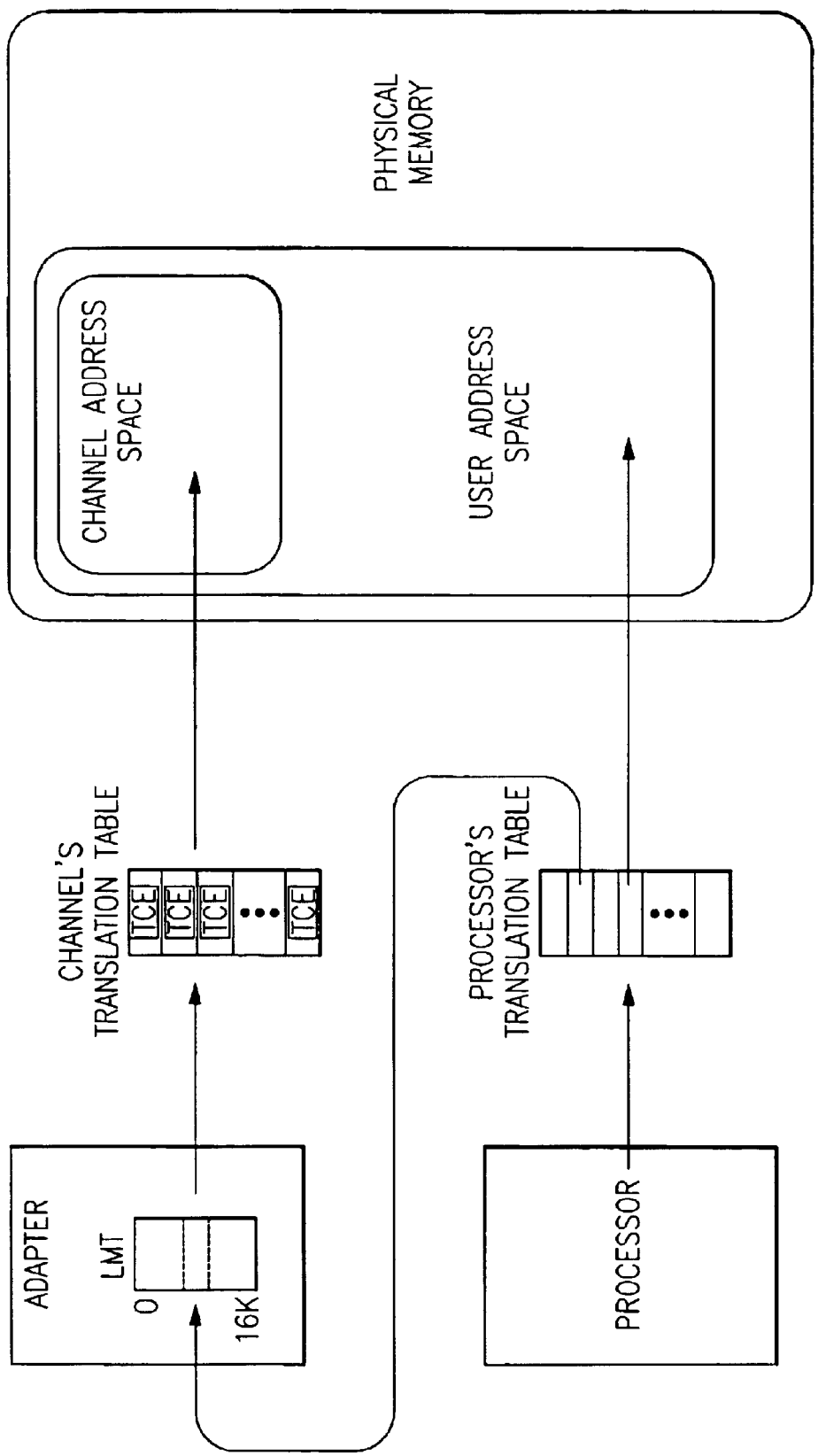
FIG. 9 is a block diagram illustrating the process of address translation that occurs in message packet transfers and related operations.
Figure 10:
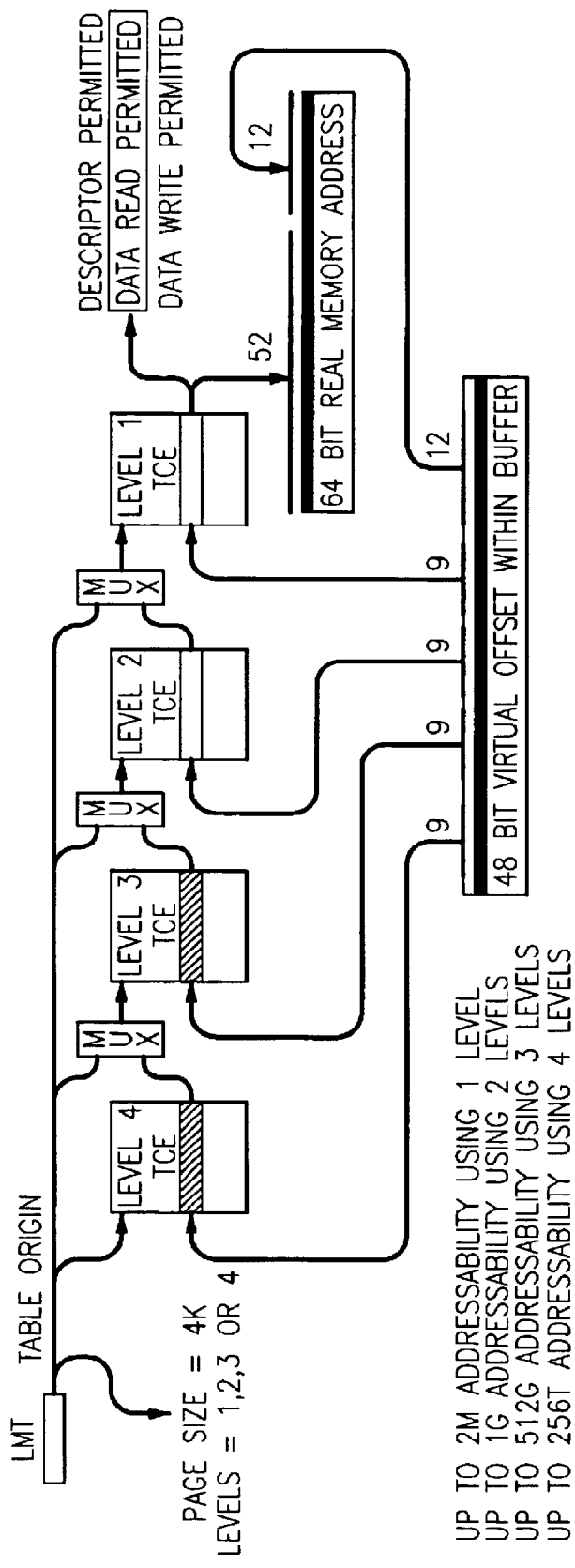
FIG. 10 is a block diagram illustrating the address translation process for pages having a first size.
Figure 11:
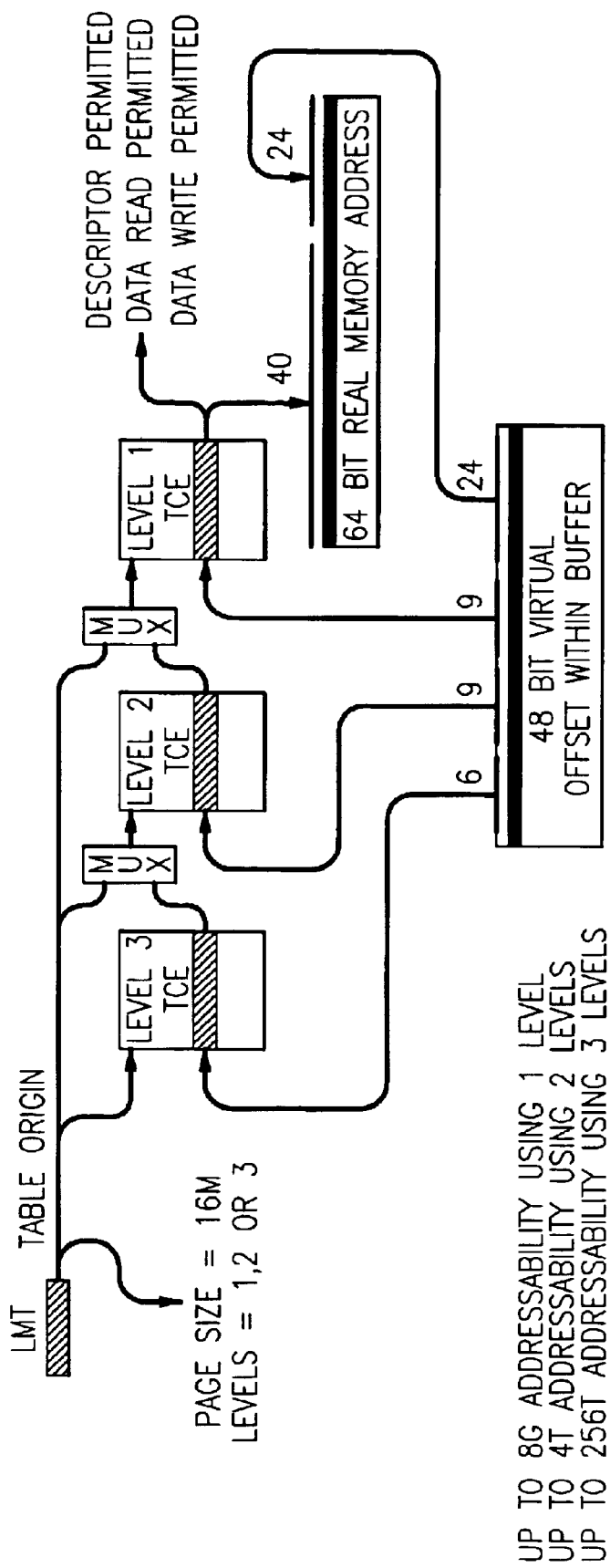
FIG. 11 is a block diagram illustrating the address translation process for pages having a second, larger size.
Figure 12:
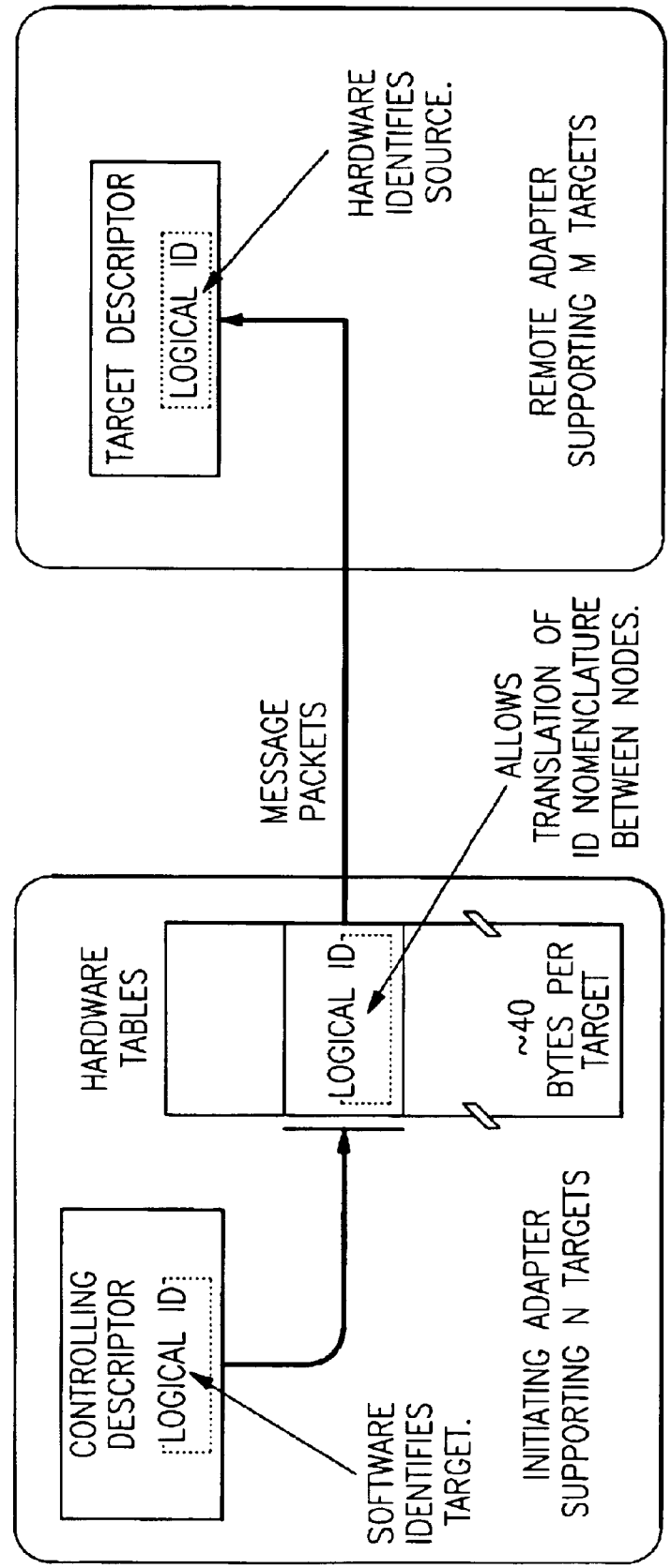
FIG. 12 is a block diagram illustrating the process of adapter target identification.

The architecture of the present invention allows user level code to build descriptors that control data movement between servers. These descriptors are physically located in memory. They point to other memory locations containing the actual data to be transferred. These memory regions are intended to be managed directly by problem state code. The server includes address translation logic that protects user memory areas from other users and converts effective address values managed by user code into a real address values used by processor hardware. Message passing address translation logic provides similar function for message passing operations. When a channel is defined, operating system software defines a single virtually contiguous memory region within the user's address space. This region contains the descriptors and data buffers used by that channel. The message passing address translation logic converts this information to real memory address values. Each channel may address up to 256 terabytes of memory using a 48 bit buffer offset value contained with descriptors. The hardware views the offset value as a 48 bit virtual address within the address space used by that channel. The address translation function converts it into a 64 bit real address value presented to the memory system. Most implementations use fewer real address bits than the 64 provided. These values are not critical parameters for either the design or operation of the present invention viewed in its broadest scope. See FIGS. 9, 10 and 11.

The channel's address translation mechanism supports the usual 4K byte page size and also a 16M byte page size. The 4K page is intended to support traditional user level code. The 16M page is intended to improve the efficiency of user level code in cases where this larger page size is available. The address translation table itself is always contained within 4K pages. Address translation can be disabled for use with kernel level code running without a hypervisor.

The address translation process uses a translation table in memory containing Translation Control Elements, TCE. The table is constructed of from one to four separate levels. The translation sequentially accesses a series of table entries with the last defining the full real address value. The page size and number of levels used determines the maximum size of the address space available. This multilevel lookup process allows translation tables to be built over physically noncontiguous memory regions. A channel's Local mapping table entry specifies the page size, number of table levels, size of the address space, and origin of the first table to be accessed. The software defining the Local mapping table and translation tables insures that the resulting real address value is valid for that system. Details of Translation Control Elements fields can be found elsewhere herein.

The processor and adapter each have their own address translation mechanism. Any physically contiguous 16M memory area may be treated as either a single 16M page or multiple 4K pages in either translation mechanism. It may be treated differently by the processor and the adapter. Each channel specifies a single page size to be used by the adapter when accessing memory for that channel. A 16M page size requires that the entire channel's address space contain only 16M physical regions. A 4K page size does not have any restrictions and may always be used. See FIGS. 10 and 11.

Channels referencing 4K pages may use 1, 2, 3, or 4 translation levels. This provides memory addressability of up to 2M, 1G, 512G, or 256T respectively. The least significant 12 bits of the real address are obtained directly from the least significant 12 bits of the virtual address (or buffer offset value). The remaining 52 real address bits are obtained from the level 1 translation table entry (along with the type of access permitted). The most significant 36 virtual address bits are used to index into an 8 byte entry within each of the 4 levels. The most significant 9 bits index into the level 4 entry or must be zero if not using 4 levels. The next 9 bits index into the level 3 entry or must be zero if not using at least 3 levels. The next 9 bits index into the level 2 entry or must be zero if not using at least 2 levels. The last 9 bit field is used to index into the level 1 entry. The origin of the level 4 entry is always found in the channel's Local mapping table entry. The origin of level 3 is found in the level 4 entry if using 4 levels or in the Local mapping table if using 3 levels. The origin of level 2 is found in the level 3 entry if using 3 or 4 levels or in the Local mapping table if using 2 levels. The origin of level 1 is found in the level 2 entry if using 2, 3, or 4 levels or in the Local mapping table if using 1 level.

Channels referencing 16M pages may use 1, 2 or 3 translation levels. This provides memory addressability of up to 8G, 4T, or 256T respectively. The least significant 24 bits of the real address are obtained directly from the least significant 24 bits of the virtual address (or buffer offset value). The remaining 40 real address bits are obtained from the level 1 translation table entry (along with the type of access permitted). The most significant 24 virtual address bits are used to index into an 8 byte entry within each of the 3 levels. The most significant 6 bits index into the level 3 entry or are zero if not using 3 levels. The next 9 bits index into the level 2 entry or are zero if not using at least 2 levels. The last 9 bit field is used to index into the level 1 entry. The origin of the level 3 entry is always found in the channel's Local mapping table entry. The origin of level 2 is found in the level 3 entry if using 3 levels or in the Local mapping table if using 2 levels. The origin of level 1 is found in the level 2 entry if using 2 or 3 levels or in the Local mapping table if using level 1. As above, and elsewhere herein, these specific values are not critical parameters for either the design or the operation of the present invention viewed in its broadest scope.

Adapter Identification

Software identifies the remote adapter involved in a transfer through a descriptor logical ID field. Before starting an operation, the software initiating the transfer indicates in the controlling descriptor the identification of the remote adapter to be used along with the remote adapter's channel number. During send-receive operations, hardware inserts the logical ID value of this initiating adapter and its channel number in the target's descriptor. When the operation completes, the descriptor on each side identifies the other side's logical ID and channel.

Software doesn't necessarily use a uniform system wide nomenclature to identify adapters, but rather can use a logical value of significance only within the local adapter. There are hardware tables within each adapter that let the hardware match the logical ID nomenclature used locally with the nomenclature used by adapters it communicates with. Every adapter uses a set of logical ID values from 0 to some implementation maximum to identify the adapters it can communicate with. This method makes it easier to build a system where individual adapters do not necessarily communicate with all of the other adapters in the system. It also simplifies the use of multiple adapter types where some adapters may support communications with more adapters than other types. The architecture requires that each adapter implement approximately 40 bytes of internal table space for each adapter that it communicates with. This can add up to a substantial amount of hardware for large systems. Adapters targeted for large configurations include sufficient resources to communicate among up to 4095 adapters, while adapters targeted for smaller configurations do not need to include as many resources.

The hardware accesses a number of internal tables whenever it needs to send a packet to another adapter or to verify that it can process a packet received from another adapter. The tables include information such as the next packet sequence number to be sent to the remote adapter, or the next packet sequence number to expect from it, or which of four potential paths to the adapter is currently active, or a description of the physical route packets should take to get to it. The hardware uses the logical ID value associated with the remote adapter to index into these tables. One of the tables, known as the Path Table, indicates the logical ID value that the remote adapter uses to identify the local adapter. This value is included in all packets sent to the target to identify, in the target's terminology, which adapter sent the packet.

A special logical ID value of all one's represents a broadcast ID used only during broadcast operations. Software specifies this broadcast ID value in the controlling descriptor to indicate that information should be sent to all remote adapters. See elsewhere herein for details.

A uniform system wide nomenclature also exists in the form of a physical ID value, however it is only used by the hardware to verify that packets are delivered to the correct destination. The physical ID of a target adapter is obtained from the hardware Path Table along with the logical ID value that the target uses when referencing the local adapter. See elsewhere herein for details.

Note that although message passing hardware is normally used to send information to a different server, it is also possible to target another adapter within the same server or to target another channel within the same adapter.

Transmission Modes

The message passing architecture of the present invention defines three levels of transmission reliability: unreliable, reliable delivery and reliable acceptance. Push operations can use any mode, pull operations can use either one of the reliable modes, and remote read/write uses reliable acceptance. Reliable acceptance mode for push or pull operations is not supported.

The terms reliable and unreliable are used throughout the industry, but are somewhat misleading. Accordingly, it should be understood that, as used herein, these terms have specific meanings. All transmissions executed in the context of the present invention are, in fact, highly reliable with significant error detection and retry. The difference is that the hardware guarantees in-order exactly once type delivery within the constraints imposed by software or hardware availability for reliable transfers while it only insures due diligence for unreliable transfers. The degree of reliability is indicated in the mode field of the Local mapping table. Regardless of the type of reliability selected, all links are continuously monitored for potential loss of integrity. They automatically go through a retiming procedure that adjusts skew between individual signals when necessary to insure that data transmissions are not corrupted. Every packet includes two levels of Cyclic Redundancy Check (CRC) verification. If a packet is corrupted over an individual link, the transfer is retried up to four times, then the link is retimed up to two times and the transfer tried again. All packets also include a time stamp of when it was launched along with the unique physical ID of the intended target. Receivers discard packets incorrectly delivered or identified as stale.

The unreliable transmission mode is only available for push operations involving no more than 2,048 bytes per source of push descriptor (or combined preload data and source of push). Although not required architecturally, applications normally also restrict the matching target of descriptor to no more than 2,048 bytes—the maximum amount of data transmitted in single packet in preferred embodiments of the present invention. This mode is required when using the broadcast function (see elsewhere herein) or the channel group function (see elsewhere herein). The hardware does not guarantee packet delivery nor does it indicate if a transfer is successful or unsuccessful. The determination of success or failure and the recovery of failed transmissions is performed using software methods. When using software that includes such function, the unreliable transmission mode can be used to eliminate the extra link activity that would be caused by both hardware and software duplicating the function. Because of the retry mechanism associated with individual links, most end-to-end transmission failures are the result of either a physically defective cable or due to the target being powered off or having encountered a server checkstop condition. Recovery from the latter conditions are not practical. Recovery due to a cable failure is possible by simply retrying the failed transmission using the same channel and descriptor as originally created. The service network defines four separate routes to every possible target. The hardware randomly picks one of these four routes for each packet sent using the unreliable mode. Each retransmission has a probability of using a route bypassing the failed component.

The reliable delivery transmission mode guarantees that the packets are delivered in order and that they are delivered only once to the targeted adapter but does not indicate if the targeted channel can accept the information nor does it provide any information about when the targeted memory is updated. This mode is available for all push or pull operations. The hardware maintains two time out mechanisms not used during unreliable transmissions. For every packet sent to the target, the sending adapter usually receives an echo packet back within a reasonable period of time indicating that the packet was correctly delivered. The adapter retries failed transmissions twice on up to four separate paths between the two adapters. If all attempts fail, the operation is canceled and a connection failure is reported. Server software is not aware of which of the four possible paths is actually used. Every adapter also maintains a unique set of sequence numbers for every adapter to which it communicates. These sequence numbers allow the target to discard packets not received in the correct order or received multiple times due to retransmission. This, along with the time out and retransmission mechanisms provided in the sending adapter, insure in-order exactly once type reception. A second timet mechanism is maintained by the receiving adapter. If it fails to receive the next packet of a multi-packet transfer within a reasonable time it cancels the operation and records a connection failure.

The reliable acceptance transmission mode provides the same guarantees as reliable delivery plus information about the targeted channel and insures that the targeted memory is updated before the source descriptor is updated indicating transfer completion. It is available for all operations. It includes all of the mechanisms associated with reliable delivery. It also causes the targeted adapter to return a response packet providing data requested during a remote read operation or indicating that memory has been updated or indicting the reason the operation could not be completed. The initiating adapter maintains a third time out mechanism waiting for this response and reports a connection failure if it is not received within a reasonable time period. The targeted adapter sending the response expects to receive an echo packet indicating that the response was delivered and similar to all reliable transfers retries the operation multiple times over multiple paths if necessary.

Regardless of the reliability mode, the hardware cannot recover from mistakes software might make in setting up the transfer nor is it capable of delivery to targets that have been taken off-line. In addition, reliable transmissions cannot usually guarantee delivery unless there are redundant paths available to the intended target. The reliable delivery mode does flag when a hardware condition prevents a successful transmission and the reliable acceptance mode flags when either a hardware or software condition prevents a successful transfer.

Broadcast Function

The broadcast function provides assistance to software needing to send a common message to all adapters within the same network. It lets software indicate that an unreliable push operation is directed to all remote adapters rather than to just one adapter. The hardware replicates the information to all adapters attached to a common network. This function uses the Logical Address Routing capability in the switch where packets are replicated from a single switch chip input port to multiple output ports. The message may be further replicated among multiple channels within the receiving adapters by using the channel group function as described elsewhere herein.

A channel initiating a broadcast operation uses unreliable protocols, uses a source of push type descriptor (see elsewhere herein), or the preload data/source of push combination, with a data count of no more than 2,048 bytes, and uses the special broadcast ID value, of all one's, to identify the target adapter. The channel may also be used to transmit non-broadcast unreliable push operations by specifying the logical ID of the intended target adapter rather than using the broadcast ID value.

Software allocates a channel with special characteristics to receive broadcast operations. All adapters on the network, including the initiating adapter, receive a copy of the broadcast operation. The source of push descriptor identifies a single channel number to be used by all receiving adapter. All receivers reserve a common channel number for similar broadcast functions. That channel has defined one or more target of push descriptors. Software may choose to let multiple adapters send information to this channel. It is expected that all adapters within the network participate in the broadcast operation. However, a receiving adapter discards an incoming broadcast operation if the targeted has user key value conflicting with that of the issuing channel. This allows the broadcast operation to function, somewhat, as a multicast operation.

A target of push descriptor receiving a broadcast operation is updated by hardware in a manner similar to processing unreliable non-broadcast operations except that hardware sets the source logical ID field to the broadcast ID value of all ones.

Packets generated for non-broadcast operations include a field specifying the physical ID value of the targeted server. This enables an adapter receiving the packet to determine if a routing failure caused an incorrect delivery. Broadcast operations being targeted to multiple adapters can't perform this check. Hardware inserts a special value of all one's representing the universal ID value. This value causes the receiver to override the normal check accepting the packet.

Figure 13:
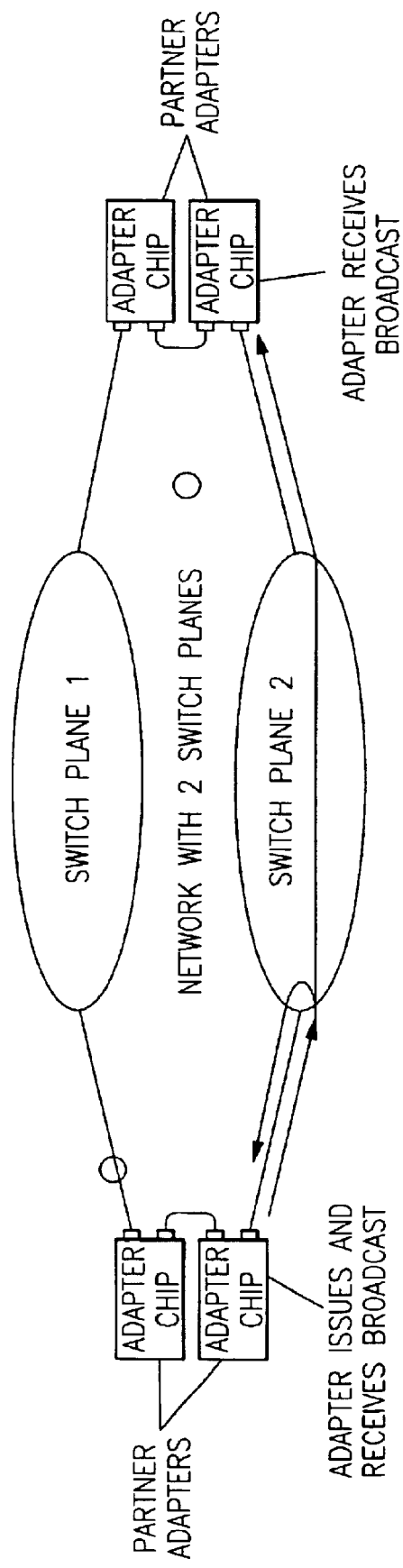
FIG. 13 is a block diagram illustrating the process that occurs during broadcast operations in which a message packet is delivered directly to the memories of a plurality of targeted nodes.

The adapters of the present invention allow networks to be physically constructed of either one or two switch planes with the adapter routing packets between planes when necessary. Broadcast operations rely on switch hardware to replicate a packet throughout a plane. However, there is no direct connection between planes in the two plane configuration as shown in FIG. 13.

In this environment, a broadcast operation is delivered to all adapters attached to the plane directly driven by the issuing adapter, but not to any adapter on the other plane. Software attempting to reach all adapters initiates two separate broadcasts operations, one to each plane.

Channel Group

The channel group function allows multiple channels within a single adapter to be linked together such that received messages targeted to the group are automatically replicated and presented to all channels within the group. Channel groups may only be used to receive unreliable push operations with target of push, branch, or end-of-list condition type descriptors. They are primarily used along with the broadcast function when the receiving adapter is shared by multiple applications or operating systems and each receives the message. The broadcast function propagates an operation to multiple adapters while the channel group function propagates it to multiple channels within each adapter. Although broadcast requires specification of the same channel in every adapter receiving it, each adapter may have a unique channel group defined or not have any group defined.

A packet sent to a channel group is independently examined by every channel in the group. Detection of an error condition associated with any single channel does not prevent processing of the packet by other channels. An individual channel only records information from the packet if the channel is marked valid, has not encountered a fatal condition halting the channel, has a valid target of push descriptor available, and has a user key value compatible with the sending channel. If these conditions are not satisfied, that channel does no further processing of the packet but instead passes the information on to the next channel in the group.

Software defines a channel group as a linked list of channels using special fields in the Local mapping table entries of the channel's involved. The first channel in the linked list is referred to as the anchor. This anchor is the only channel in the group that may be referenced in source of push descriptors targeting the group. Incoming packets that are targeted to a channel that is part of a channel group but which is not the anchor channel are discarded.

Processor Interrupts

The adapter generates a processor interrupt either because it detected an internal hardware failure affecting all adapter operations or, more likely, because an event occurred significant to a specific channel. An individual channel can generate a processor interrupt due to detection of:

1. a nonfatal condition such as: completed, insufficient space, channel unavailable, or connection failure;
2. a fatal condition such as: failed to start, failed to complete, channel stopped, channel failure, or messaging failure.

Non-fatal conditions reflect either the normal completion of specially marked data transfers or an easily retriable exception condition. Fatal conditions reflect serious conditions preventing successful transfers. Fatal conditions halt all further processing on that channel until software corrects the situation. Non-fatal conditions do not prevent further processing. All conditions are explained in the exception handling description provided below. Non-fatal conditions are also extensively discussed in the description herein of individual descriptor types.

The hardware maintains an Interrupt Status Register, ISR, and an interrupt queue for each interrupt level supported. The queue identifies all the channels with active requests for that interrupt level. The queue is implemented by forming a linked list of Local Mapping Table entries. When a channel activates an interrupt, that channel is inserted at the end of the list for the interrupt level it uses. The operating system interrogates an interrupt queue with the privileged read interrupt queue command.

Figure 14:
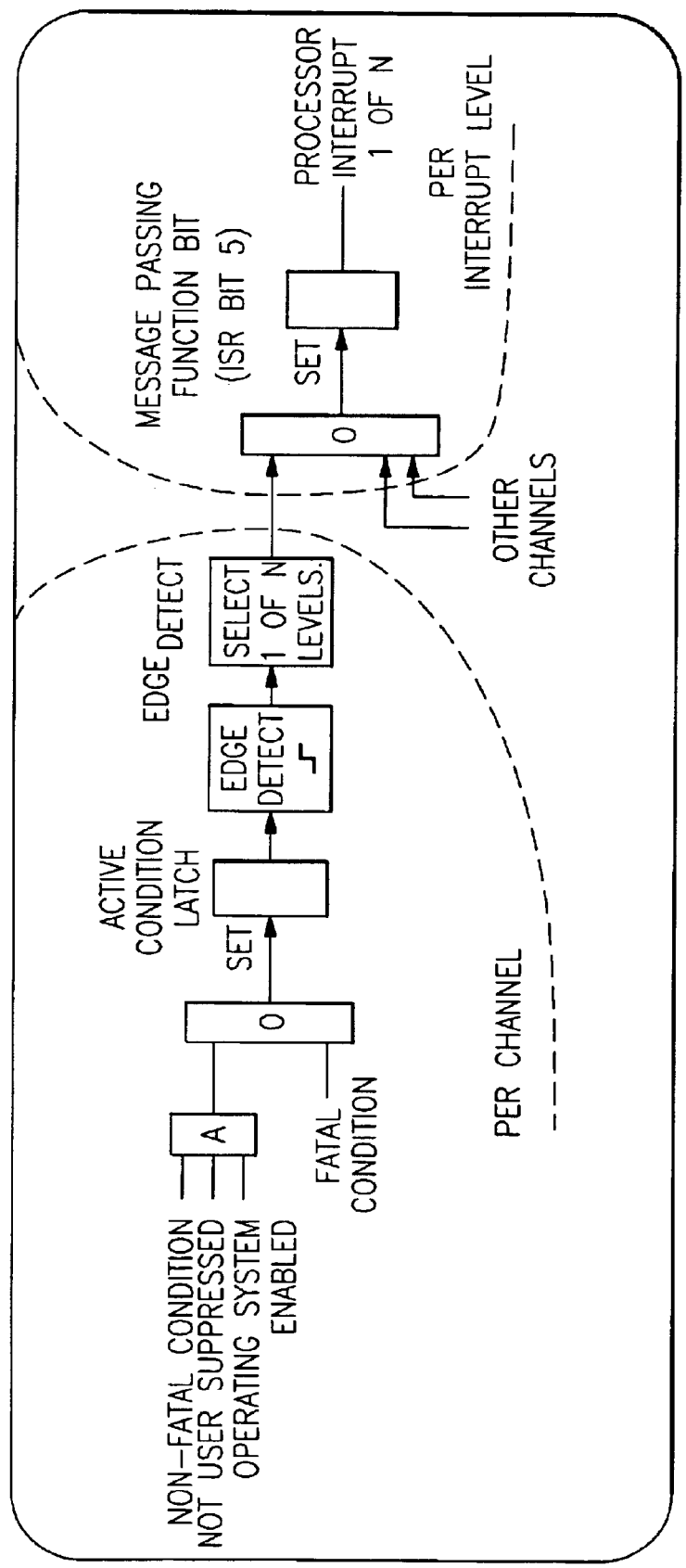
FIG. 14 is a block diagram illustrating channel interrupt generation.

A channel's Local Mapping Table entry includes an architecturally defined interrupt control field established by software to personalize that channel's interrupt processing capability and an channel status field maintained by the hardware to record interrupting conditions, plus sufficient implementation dependent information to maintain one element of a linked list interrupt queue. The interrupt control field provides the ability for the operating system to enable or suppress interrupts for nonfatal conditions. If an application requests an operation involving an interrupt without authorization from the operating system, the hardware performs all of the operations requested, including flagging the condition in the channel status field, but does not actually generate the interrupt and does not place the channel in the interrupt queue. Fatal error conditions also produce an interrupt. See FIG. 14.

A channel requesting a processor interrupt for a nonfatal condition may continue processing additional descriptors. This may result in encountering additional interrupting conditions. However, new interrupts are generated only if software has completed processing of the original interrupt. The first interrupt sets information in the channel's channel status filed in the Local mapping table, thus preventing that channel from invoking additional interrupts until the field is cleared with a clear condition command. Software may choose to extend this period by issuing a suppress interrupt command—and eventually an enable interrupt command.

Multiple channels may independently request processor interrupts. However, similar to the case of a single channel requesting multiple interrupts, the new interrupts are generated only if software has completed processing of the original interrupt. The first interrupt sets a bit in the interrupt status register preventing any additional interrupts from other channels until it is cleared. It may be directly cleared by software using the write interrupt status command or indirectly cleared by the hardware when a read interrupt queue command indicates that there are no entries on the queue.

The detection of a fatal or nonfatal condition normally causes the hardware to place the channel on an interrupt queue and generates a processor interrupt. However, the hardware combines multiple events into a single interrupt whenever possible. Software uses the read interrupt queue and clear condition commands, possibly along with the suppress interrupt, enable interrupt, and reset channel commands to remove an interrupt condition and to control when the channel can generate another interrupt. Each channel maintains a two bit interrupt state within the Local mapping table channel status field to control interrupt processing. The values employed are indicated in Table 2 below:

TABLE 2

00 Channel has no active interrupt (although one may be waiting for an enable interrupt command), is not on an interrupt queue, and the clear condition command is ignored.

01 Channel is on an interrupt queue waiting for a read interrupt queue command and the clear condition command is ignored.

TABLE 2-continued

10 Channel has processed a read interrupt queue command, is not on an interrupt queue, does not have another nonfatal condition pending (although a fatal condition may be waiting for a clear condition command), and is waiting for a clear condition command.
11 Channel has processed a read interrupt queue command, is not on an interrupt queue, does have another nonfatal condition pending (and perhaps a fatal condition) and is waiting for a clear condition command.

Interrupt control and status parameters are modified during the execution of several commands and when a fatal or nonfatal condition is detected according to the following table:

When the hardware processes an interrupt, the following sequence of operations occur:
1. detect a fatal or nonfatal condition;
2. determine that software has enabled an interrupt for this condition (fatal conditions are always enabled; nonfatal conditions are enabled using interrupt control bit 0);
3. record the type of condition (fatal conditions are recorded in channel status bits 12–15; nonfatal conditions set channel status bit 1 and identify the reason in the descriptor condition code field);
4. determine that software has not suppressed the condition (fatal conditions can not be suppressed; nonfatal conditions can be suppressed (or postponed) by setting interrupt control bit 2—the suppress interrupt and enable interrupt commands control this bit)

TABLE 3

| command or event | status before command or event | | | | status after command or event | | | | |
|---|---|---|---|---|---|---|---|---|---|
| | interrupt state | suppress bit | fatal status | nonfatal status | interrupt state | generate interrupt | fatal status | nonfatal status | suppress bit |
| open channel | 00, 10, 11 | x | x | x | 00 | no | 0 | 0 | 0 |
| | 01 | x | x | x | 01 | no | 0 | 0 | 0 |
| reset channel | 00, 10, 11 | x | x | x | 00 | no | 0 | 0 | 0 |
| | 01 | x | x | x | 01 | no | 0 | 0 | 0 |
| clear channel | 00, 01 | x | x | x | unchanged | no | unchanged | unchanged | unchanged |
| | 10 | x | 0 | x | 00 | no | unchanged | 0 | unchanged |
| | 10 | x | 1 | x | 01 | yes | unchanged | 0 | unchanged |
| | 11 | 1 | 0 | x | 00 | no | unchanged | 1 | unchanged |
| | 11 | 0 | x | x | 01 | yes | unchanged | 1 | unchanged |
| | 11 | x | 1 | x | 01 | yes | unchanged | 1 | unchanged |
| read interrupt queue | 00, 10, 11 | x | x | x | unchanged | no | unchanged | unchanged | unchanged |
| | 01 | x | 0 | 0 | 00 | no | unchanged | unchanged | unchanged |
| | 01 | x | 1 | x | 10 | no | unchanged | unchanged | unchanged |
| | 01 | x | x | 1 | 10 | no | unchanged | unchanged | unchanged |
| suppress interrupt | x | x | x | x | unchanged | no | unchanged | unchanged | 1 |
| enable interrupt | 00 | x | x | 1 | 01 | yes | unchanged | unchanged | 0 |
| | 00 | x | x | 0 | 00 | no | unchanged | unchanged | 0 |
| | 01, 10, 11 | x | x | x | unchanged | no | unchanged | unchanged | 0 |
| nonfatal event | 00 | 1 | x | x | 00 | no | unchanged | 1 | unchanged |
| | 00 | 0 | x | x | 01 | yes | unchanged | 1 | unchanged |
| | 10 | x | x | x | 11 | no | unchanged | 1 | unchanged |
| | 01, 11 | x | x | x | unchanged | no | unchanged | 1 | unchanged |
| fatal event | 00 | x | x | x | 01 | yes | 1 | unchanged | unchanged |
| | 01, 10, 11 | x | x | x | unchanged | no | 1 | unchanged | unchanged |

Every read interrupt queue command identifying a given channel is eventually followed by a clear condition command issued to that channel to enable additional interrupts. The Clear condition command can be issued anytime but is ignored unless a prior read interrupt queue identified the channel.

All nonfatal events occurring between a read interrupt queue command identifying a given channel and a clear condition command issued to that channel are combined into a single interrupt and presented when processing clear condition if interrupts are enabled. If interrupts are suppressed when clear condition is issued then the interrupt is postponed until an enable interrupt command is processed.

All fatal events occurring between a read interrupt queue command identifying a given channel and a clear condition command issued to that channel are combined into a single interrupt and presented when processing the clear condition regardless of the status of the suppress interrupt mode. Any channel with a fatal condition regenerates an interrupt during processing of clear condition.

5. determine that the channel doesn't currently have an interrupt pending (determined using the interrupt state bits within the channel status field of the Local mapping table);
6. identify which interrupt level is used by that channel (indicated by interrupt control bits 8–5);
7. add the channel to the interrupt queue for that interrupt level; and
8. set the Interrupt Status Register, ISR, message passing bit for the appropriate interrupt level (the adapter sends an interrupt request transaction to the server's interrupt controller and enters an interrupt state for this level when it sees an active message passing bit; the adapter ignores the value of this ISR until it receives an end of interrupt transaction from the server interrupt controller causing it to exit the interrupt state).

When the software processes an interrupt, the following sequence of operations occur:
1. use read interrupt status command(s) to identify the adapter having an active ISR message passing bit;

2. if desired use the write interrupt status command to reset the ISR message passing bit (this allows software to schedule a lower priority routine for checking the interrupt queue rather than remaining in the more time critical interrupt handler routine and, if used, it is followed by a read interrupt status command to insure completion before the next step);
3. use the read interrupt queue command to identify the channel(s) needing service;
4. if desired issue the suppress interrupt command to avoid additional nonfatal interrupts for that channel (this allows software to process multiple nonfatal conditions with only a single interrupt);
5. use the clear condition command to remove the condition from the channel's channel status field (another interrupt is generated if a fatal condition is also recorded in the channel status field; a fatal condition occurring while the descriptor list is processed immediately invokes another interrupt);
6. search through the descriptor list to identify the reason(s) for any nonfatal condition (software may repeat the clear condition command to remove any pending nonfatal condition that occurred while processing the descriptor list, however it then rechecks the last list element; and
7. use the enable interrupt command, if necessary, to resume normal interrupt servicing (another interrupt is generated if the channel status field has recorded a pending nonfatal condition).

At some point the software tells the server interrupt controller to reset it's interrupt controls (thus sending an end of interrupt transaction to the message passing adapter). This can be done any time after the ISR message passing bit is reset.

Marking Functions

The send-receive model assumes a certain level of cooperation between the sender and the receiver. It is sometimes desirable to send data without the receiver knowing exactly how much data is to be transferred. Both sides have agreed on the maximum data count, but would like to sometimes transfer less than this maximum. It is also possible that software has established multiple receive side descriptors in preparation for several messages and wants to make sure that one incoming message can't spill beyond the space allocated to it due to a send-side software error. The architecture of the present invention provides an optional marking function to handle these two scenarios. The first case uses send-side marking while the second uses receive-side marking.

Marking is invoked by software setting a local buffer is marked bit in the local descriptor to indicate that that descriptor is marked. This may be on either the sending or receiving side. Marking is provided for reliable push and for reliable pull operations. The function is not provided for remote read/write operations.

Send-side Marking

Software can set a local buffer marked flag bit in the descriptor providing data for a push or for pull operations. This indicates that the last byte sent using that descriptor as something special. It is the end of a message, block, or some other unit of work significant to software. The receive side hardware records exactly how much space was really used in the receiving buffer, and updates that descriptor as being completed. The next incoming data targeted to the same channel uses the next descriptor in the list. Software may setup the receive descriptor to generate a processor interrupt in the receive server so that it can immediately start processing the data.

Receive Side Marking

Software on the side receiving push or pull data can also set a local buffer marked flag bit in its descriptor. This flags the last byte of the buffer associated with the receiving descriptor as something special. It is the last position available for an incoming message or some kind of significant software block. It really says "I won't accept more data than this from a single send descriptor." The receive side discards any additional data until the sender's current descriptor is exhausted. The marked receive-side descriptor is considered complete only when this point is reached. The receiving descriptor is always updated by the hardware to indicate how much of the receiver's buffer was actually used. A flag bit in the descriptor is also set if data is discarded. However, there is generally no indication on the send side of how much data was actually saved by the receiver.

Receive side marking can result in data being discarded. This is not necessarily an error condition and is not treated as an error by the hardware. When data is discarded, hardware sets a flag bit in both of the descriptors involved in the transfer. The amount of data discarded is not recorded.

Commands

The present section identifies how software accesses various message passing hardware functions, including a minimum set of system services provided by the operating system, the commands that user level code may directly issue to the hardware, and the commands the operating system uses to control or update the hardware.

Server software accesses a message passing adapter by issuing an eight byte non-cacheable load or store instruction using a special real address value. Each adapter is assigned a unique 256 megabyte address region used by application code to control its set of channels plus a 4 megabyte region used by the operating system or hypervisor to manage the adapter itself. The server uses the address value to direct these instructions to one of the available message passing adapters rather then to memory while that adapter uses the address value to identify the exact function, or command, desired. The preferred architecture allows up to 64 real address bits. However, the actual number of bits used and the actual set of real address values allocated to the adapter may change from one system to another. Application code accesses the adapter only if operating system software grants such access by creating an address translation page table including the desired real address values. Application code is required to have access to the functions known as user commands. These commands have an effective address format, or address value as seen by the application software, defined by the architecture. The functions that are not required to be made available to application level code are referred to as privileged commands. The operating system may choose to give application code read only access to several of the privileged commands that do present either a security or operational exposure.

The adapters for two embodiments of the present invention implement the same set of commands. The systems of the present invention use a common definition for the least significant 28 real address bits associated with user commands and the least significant 22 bits associated with privileged commands. A first embodiment implements 42 real address bits while a second embodiment implements 52 real address bits. The adapter for the first embodiment is personalized during adapter initialization with a set of 14 high order address bits that it responds to as user commands and one set of 20 high order address bits that it responds to as privileged commands. The adapter for the second embodiment is personalized with 24 bits for user commands and 30 bits for privileged commands.

TABLE 4

Command Summary

| 52 or 42 bit real address value | Operation | Function |
|---|---|---|
| UUUU UUUU UU*UU UUUU UUUU UUUU* <u>00CC CCCC CCCC CCCC</u> 0000 0000 0000 | 8 byte store | 8 byte store |
| UUUU UUUU UU*UU UUUU UUUU UUUU* <u>00CC CCCC CCCC CCCC</u> 0000 0001 0000 | 8 byte store | prefetch |
| UUUU UUUU UU*UU UUUU UUUU UUUU* <u>00CC CCCC CCCC CCCC</u> 0000 0010 0000 | 8 byte store | suppress interrupt |
| UUUU UUUU UU*UU UUUU UUUU UUUU* <u>00CC CCCC CCCC CCCC</u> 0000 0011 0000 | 8 byte store | enable interrupt |
| UUUU UUUU UU*UU UUUU UUUU UUUU* <u>00CC CCCC CCCC CCCC</u> 0000 0100 0000 | 8 byte store | clear condition |
| UUUU UUUU UU*UU UUUU UUUU UUUU* <u>00CC CCCC CCCC CCCC</u> 0000 0101 0000 | 8 byte store | step message |
| PPPP PPPP PP*PP PPPP PPPP PPPP PPPP PP*<u>00 0001 LLLL</u> 0000 0000 0000 | 8 byte load | read interrupt status |
| | 8 byte store | write interrupt status |
| PPPP PPPP PP*PP PPPP PPPP PPPP PPPP PP*<u>10 0000 LLLL</u> 0000 0000 0000 | 8 byte load | read interrupt queue |
| PPPP PPPP PP*PP PPPP PPPP PPPP PPPP PP*<u>10 0001</u> 0000 0000 0000 0000 | 8 byte store | stop channel |
| PPPP PPPP PP*PP PPPP PPPP PPPP PPPP PP*<u>10 0001</u> 0000 0000 0001 0000 | 8 byte store | resume channel |
| PPPP PPPP PP*PP PPPP PPPP PPPP PPPP PP*<u>10 0001</u> 0000 0000 0010 0000 | 8 byte store | reset channel |
| PPPP PPPP PP*PP PPPP PPPP PPPP PPPP PP*<u>10 0001</u> 0000 0000 0011 0000 | 8 byte store | select channel |
| PPPP PPPP PP*PP PPPP PPPP PPPP PPPP PP*<u>10 0001</u> 0000 0000 0100 0000 | 8 byte load | test channel |
| PPPP PPPP PP*PP PPPP PPPP PPPP PPPP PP*<u>10 0001</u> 0000 0000 0101 0000 | 8 byte store | open channel |
| PPPP PPPP PP*PP PPPP PPPP PPPP PPPP PP*<u>00 0010</u> 0000 0000 0000 0000 | 8 byte load | read TOD |
| PPPP PPPP PP*PP PPPP PPPP PPPP PPPP PP*<u>00 0010 1011</u> 0000 0000 0000 | 8 byte load | read physical ID register |
| | 8 byte store | write physical ID register |
| PPPP PPPP PP*PP PPPP PPPP PPPP PPPP PP*<u>10 0010 0010</u> 0000 0010 0000 | 8 byte load | read SRAM address register |
| | 8 byte store | write SRAM address register |
| PPPP PPPP PP*PP PPPP PPPP PPPP PPPP PP*<u>10 0010 0010</u> 0000 0011 0000 | 8 byte load | read SRAM data & increment address |
| | 8 byte store | write SRAM data & increment address |

Legend
Italicized address bits indicate those that are defined during initialization for either embodiment.
Underscored address bits indicate those that are defined during initialization of the second embodiment.
Doubly underscored bits indicate those that are defined by adapter design point.
UUUU UUUU UU*UU UUUU UUUU UUUU*     Address value defined by system for user commands to a specific adapter.
PPPP PPPP PP*PP PPPP PPPP PPPP PPPP PP*    Address value defined by system for privileged commands to a specific adapter.
<u>LLLL</u>                                  Identifies 1 of 16 interrupt levels.
<u>CC CCCC CCCC CCCC</u>                     Identifies 1 of 16K channels on the selected adapter.

System Services

The operating system provides many services for user level code in support of this architecture. The hardware architecture herein interacts with the software to provide some a command structure to allocate channels and to deallocate channels.

Allocate Channel

Before user level code can use the message passing function, it requests a channel from the operating system. The operating system allocates and initializes all of the hardware facilities associated with the channel. Many variations of this behavior are possible. The operating system may, for example, allocate memory from a common buffer pool for descriptors and data or may use memory previously assigned to that user. However, the architecture does require that some means of allocating channels be provided and that part of this allocation include initializing that channel's Local mapping table entry, updating the processor's address translation logic to point to this entry, building a message passing address translation table, and initialization of the descriptor list pointed to by the new Local mapping table entry to a descriptor with an end of list condition. The Local mapping table, as described below, has information provided by the operating system or hypervisor, plus reserved areas used by the hardware to record status information while processing that channel. As part of the allocate channel process, software defines the architected areas within the first four doublewords of the Local mapping table and then issue the open channel command defined elsewhere herein to let the adapter initialize the remaining areas and to move the channel into the valid state. Following the Local mapping table definition, the user is told the allocated channel ID value, the channel number, the channel's logical id value, location of the descriptor list and memory regions made available to it and to the message passing hardware.

Deallocate Channel

For every allocate channel there is provided a mechanism to deallocate it. The reset channel command is issued as part of this process to move the channel's hardware state to invalid.

User Commands

Application code operating in a problem state, or untrusted mode, may directly control message passing operations after the operating system has allocated and initialized the hardware facilities associated with a channel. These operations take the form of a store instruction issued to a special memory address region associated with the message passing hardware. This has traditionally been referred to as an MMIO (Memory Mapped I/O—not to be confused with Direct Memory Access (DMA)) operation. The address portion of the store command identifies the physical adapter, channel and the type of operation to be performed. The data portion of the store command is ignored. A command targeted to a nonexistent channel or to a channel in the invalid state is discarded. Careless or improperly invoked user commands can negatively impact operations on that channel but can not damage other channels.

Each server reserves a set of real address values for user commands. This range includes a 4K byte page for every message passing channel. The format allows up to 64K channels per adapter occupying a total of 4 gigabytes within the node's real address space.

Figure 15:
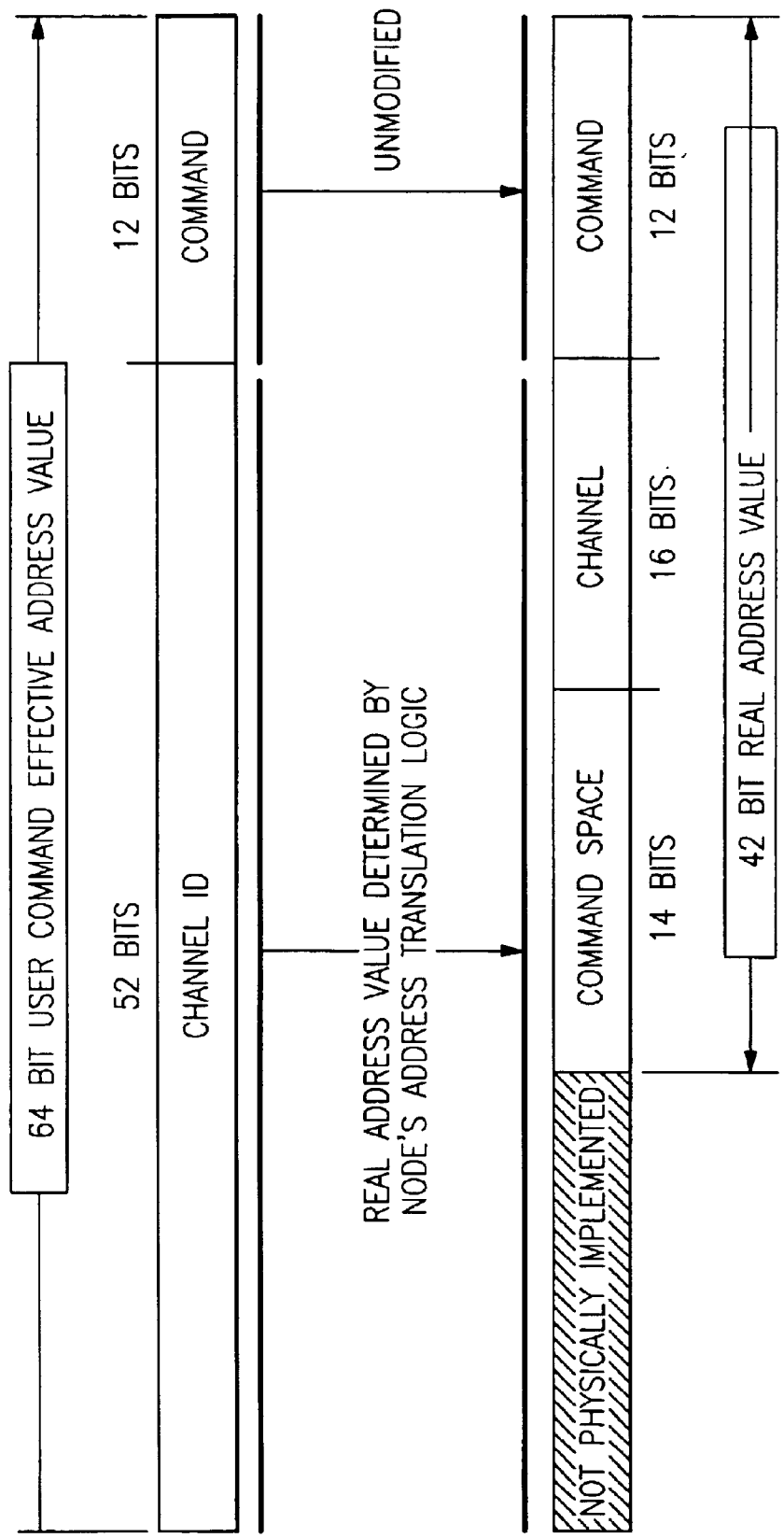
FIG. 15 is a block diagram illustrating the layout of defined address fields.

When a channel is allocated, the operating system defines a page table entry in a special format that is accessed whenever software issues one of the user commands. The operating system gives a channel ID value to user software as part of the allocate channel system service. This channel ID value along with a 12 bit command code is used as the effective address value supplied by software when issuing a user command. The node's address translation logic uses this to access the page table entry created for this purpose by the operating system and produces the real address value given to the hardware. The real address value falls within the memory range allocated for this purpose. The address fields defined for one embodiment of the present invention are shown in FIG. 15. The significance for these fields is summarized in the table below:

TABLE 5

| Field | Bits in one embodiment | Significance |
|---|---|---|
| channel ID | 52 | The value given the user by the operating system to reference this channel. It is used by the node's address translation logic to reference the page table entry associated with the channel assigned by the operating system when the channel was allocated. |
| command | 12 | Indication of the type of operation desired. The hardware flags a fatal failed to start condition in the Local mapping table if the code point is invalid (note: the adapter may ignore selected bits). The following command code points are defined:<br>0000 0000 0000 start message<br>0000 0001 0000 prefetch<br>0000 0010 0000 suppress interrupt<br>0000 0011 0000 enable interrupt<br>0000 0100 0000 clear condition<br>0000 0101 0000 step message |
| command space | 14 | The most significant real address bits implemented by one embodiment which defines the memory region assigned to user commands on a specific adapter. The other embodiment expands this field to 24 bits. |
| channel | 16 | The Local mapping table entry associated with this channel. |

Note: One embodiment of the present invention implements 52 real address bits where the size of the command space field is expanded to 24 bits.

Start Message

The start message command, code 0x000, is used to initiate most message passing transfers. It tells the hardware that software has defined a compatible set of channels and descriptors on both the sending and receiving sides when using the send-receive transfer model or a set of channels on both sides and descriptors on the master side when using the remote read/write model. The command schedules processing for a series of source of push, preload data, target of pull, remote read, remote write, or branch descriptors. Processing continues until an end of list or fatal condition is detected. The command sets a fatal failed to start condition if the channel is already processing descriptors started with a step message command. Software insures that any previous descriptor or data buffer update is visible to the adapter before issuing the command. The sync instruction of the IBM PowerPC microprocessor chip may be issued prior to the command to accomplish this. The start message command has no effect if the channel points to a target of push, source of pull, or descriptor with an end of list condition. A channel in the stopping or stopped state accepts the command and schedules activity to start when the channel is moved to the valid state.

Step Message

The step message command, code 0x050, is used as an alternative to the start message command when initiating a push operation. The adapter keeps track of how many step message commands are received and processes exactly one source of push descriptor for each one. After processing the required descriptors, the adapter prefetches the next descriptor in a manner similar to processing a prefetch command. A subsequent step message then uses this cached information. The command sets a fatal failed to start condition if an attempt is made to schedule more than 255 unprocessed descriptors or if an end of list condition is detected or if the channel is already processing descriptors started with a start message command. The command is intended to handle only source of push, preload data, and branch descriptors. Its behavior with target of pull, remote read, remote write, target of push or source of pull descriptors is implementation dependent. Software insures that any previous descriptor or data buffer update is visible to the adapter before issuing the command. The PowerPC sync instruction may be issued prior to the command to accomplish this. A channel in the stopping or stopped state accepts the command and schedules activity to start when the channel is moved to the valid state.

Prefetch

The prefetch command, code 0x010, is used to prepare the hardware for an upcoming operation without actually initiating the transfer. It gives the hardware a hint that an operation may soon be started providing an opportunity to fetch and cache Local mapping table, translation table and descriptor information before it is needed. If the prefetched descriptor is a branch then the adapter repeats the operation to the descriptor following the branch. If the prefetched descriptor indicates an end of list condition, the adapter retains the descriptor's real address but records that a new descriptor is needed before processing can continue. Before loading descriptor, Local mapping table, or Translation Control Elements (TCE) information, any currently cached descriptor data is discarded. Like any caching scheme, the performance benefit is dependent on the total amount and type of activity going on in that adapter. Before issuing the command, software insures that any previous descriptor or data buffer updates are visible to the adapter. The PowerPC sync instruction may be issued prior to the command to accomplish this. The command is ignored if the channel is not in the valid state or if a previously issued start message or step message command is not yet completed.

Suppress Interrupt

The suppress interrupt command, code 0x020, gives user level code the ability to defer interrupt generation for nonfatal conditions. Such conditions are recorded in the descriptor list and in the Local mapping table channel status field but does not invoke a processor interrupt nor is recorded in an interrupt queue until the enable interrupt command is issued. The suppress interrupt command sets a bit in the channel's Local mapping table channel status field while the enable interrupt command resets it.

Enable Interrupt

The enable interrupt command, code 0x030, restores a channel's ability to generate a processor interrupt for a nonfatal condition after a prior suppress interrupt command. If a nonfatal condition is pending the channel is added to the interrupt queue and a processor interrupt is generated. Interrupts are also enabled by the open channel command.

Clear Condition

The clear condition command, code 0x040, clears a channel of all nonfatal conditions that occurred before the last read interrupt queue command identifying the channel. The Clear condition command is ignored unless a read interrupt queue command identifies the channel. If a nonfatal condition has occurred since processing the read interrupt queue command, and interrupts are not suppressed, the channel is added to the interrupt queue and a processor interrupt generated to report the new condition. If a nonfatal condition has occurred but interrupts are suppressed, then the interrupt is deferred until an enable interrupt command is processed. If the channel has a fatal condition present, the channel is unconditionally added to the interrupt queue and a processor interrupt is generated. The command does not remove the channel from the interrupt queue (that is accomplished with the privileged read interrupt queue command).

Privileged Commands

Untrusted code is not necessarily given access any hardware facility other than through the limited functions provided by user commands. The facilities controlling basic hardware behavior are only accessed by the operating system, hypervisor, or service processor. Trusted server software can invoke the set of privileged commands using MMIO type load or store instructions issued to special addresses owned by the adapter.

Control Channel

The control channel set of commands allows software to modify the operational state of a channel. This set includes: open channel used to enable operations, stop channel and resume channel used to temporary halt operations, reset channel used to permanently halt operations, and the select channel and test channel pair of commands used to interrogate the channel's status.

Figure 16:
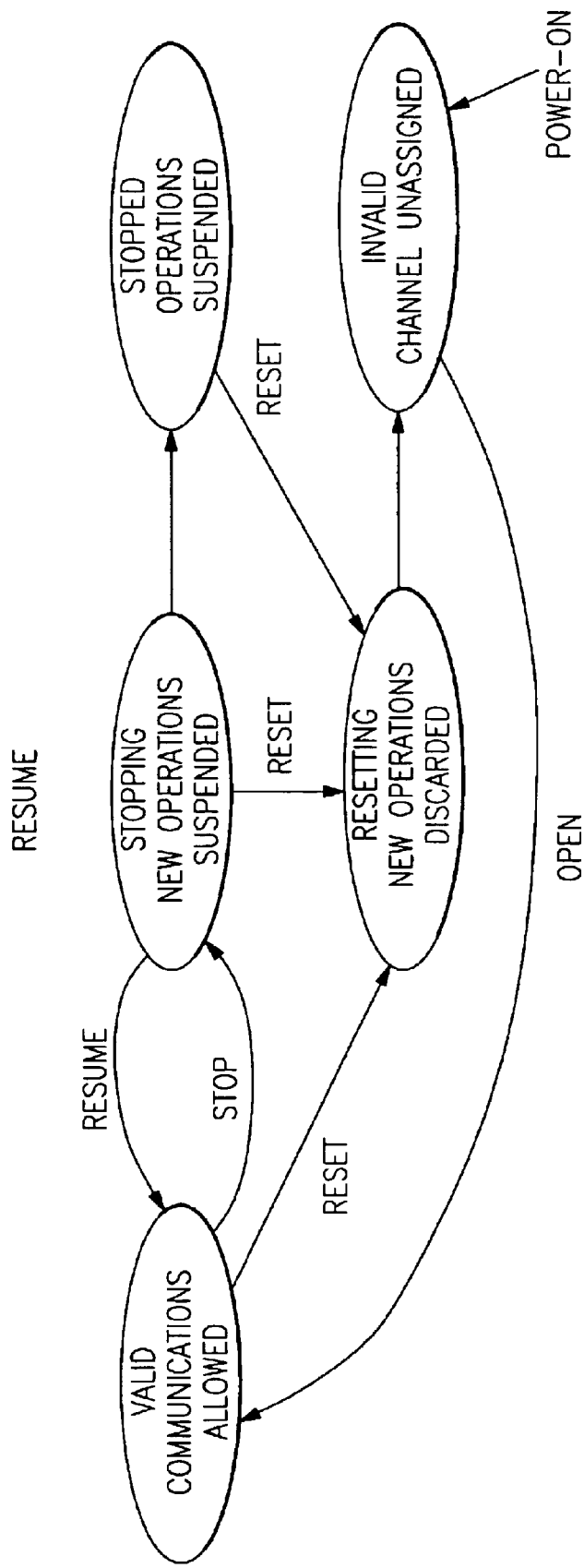
FIG. 16 is a state diagram illustrating changes in state that occur in communication adapters of the present invention.

The following table describes the various states defined for a channel. FIG. 16 provides a description of the transitions from one channel state to another.

TABLE 6

| State | Description |
| --- | --- |
| invalid | All channels start in the invalid state upon adapter initialization and return to this state when a channel is |

TABLE 6-continued

| State | Description |
| --- | --- |
|  | deallocated. The adapter discards any user command issued to a channel in this state. It also discards any incoming packet, although it does return a response packet with a channel unavailable condition when it receives a reliable request packet. Software reads or modifies any LMT field for a channel in this state. Software uses the open channel command to move a channel from the invalid state to the valid state during an allocate channel operation after it initializes the LMT fields. |
| valid | A channel in the valid state communicates normally with other channels. The permissible type of descriptors and packets are indicated by the LMT mode field. Software does not use the read LMT or write LMT functions while a channel is in this state. Software does use the stop channel command to move a channel from the valid to the stopped state or the reset channel command to move it to the invalid state. All user commands are processed. |
| stopping | A channel in the stopping state has processed a stop channel command but has not yet reached a condition allowing it to enter the stopped state. A channel in this state does not start new work but continues processing until it can enter the stopped state. Software uses the resume command to move a channel from the stopping to the valid state or the reset channel command to move it to the invalid state. The start message user command schedules activity to be started only when the channel is moved back to the valid state. Suppress interrupt, enable interrupt and clear condition user commands are processed normally while the prefetch user command is ignored. |
| stopped | A channel in the stopped state has processed a stop channel command and has reach a condition allowing it to stop all further communications activity. While a channel is in this state software may modify the address translation table or the LMT translation table origin field or the LMT maximum offset field. It may not modify any other LMT field. Software uses the resume command to move a channel from the stopped to the valid state or the reset channel command to move it to the invalid state. The adapter discards any incoming packet. A reliable packet also returns a channel unavailable response if the channel has a fatal condition or if the packet has an incorrect user key; otherwise, it records a fatal channel stopped condition and returns a channel stopped response. The start message user command schedules activity to be started only if the channel is moved back to the valid state. The suppress interrupt, enable interrupt and clear condition user commands are processed normally while the prefetch user command is ignored. |
| resetting | Channel in the resetting state have processed a reset channel command but haven't yet reached a condition allowing it to enter the invalid state. A channel in this state does not start new work but continues processing until it can enter the invalid state. The adapter discards any user command issued to a channel in this state. It also discards any incoming packet although it returns a response packet with a channel unavailable condition when it receives a reliable request packet. Software doesn't use the read LMT or write LMT functions. |

The open channel command is used by privileged software to complete the process of allocating a channel. The adapter initializes reserved fields within the Local mapping table, resets fatal and nonfatal conditions and changes the channel state to valid. The command is ignored if the channel is not in the invalid state.

The stop channel command is used by privileged software to quiesce channel operations while the channel's address translation table is modified. The command moves a channel from the valid state to the stopping state and eventually to the stopped state where software can safely change the translation table or the channel's translation table origin Local mapping table field without impacting in-flight data transfers. The stopped state is entered only after the channel processes a complete local or remote source of push, source of pull, remote read, or remote write descriptor. A channel has an incomplete target of push or target of pull descriptor but also has completed the associated remote source of push or source of pull descriptor. The time period required to reach this point is dependent on the amount of data transferred, on the response time of the remote channel involved in the transfer, and on the amount of unrelated activity simultaneously processed by the adapter. Application code using the channel is largely unaware of the operating system's actions and/or the channel state. It needs only to understand that an operation sent to a remote channel in a stopped state responds with a channel stopped condition and is to be retried. This requires additional communication between both sides of the transfer to reestablish descriptor lists and buffer space. The adapter places the channel in the stopping state while waiting for sufficient progress to enter the stopped state. The command is ignored if the channel is not in the valid state.

The resume channel command is used by privileged software to move a channel back to the valid state after updating the channel's address translation table. The command is ignored if the channel is not in the stopped or stopping state.

The reset channel command is used by privileged software to move a channel from the valid, stopped, or stopping state to the intermediate resetting state and then to the invalid state. The invalid state is entered as soon as the adapter guarantees that it is no longer updating the channel's Local mapping table or any memory area associated with the channel. The command may abort any in-flight operations potentially resulting in incomplete data transfers or descriptor updates or may cause a remote channel to report an unavailable condition. The adapter resets fatal and nonfatal conditions, changes the channel state to invalid, and the interrupt state to either no interrupt pending or waiting for read interrupt queue (if the channel is on an interrupt queue). The command is processed regardless of the current channel state.

A channel changes state asynchronously with the command causing the change. Software uses the select channel and test channel commands to determine when the change actually takes place. The select channel command identifies a single channel while the test channel command indicates its current state. Subsequent tests use additional select channel commands only if the channel number changes.

Read/write LMT

Server software has the ability to modify the Local Mapping Table. To help software or hardware debug, it also has the ability to examine the table contents. The access is preferably made through the node's address translation logic and page tables to insure that only authorized software modifies the facility. Untrusted code is never be given authority to modify it. The service processor preferably also has unconditional access to the facility during system initialization and checkstop recovery procedures. In preferred embodiments of the present invention, the Local mapping table is implemented as a portion of an 8 megabyte hardware Static Random Access Memory (SRAM; see FIG. 19). Half of this SRAM is allocated to the Local mapping table function while the remaining half is used for implementation specific purposes such as adapter microcode, trace tables, internal data tables, and scratch pad work areas. Server software accesses all SRAM locations, including the Local mapping table, through the use of four 8 byte non-cachable instructions referencing two special address values. All accesses to the SRAM involve two steps. First the address within the SRAM is established, and second, data is transferred between the server and SRAM. The address is defined initially, by a software to write to the SRAM address register. It then issues a load or store instruction transferring data from or to the specified SRAM location. The hardware increments the value in the address register following every data access. Software then either uses this value to access the next sequential SRAM location or repeats the entire two step process.

Software does not access the Local mapping table entry of a channel unless the channel is in the invalid state (although the translation table origin or maximum offset field may also be modified while in the stopped state). Software uses the privileged control commands identified above to change the channel's state. Although software updates the Local mapping table while a channel is in the invalid state it is not allowed to modify the current state information within the channel state field. This means that, in the currently designed implementation, when writing double word 31 it sets bits 9–11 to "000."

Read/write Interrupt Status

Each adapter maintains an Interrupt Status Register, ISR, for each interrupt level supported. This register includes one bit for each function that generates an interrupt including at least one allocated to the message passing function. Server software has the ability to examine and reset the interrupt status for any interrupt level it uses. The access is preferably made through addressing page tables to insure that only authorized software reads and/or modifies the facility. User level code is never given access. The service processor also preferably has unconditional access to the facility during system initialization and during checkstop recovery procedures.

Sixteen interrupt levels are supported in the current embodiments of the present invention. However, this number is a design choice and is not critical to the operation or structure of the present invention in its most general aspects. Preferably, the hypervisor assign one interrupt level to each one of up to sixteen logical partitions (LPARS) and provides page tables giving each partition's operating system access to it's allocated ISR. Each ISR is accessed by server software referencing a special memory address. It reads an ISR using a non-cachable 8 byte load instruction or modifies an ISR using a non-cachable 8 byte store instruction. Software follows a write interrupt status command with a read interrupt status command to insure that the ISR modification has completed. The structure of the preferred Interrupt Status Register (ISR) is shown below in Table 7:

TABLE 7

Interrupt Status Register

| Bit | Function | Description |
|---|---|---|
| 0 | enable interrupt | controlled by server software to enable or suppress all interrupts on this level - a processor interrupt is generated if this bit and any bit 1–6 is active |

TABLE 7-continued

Interrupt Status Register

| Bit | Function | Description |
| --- | --- | --- |
| 1–2 | reserved | not used |
| 3 | service buffer function interrupt | set by hardware when the service buffer function requests an interrupt - reset by software - see the implementation specification for information about this non message passing function |
| 4 | reserved | not used |
| 5 | message passing function interrupt | set by hardware when the message passing function requests an interrupt - caused by detection of either a fatal or nonfatal message passing condition or because a change occurred to message passing availability (bit 13) for which software requested an interrupt (bits 14–15) |
| 6 | service processor to server interrupt | set by service processor software to request a server interrupt - reset by server software - this bit is provided for a possible but as yet unidentified need for the service processor to communicate to server software |
| 7–11 | status | these bits are neither controlled nor used by the hardware - they may be used, along with bit 6 to pass, as yet unidentified, information from service processor software to server software |
| 12 | messaging failure detected | set by hardware when it detects a messaging failure condition - reset by software - it informs server software that a messaging failure has occurred, it does not directly cause an interrupt - when the hardware sets this bit it also resets the message passing available bit, which may cause an interrupt |
| 13 | message passing available | set by the adapter or service processor to indicate that message passing is or is not available - server software has no control over this bit - hardware discards any user command or write LMT command and returns all ones to a read interrupt queue command received while this bit is inactive |
| 14 | interrupt on messaging available | set by software if it wants an interrupt generated when the message passing function becomes available (set bit 5 when bit 13 changes to 1) |
| 15 | interrupt on messaging unavailable | set by software if it wants an interrupt generated when the message passing function becomes unavailable (set bit 5 when bit 13 changes to 0) |
| 16–63 | undefined | field is ignored by the hardware during a store instruction and returned as all zeros during a load instruction |

Read Interrupt Queue

There is one interrupt queue for each interrupt level supported by the adapter. The entries in a queue identify the channels that have requested processor interrupts for that level. The queues are physically implemented as linked lists of Local mapping table entries. A channel appears only in the queue specified by the channel's Logical Mapping Table interrupt control field and it appears no more than once in that queue. Each queue is accessed by server software referencing a special memory address with a non-cachable 8 byte load instruction. Software is not allowed to issue a store instruction to this address.

Server software has the ability to examine and extract information from the interrupt queue for any interrupt level it uses. The access is preferably made through the node's address translation logic and page tables to insure that only authorized software can read and thus modify the facility. Application code is never given access. Operating system code is given access even in a logical partition (LPAR) environment. It is not required that the service processor have access.

Each 8 byte load operation removes the oldest entry from the selected queue. It returns to software the channel number having an active interrupt plus information from the Local mapping table channel status field for that channel. If it determines that the queue is empty, it returns a value of "1" in the most significant bit and resets the Interrupt Status Register message passing bit that caused the adapter to request a processor interrupt. If message passing is not available, the command returns an all one's value. The command does not remove the channel condition causing the interrupt nor does it enable that channel to generate a subsequent interrupt. Software issues a clear condition user command or reset channel and write LMT privileged commands before that channel may invoke a subsequent interrupt. Because a read interrupt queue command is required to remove a channel from an interrupt queue, it is possible that a channel remains on a queue after being closed with the reset channel command or even after being reassigned with the open channel command. A read interrupt queue command issued to such a channel returns an indication that the channel has neither a fatal or nonfatal condition.

TABLE 8

64 Bit Data Field

| Bit | | Description |
| --- | --- | --- |
| 0 | 0 | queue is not empty and message passing is available |
| | 1 | queue is empty or message passing is not available |
| 1 | 0 | a nonfatal condition has not been detected and message passing is available |
| | 1 | nonfatal condition detected or message passing is not available |
| 2 | 0 | message passing is available |
| | 1 | message passing is not available - all 64 bits are "1" |

TABLE 8-continued

64 Bit Data Field

| Bit | | Description |
|---|---|---|
| 3 | 0 | interrupts are enabled for this channel and message passing is available |
| | 1 | interrupts are disabled for this channel or message passing is not available |
| 4–5 | current | interrupt state |
| | 00 | no interrupt pending and not waiting for clear condition command |
| | 01 | channel on interrupt queue waiting for read interrupt queue command |
| | 10 | processed read interrupt queue, waiting for clear condition, no pending interrupt |
| | 11 | processed read interrupt queue, waiting for clear condition, have pending interrupt |
| 6–8 | unused | |
| 9–11 | current | channel state |
| | 000 | invalid |
| | 001 | valid |
| | 010 | stopping |
| | 011 | stopped |
| | 100 | resetting |
| 12–15 | 0000 | no fatal condition detected |
| | 0100 | fatal failed to start condition detected |
| | 0101 | fatal failed to complete condition detected |
| | 0110 | fatal channel failure condition detected |
| | 0111 | fatal stopped condition detected |
| 16–31 | channel number invoking interrupt | |
| 32–63 | unused | |

Read TOD

This command is not actually necessary for message processing. It has, however, traditionally been provided as function available to application software by previous RS/6000 SP message passing systems and is therefore included here for completeness. Each adapter includes a register that is incremented approximately once each 13.3 nanoseconds (ns) and is used to time stamp packets. The preferred embodiment herein includes a mechanism to maintain all copies of the register throughout the system to a common value within approximately 350 nanoseconds. It is called a 'time of day' register or TOD. Server software may choose to use the register contents as a common system wide time reference. The read TOD function returns a 64 bit value. The low order 63 bits reflect the value of the time of day register while the most significant bit, when set, indicates that the value is within the acceptable tolerance.

The register is accessed by server software referencing a special memory address using a non-cacheable 8 byte load instruction. Each adapter includes a single 4K area software may use to reference the TOD value within that adapter. The 4K area is not used for any other type of access. All adapters maintain the same TOD value. Page table entries are created giving untrusted application code read only non-cacheable access to the TOD. Software is not allowed to issue a store instruction to this address. Application level software may be given access to this function if desired.

TABLE 9

64 bit data field

| Bit | Function | Description |
|---|---|---|
| 0 | valid | Active if the adapter has successfully maintained the time value within an acceptable tolerance to the same value maintained by other adapters in the system — the definition of "acceptable tolerance" is established by the service processor during adapter initialization. |

TABLE 9-continued 64 bit data field

| Bit | Function | Description |
|---|---|---|
| 1–63 | time value | Field is initialized during adapter initialized and incremented once approximately every 13.3 ns. |

Read Physical ID Register

Each adapter includes one 16 bit physical ID register. It uniquely identifies that adapter within the system and is used to detect misrouted packets. This register is defined by the service network during adapter initialization. All packets include a field specifying the physical ID value of the intended receiver. Packets received by an adapter allocated a different physical ID value are discarded. A value of all one's represents a universal ID. An adapter with this physical ID value accepts all packets. A packet with this target ID value is accepted by all adapters.

The physical ID value is examined or modified by privileged server software referencing a special memory address with a non-cacheable 8 byte load instruction. A convention is used of creating a physical ID value from a combination of a logical ID value along with a network value.

TABLE 10

64 Bit Data Field

| Bit | description |
|---|---|
| 0–3 | The network number that the adapter is connected to. All adapters on the same network may communicate. Adapters on different networks may not communicate. |
| 4–15 | Logical ID value assigned to this adapter throughout the network. |
| 16–63 | Unused by hardware and presented as zeros during load instruction |

Read/write Configuration

There are several facilities that are initialized before starting any message passing activity. The initialization is normally be performed from the service processor. It is not necessary for server software to be given access but it may be useful during engineering debug activity. The service processor should, however, have the ability to prevent modifying these facilities from server software.

Each adapter includes a path table, a route table and a set of broadcast registers. These facilities provide information about all remote adapters with which the local adapter can communicate. This includes the remote adapter's physical ID value, the logical ID value used by that adapter to reference the local adapter, and information about how packets reach the remote adapter. See below for details. These facilities are initialized by service processor software before the adapter is used.

Each adapter knows the real address values designating that adapter's user command space and privileged command space. These parameters define the address range associated with user commands and privileged commands.

Adapters also have several facilities clearly outside of the scope of a message passing architecture but desirable for its development and/or maintenance. This includes facilities used to report and identify the cause of hardware failures, to control or report the status of links, to help identify performance characteristics or to help debug software controlling the adapter or to debug the hardware itself.

Table Formats

Local Mapping Table

The Local Mapping Table, LMT, is an array within adapter hardware used to define channels. Each channel references one LMT entry containing 256 bytes. This entry contains information which is of interest to server software plus other implementation specific information that is not of interest to server software. Each entry holds all the privileged control information that is established by trusted code plus all of the status information associated with the channel. The table is initialized during the adapter reset sequence such that all channels are marked "invalid." When a channel is allocated, software updates the first four double words of the channel's LMT entry and then issues the open channel command. Software later issues a reset channel command to deactivate it. The reserved areas are defined and used by the hardware as a work area or scratchpad while processing messages for the channel the channel. Although privileged software can read anything in the table, the reserved areas are not normally of interest.

Figure 17:
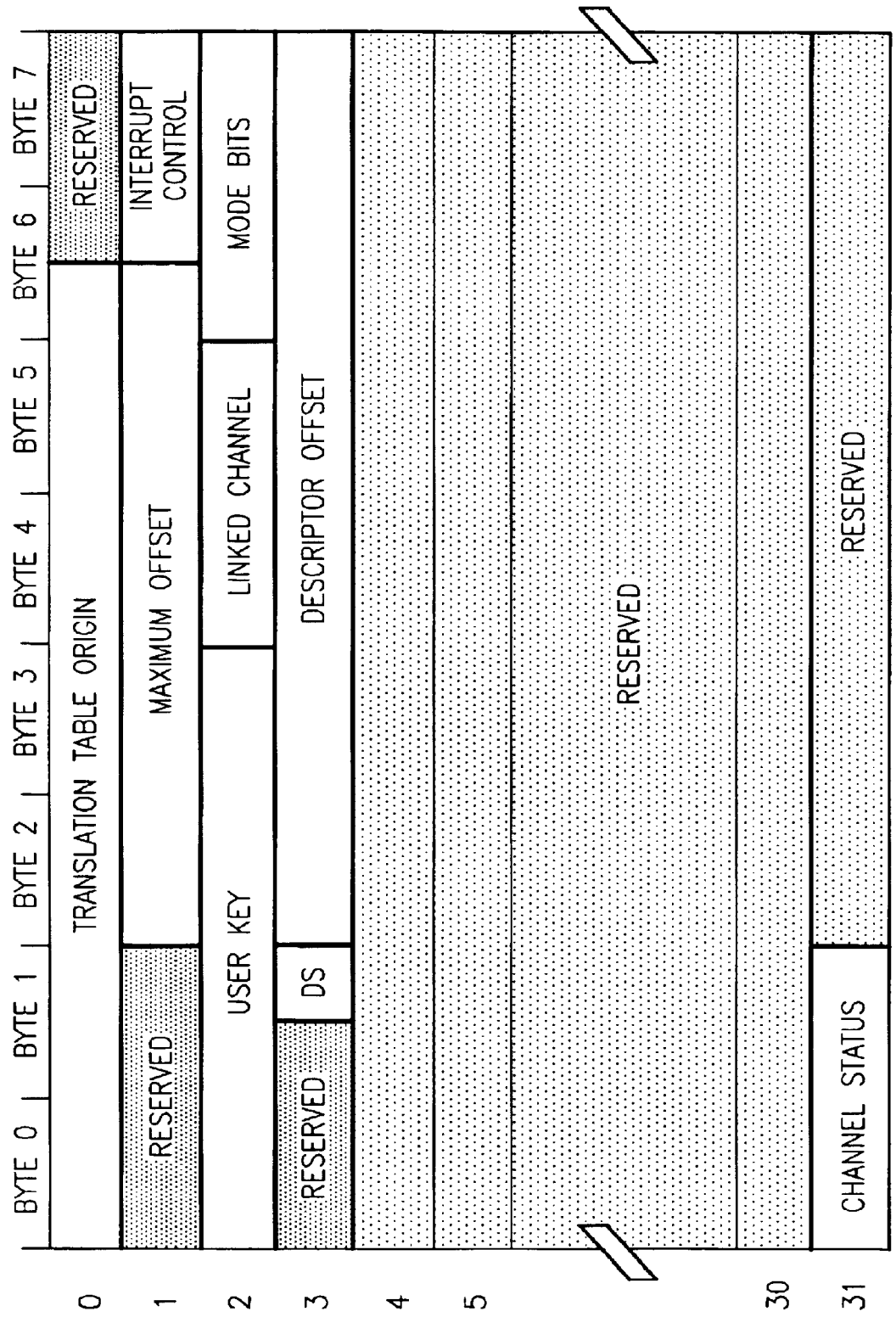
FIG. 17 is a diagram illustrating the layout, content and sizes of data fields employed in the Local Mapping Table which contains many of the communication parameters used to effect the direct memory to memory message packet transfer herein.
Figure 20:
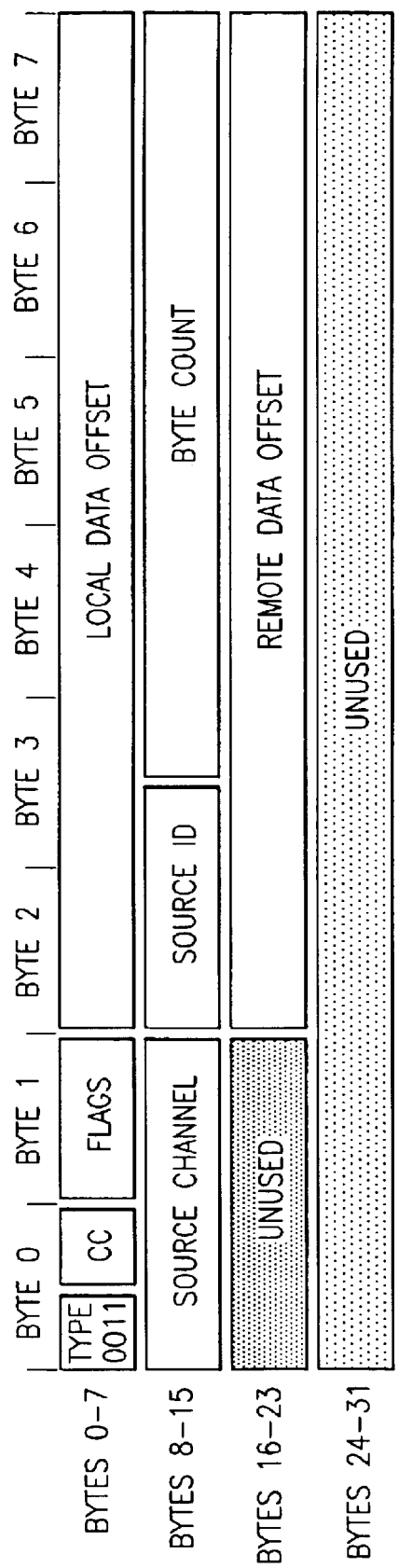
FIG. 20 is a map illustrating the layout, content and size of parameters used in remote read operations.
Figure 21:
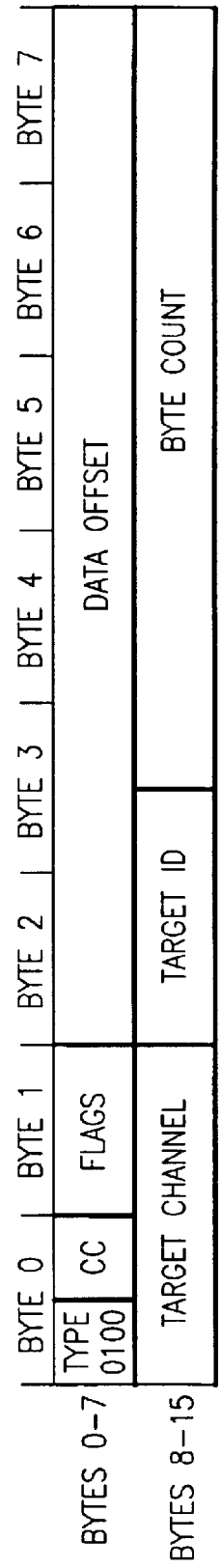
FIG. 21 is a map illustrating the layout, content and size of parameters used in source of push operations.
Figure 26:
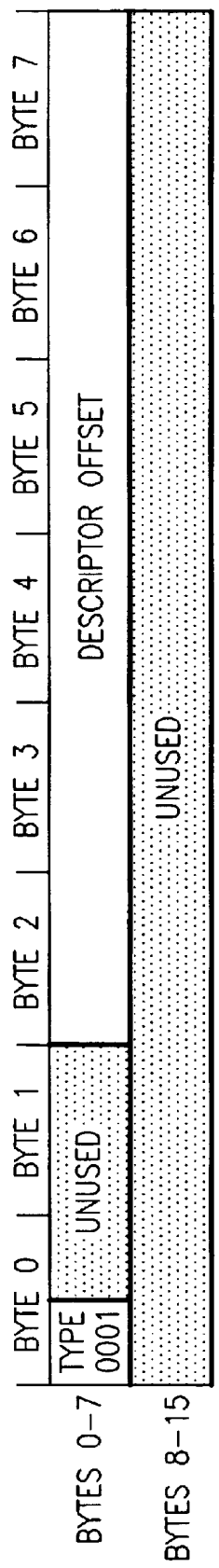
FIG. 26 is a map illustrating the layout, content and size of parameters used in branching operations.
Figure 27:
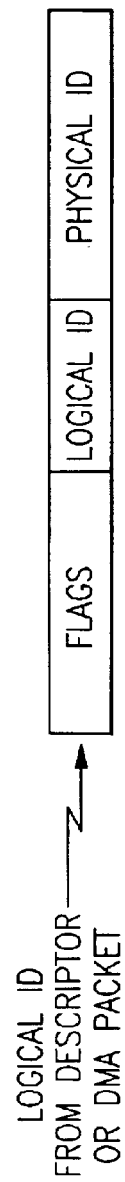
FIG. 27 is a map illustrating the layout, content and size of parameters in the path table entry.
Figure 31:
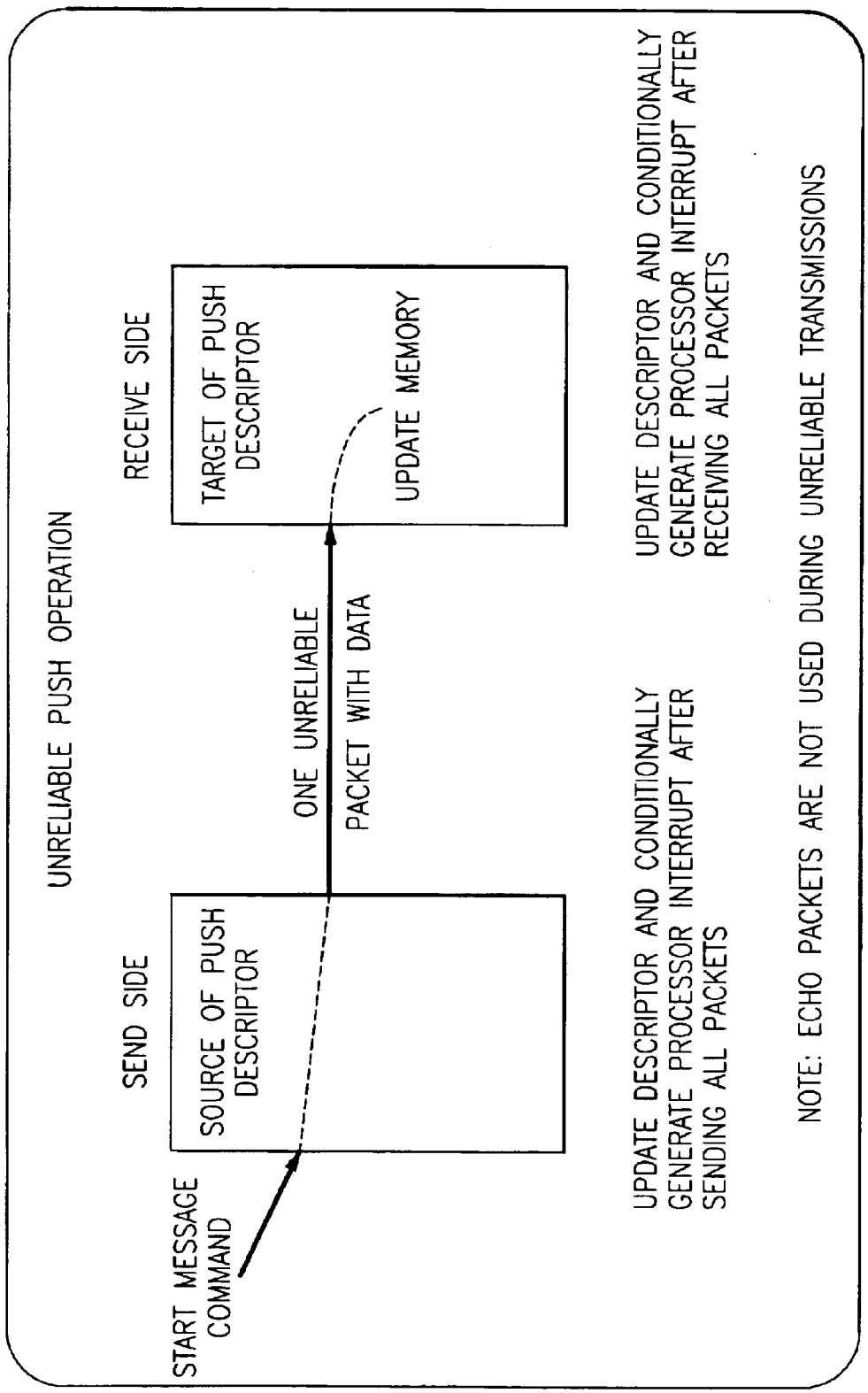
FIG. 31 is a block diagram illustrating the steps that occur in an unreliable push operation.
Figure 32:
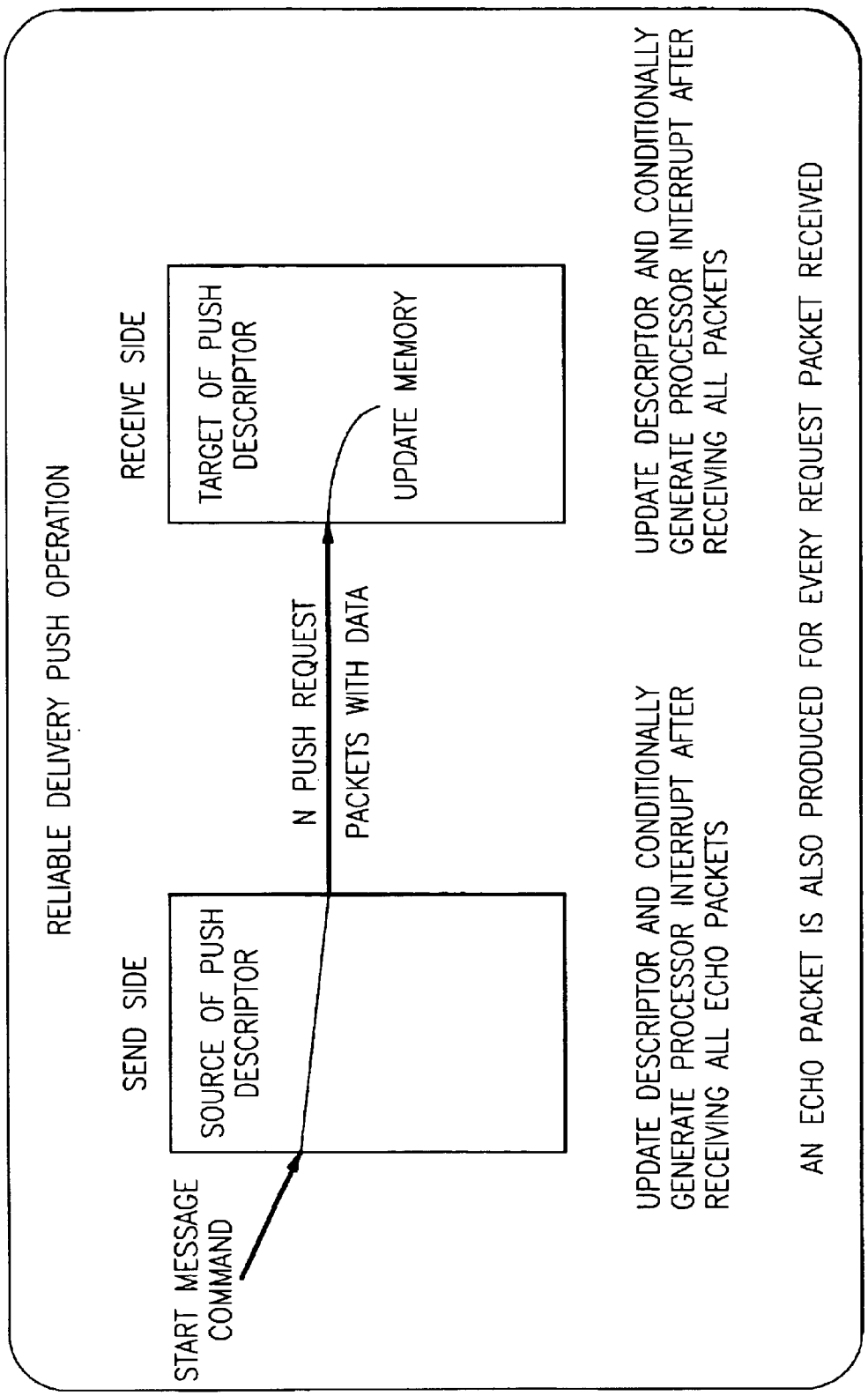
FIG. 32 is a block diagram illustrating the steps that occur in a reliable delivery push operation.

Software initiates a data transfer by issuing the start message user command. Hardware then schedules work by adding the indicated channel to one of two work queues. These queues keep track of all channels ready for some kind of send processing. Software is given the perspective that there may be many active channels each with many packets in flight simultaneously. Although the hardware does pipeline processing and does juggle many steps simultaneously, it really cannot do everything in parallel. It sends a packet for one channel then does work on another channel and later comes back to the first channel for more processing. Software has no control over which channel gets the hardware's immediate attention other then by selecting which of the two work queues the channel gets placed into. These work queues are preferably stored in the Local Mapping Table and more particularly, are stored in what are described as reserved area in FIG. 17. When hardware is looking for additional work it switches between the two queues before searching deeper into a single queue. Hardware does multiplex its attention over all channels on the two queues, thus preventing any single channel from dominating hardware resources. The queue to be used by each channel is indicated in the LMT entry for that channel. See FIG. 17.

TABLE 11

Non-reserved LMT Fields

| Field | Bits | Significance | | |
|---|---|---|---|---|
| mode bits | 16 | 0–2 | Reserved | |
| | | 3 | Work queue used by channel | |
| | | | 0 | use queue A |
| | | | 1 | use queue B |
| | | 4 | Transmission mode used during source of push | |
| | | | 0 | Reliable delivery or reliable acceptance |
| | | | 1 | Unreliable |
| | | 5 | Type of reliable transmission mode used during push or pull | |
| | | | 0 | Reliable delivery |
| | | | 1 | Reliable acceptance (ignored by the adapters herein) |
| | | 6 | Enable operation as remote read slave | |
| | | | 0 | The channel can not be used as a remote read slave |
| | | | 1 | The channel may be used as a remote read slave |
| | | 7 | Enable operation as remote write slave | |
| | | | 0 | The channel can not be used as a remote write slave |
| | | | 1 | The channel may be used as a remote write slave |
| | | 8 | Reserved | |
| | | 9–10 | Size of descriptor list and data buffer pages: | |
| | | | 00 | no address translation, descriptor contains real address value |
| | | | 01 | 4K page size |
| | | | 10 | 16M page size |
| | | | 11 | Reserved |
| | | 11–12 | Number of address translation levels used | |
| | | | 00 | 1 level |
| | | | 01 | 2 levels |
| | | | 10 | 3 levels |
| | | | 11 | 4 levels - 4K page size required |
| | | 13–14 | Channel group | |
| | | | 00 | Channel is not part of a channel group (the linked channel field is not valid) |
| | | | 01 | Anchor channel for a channel group (the linked channel field is valid) |
| | | | 10 | Part of a channel group but neither anchor nor last (the linked channel field is valid) |
| | | | 11 | Last channel in a channel group (the linked channel field is not valid) |
| | | 15 | Reserved | |
| channel status | 16 | Provides status information about the channel. This field is managed by the adapter and is not be directly written by software. | | |
| | | 0 | Reserved | |
| | | 1 | Set by hardware if a nonfatal condition permitted by interrupt control bit 0 is detected. Software resets the bit using the clear condition command. | |
| | | 2 | Reserved | |

TABLE 11-continued

Non-reserved LMT Fields

| Field | Bits | Significance |
|---|---|---|
| | 3 | Set if user has temporarily suppressed local processor interrupts for nonfatal conditions. The bit is controlled by the enable interrupt and suppress interrupt user commands. It does not suppress interrupts due to fatal conditions. |
| | 4–5 | Interrupt state<br>00 No interrupt pending and not waiting for clear condition command<br>01 Channel on interrupt queue waiting for read interrupt queue command<br>10 Processed read interrupt queue, waiting for clear condition, no pending interrupt<br>11 Processed read interrupt queue, waiting for clear condition, have pending interrupt |
| | 6–8 | Reserved |
| | 9–11 | Identifies the current channel state<br>000 invalid - the channel ignores any user command and discards any incoming packet plus returns a nonfatal channel unavailable condition to a request packet - this is the only state from which software should normally issue the read LMT or write LMT commands - a channel that is part of a channel group but in the invalid state forwards an incoming packet targeted to the group to the next channel within the group for processing<br>001 valid - user commands and packet transfers are allowed<br>010 stopping - hardware has received the privileged command stop channel and is finishing activity - enters stopped state when activity is completed<br>011 stopped - does not initiate any outgoing request or unreliable packets - incoming packets are discarded plus it returns a fatal channel stopped condition to a request packet - while in this state software may issue the read LMT command or update select fields with the write LMT command<br>100 resetting - hardware has received the privileged command reset channel and is finishing activity - it enters the invalid state when activity is completed |
| | 12–15 | Set by hardware if a fatal condition is detected. A processor interrupt is generated and the channel placed in an interrupt queue if this field is non-zero and bit 0 is inactive. Software uses the write LMT command to reset this field. The field holds the completion code identifying the type of condition encountered. While this field is non-zero, the hardware does not initiate any outgoing packet, discards any start message command and discards any incoming request packet returning a channel unavailable condition to the sender. See elsewhere for a description of individual fatal conditions. |
| interrupt control | 12 | This field controls the generation of processor interrupts.<br>0 Set to enable local processor interrupts for nonfatal conditions<br>1–3 Reserved<br>4–11 Establishes the interrupt level used by this channel |
| user key | 32 | Set by software to indicate the channel's user key value. All Message Passing operations have identical user key values in both the sending and receiving sides or one of the two fields has a universal key value of all ones. The sending side includes its user key value in all outgoing packets. The receiving side discards any packet received with an incorrect key value and returns to the sender an indication that this has happened. There is no indication recorded in the receiving side that this has happened. The sending side records a channel unavailable condition. |
| descriptor offset | 48 | Software uses this field to define the initial descriptor byte offset within the Message Passing address space for this channel prior to the first start message command issued to the channel. Hardware updates the field as it processes the descriptor list. When hardware completes its processing, the field points to the descriptor with an end of list condition. Note: Hardware may maintain a cached version of this field while processing a descriptor list and might not update the LMT contents until processing has completed.<br>Note: The four least significant bits of this field are 0000. |
| translation table origin | 52 | The most significant real address bits of the first address translation table to be accessed. The remaining 12 bits of the table origin is zero. |
| linked channel | 16 | If the channel group mode field bits are 01 or 10 this field identifies the next channel in a linked list of channels comprising a channel group. The field is ignored if the bits are 00 or 11. |
| maximum offset | 36 | Indicates the largest offset value allowed within a descriptor. It is given in units of 4K bytes. |

TABLE 11-continued

Non-reserved LMT Fields

| Field | Bits | Significance |
|---|---|---|
| DS | 4 | This Descriptor Sequence field is used to match incoming response packets with outgoing request packets. The field is set to 0 when the adapter is initialized and is incremented by the adapter when the first request packet for an operation is generated. All request packets include the incremented sequence value as do all of the associated response packets. Reserved fields record the logical ID, remote channel, and descriptor sequence values of all expected responses. Any response received with a value not expected is discarded. Software does not modify this field. |

The hardware manages two work queues and one interrupt queue per interrupt level. The channel number of the first channel in a queue is saved in a hardware register. The LMT entry associated with that channel includes a reserved field identifying the next channel in the queue. In the presently preferred design, a channel is contained in at most two queues, a work queue and an interrupt queue.

The detailed contents of the areas marked "reserved" are dependent on the particular implementation. It is not useful to server software and its detailed definition is therefore not included in the architecture. However, there are certain functions performed by fields in this section. These functions include:

1. maintenance of the work queue linked list and the interrupt queue linked list;
2. a time out mechanism for reception of a response packet;
3. record cached version of real address of descriptor and data buffer along with cached translation table entries;
4. record current offset in data buffer (source/target of push/pull, master of remote read/write);
5. record current count of number of bytes received from a remote server (target of push/pull);
6. record additional number of bytes in data buffer to send (source of push/pull, master of remote write, slave of remote read);
7. record additional space available in data buffer for receive (target of push/pull);
8. record remote adapter ID and channel (target of push, source of pull, remote read slave);
9. record all logical ID, channel, and descriptor sequence values needing a response maintenance of number of bytes requested from remote server (remote read slave);
10. maintenance of number of bytes requested from remote server (remote read slave)
11. record the number of unprocessed step message commands received maintenance of the pull, descriptor and data sequence numbers;
12. maintenance of the pull, descriptor and data sequence numbers.

Address Translation Table

For a depiction of the layout format for a Translation Control Element (TCE) field entry see FIG. 18 and Table 12 below:

TABLE 12

| Field | Bits | Significance |
|---|---|---|
| page pointer | 52 | This field, in a level 1 TCE, provides the most significant bits of the translated real addresses. The field, in a level 2, 3 or 4 TCE provides the most significant bits of the |

TABLE 12-continued

| Field | Bits | Significance |
|---|---|---|
|  |  | next TCE table in the translation process. The entire field is used when accessing 4K pages. Only the most significant 40 bits are used when accessing 16M pages. Unused bits should be set to zero by software. |
| flags | 12 | The following flags bits are defined: (if no bit is set then the entry is not valid)<br>0 set if the page may contain descriptors<br>1 set if the page may source data transfers<br>2 set if the page may sink data transfers<br>3–11 reserved<br>Note: this field is only used in a level 1 TCE. |

The address translation table resides in the node's memory and is used by the message passing hardware to translate a virtual address or buffer offset contained within the LMT or descriptor list into a real address value. An entry in this table is referred to as a TCE or Translation Control Element. The table is used to reference memory allocated in page sizes of 4K or 16M bytes. The table itself is contained in 4K byte pages. The same general format with 8 byte entries is used for level 1, 2, 3, and 4 tables. However the flags field is only used in level 1.

Software setting up the translation table sets individual flag bits to restrict the type of access permitted to the page or may enable any of type access by setting multiple bits.

There are some situations where it is permissible and desirable to directly use real address values in the LMT and descriptor list. A mode setting in the LMT enables such behavior. When set, it indicates that the channel is under control of an application capable of generating real address values and that the translation table should not be used. The memory protection functions provided by the table, including the TCE flags field, are obviously not available in this mode.

Hardware caches translation table entries while controlling a channel. Software modifies the address table only if that channel is in the invalid or stopped state. Software uses the privileged control commands identified above to change the channel's state.

Address translation can fail, resulting in a fatal failed to start or failed to complete condition, because:

1. a descriptor offset value is greater than what's allowed in the LMT;
2. a buffer offset value is greater than what's allowed in the LMT;
3. fetching a descriptor but the TCE prohibits descriptors;
4. fetching data but the TCE prohibits fetching data;
5. storing data but the TCE prohibits storing data;

6. a descriptor is not placed on an 16 byte address boundary; or
7. a descriptor straddles a page boundary.

Descriptor List

Most channels point to a list of descriptors defined by software and sequentially processed by the hardware. Descriptors provide detailed information about how data buffers in local memory are organized and how information is transferred between servers. Individual descriptors preferably start on a 16 byte memory boundary, use 16 or 32 bytes of memory and do not straddle a page boundary. The present section describes each type of descriptor as identified by a unique four bit code in the descriptor's type field. See the table below:

TABLE 13

| Descriptor | Code | Function |
| --- | --- | --- |
| remote write | 0010 | control remote read/write operations |
| remote read | 0011 | |
| preload data | 1000 | identify buffers involved in push operation |
| source of push | 0100 | |
| target of push | 0101 | |
| source of pull | 0110 | identify buffers involved in pull operation |
| target of pull | 0111 | |
| branch | 0001 | manage descriptor list |

All operations require channels to be defined in both of the adapters involved in a data transfer. Descriptor lists are defined for each channel involved in a push or pull operation or when the master channel controls a remote read/write operation. Channel activity starts either when software issues a start message command or when a packet is received referencing that channel. Once started, a channel continues to fetch and process individual descriptors until it either encounters an end of list condition, which is a non-"1111" condition code, or it is waiting for data from another channel. If the descriptor cannot be processed, the channel suspends operations until a subsequent event restarts the channel. If a packet is received that cannot be processed by the local descriptor, then that packet is rejected, and if the packet used a reliable protocol an appropriate response is returned to the issuing channel.

Hardware presents software with the perception that it processes a descriptor list strictly in the order presented by software. However, memory buffers serving as targets for data transfers may physically be updated in any order. The hardware updates a given descriptor only after all associated data stores are complete. The hardware also update a sequence of descriptors only in the sequence established by software. The perception of in-order-processing requires that software examine targeted data areas only after it is observed that the associated descriptor processing is complete. Software looking directly at data buffers may view out-of-order activity. This actual out-of-order-processing is caused by hardware attempting to speed things up by starting new descriptors before the results of previous operations are determined. The difference between perception and reality may become visible when fatal conditions occur. A fatal condition shuts down a channel and generates a processor interrupt; however, it is possible that the hardware has already started processing additional descriptors beyond the point of failure.

Hardware may cache LMT or memory information while processing a channel. Software insures that it doesn't modify a channel's LMT entry, TCE value, descriptor, or memory buffer while such caching is active. The hardware purges its cache of descriptor information when it detects an end of list condition. Software does not modify the LMT entry using the privileged LMT write command after it issues a start message or step message command until hardware has completed all processing of the descriptor list. It may not modify a descriptor entry until hardware has set that descriptor's Completion Code field or has reported a fatal condition preventing further processing of that channel. A descriptor with a non-"1111" condition code field is used to end a descriptor list. This end of list condition is changed, using the procedure identified below, to add new descriptors to the list. Translation tables and/or memory buffers are changed as soon as all descriptors that use them are completed.

The process for adding additional descriptors to an active list relies on the circumstance that the original list ends with an end of list condition. Software maintains this condition until it constructs the new information being appended to the list. It then modifies the end of list condition to a new descriptor type and/or condition code field. If this channel is

TABLE 14

| | Triggering Event | | |
| --- | --- | --- | --- |
| Descriptor fetched | Process local start message or finish previous descriptor | Receive remote start | Receive push/pull data |
| branch | process descriptor | process descriptor | process descriptor |
| remote write | process descriptor | reject packet | reject packet |
| remote read | process descriptor | reject packet | reject packet |
| preload data | process descriptor | reject packet | reject packet |
| source of push | process descriptor | reject packet | reject packet |
| target of push | suspend channel | reject packet | process descriptor |
| source of pull | function of remote start flag | process descriptor | reject packet |
| target of pull | function of remote start flag | reject packet | process descriptor | controlling the transfer, meaning the list contains a source of push, target of pull, remote read, or remote write type descriptor, then software preferably issues another start message command to insure that the hardware recognizes the modification.

All descriptors share a common set of field definitions, although not all fields or bit definitions are used by all descriptor types. The Completion Code field is of special interest. It is used with all descriptors that are involved in data exchanges. When software constructs a descriptor, it sets this four bit field to "1111." Hardware then changes the field to another value when it completes processing the descriptor. A code of "1111" indicates that the operation has not yet completed and a code of "0000" indicates that it did complete successfully. The remaining codes indicate some level of exception condition with the severity generally increasing as the code point value increases. See below for an indication of the failures that set each code. Nonfatal conditions set the code in the descriptor completion code field. Fatal error conditions set the code in the channel's LMT channel status field.

TABLE 15

| Code | Condition | Severity | Set in descriptor | Set in LMT channel status |
|---|---|---|---|---|
| 1111 | not finished | none | yes | no |
| 0000 | completed | nonfatal | yes | no |
| 0001 | insufficient space | nonfatal | yes | no |
| 0010 | channel unavailable | nonfatal | yes | no |
| 0011 | connection failure | nonfatal | yes | no |
| 0100 | failed to start | fatal | no | yes |
| 0101 | failed to complete | fatal | no | yes |

TABLE 15-continued

| Code | Condition | Severity | Set in descriptor | Set in LMT channel status |
|---|---|---|---|---|
| 0110 | channel failure | fatal | no | yes |
| 0111 | channel stopped | fatal | no | yes |

The flag field associated with most descriptors includes bits defined by software to control the marking function and/or indicting when a processor interrupt should be generated. The field also includes status information established by hardware when the descriptor operation completes. Software is required to initialize these bits to a "0" value. The hardware does not verify this and produce incorrect status information if software doesn't correctly initialize them.

Most descriptors include a byte count field established by software. Software should not set this field to a zero value. If it does, the hardware is designed to report a fatal failed to start or failed to complete condition if it detects a zero byte count value in an otherwise acceptable descriptor. It also reports a fatal failed to start or failed to complete condition if the LMT mode field indicates that the channel is restricted to a single packet per descriptor and the byte count field contains a value greater than 2,048.

Many descriptor types include fields labeled unused or reserved. The present adapter does not check, use a modify a field labeled unused. In the presently preferred implementation, the adapter assumes that a field labeled reserved is set by software to a zero value. The adapter described herein is not required to verify that reserved fields are correctly initialized and may not operate as expected if they are not correctly initialized.

Remote Write

TABLE 16

| Field | Bits | Significance |
|---|---|---|
| type | 4 | Always set to 0010 by software for a remote write type of descriptor. |
| CC | 4 | This Completion Code field is set to 1111 by software and modified by the hardware when it finishes using the descriptor. The defined codes are:<br>1111 the hardware has not finished processing the descriptor<br>0000 the hardware has completed processing the descriptor and did not detect any special condition<br>0010 the operation failed because of a nonfatal channel unavailable condition - the remote channel was marked invalid, did not have the correct user key value, or was in a fatal error state - the remote channel has not been affected by this failure - local processing continues with the next descriptor<br>0011 the operation failed because of a nonfatal connection failure condition - the hardware was unable to communicate with the remote adapter - the status of the remote adapter is unknown — local processing continue with the next descriptor |
| flags | 8 | The following flags bits are defined:<br>0 reserved<br>1 set by software to interrupt the local server after the operation completes<br>2-7 reserved |
| local data offset | 48 | Set by software to indicate the byte offset within the local channel's address space of the area to obtain data. The hardware uses the translation table associated with the local channel to translate this value to a real memory address value. |
| target channel | 16 | Set by software to indicate the channel number in the remote server that defines the message passing address space within that server. |
| target ID | 12 | Set by software to the logical ID of the remote adapter targeted to receive the data. |

TABLE 16-continued

| Field | Bits | Significance |
| --- | --- | --- |
| byte count | 36 | The number of data bytes to be transferred. The field may not contain a zero value. |
| remote data offset | 48 | Set by software to indicate the byte offset within the remote channel's address space where data is placed. The hardware uses the translation table associated with the remote channel to translate this value to a real memory address value within the remote server. |

A remote write type of descriptor occupies 32 memory bytes and is used by software to identify both the local memory buffer providing data for the transfer and the remote memory area that is modified. The remote adapter has a channel established that defines the address space available for the operation. The local remote write descriptor is completed when all of the data it provides is transmitted to the remote adapter and a response is received indicating that the data was successfully placed in memory or indicating the reason for failure. The local descriptor completion code field, CC, is updated with the final status of the operation. See Table 16 above.

The actual data transfer is initiated when software within the local server issues a start message command or all previous descriptors on the list have completed.

Remote Read

A remote read type of descriptor occupies 32 memory bytes and is used by software to identify both the remote memory buffer providing data for the transfer and the local memory area that is modified. The remote adapter has a channel established that defines the address space available for the operation. When the local adapter has received all of the remote data and/or has completed it's processing, it updates the completion code field indicating if the transfer was successful.

Remote read operations involving multiple packets require the channel providing the data be dedicated to that operation until it is completed. Any third party attempt to use the channel during this busy period reports a fatal failed to start completion. A third party is defined to be any request from a different adapter or from a different channel. This busy period starts from the time the targeted channel receives a packet requesting data to the point that the channel transmits the last byte of data requested.

The actual data transfer is initiated when software within the local server issues a start message command or when all previous descriptors on the list have completed.

TABLE 17

| Field | Bits | Significance |
| --- | --- | --- |
| type | 4 | Always set to 0011 by software for a remote read type of descriptor. |
| CC | 4 | This Completion Code field is set to 1111 by software and modified by the hardware when it finishes using the descriptor. The defined codes are:<br>1111 The hardware has not finished processing the descriptor<br>0000 The hardware has completed processing the descriptor and did not detect any special condition<br>0010 The operation failed because of a nonfatal channel unavailable condition - the remote channel was marked invalid, did not have the correct user key value, or was in a fatal error state - the remote channel has not been affected by this failure - local processing continues with the next descriptor<br>0011 The operation failed because of a nonfatal connection failure condition - the hardware was unable to communicate with the remote adapter - the status of the remote adapter is unknown - local processing continue with the next descriptor |
| flags | 8 | The following flags bits are defined:<br>0 Reserved<br>1 Set by software to interrupt the local server after the operation completes<br>2–7 Reserved |
| local data offset | 48 | Set by software to indicate the byte offset within the local channel's address space available to receive data from the remote adapter. The hardware uses the translation table associated with the local channel to translate this value to a real memory address. |
| source channel | 16 | Set by software to indicate the channel number in the remote server that defines the message passing address space within that server. |
| source ID | 12 | Set by software to the logical ID of the adapter that provides data for the transfer. |
| byte count | 36 | The number of data bytes to be transferred. The field may not contain a zero value. |
| remote data offset | 48 | Set by software to indicate the byte offset within the remote channel's address space where data is obtained. The hardware uses the translation table associated with the remote channel to translate this value to a real memory address value within the remote server. |

Source of Push

TABLE 18

| Field | Bits | Significance |
| --- | --- | --- |
| type | 4 | Always set to 0100 by software for a source of push descriptor. |
| CC | 4 | This Completion Code field is set to 1111 by software and modified by the hardware when it finishes using the descriptor. The defined codes are:<br>1111 Operation has not finished<br>0000 Operation completed successfully<br>0001 Operation failed due to a nonfatal insufficient space condition - the local descriptor had more data than the remote adapter could process before detecting an end of list condition or a descriptor other than branch or target of push - the extra data is discarded with no indication of how much is discarded - local processing continues with the next descriptor (Note: data discarded because of receive side marking does not use this completion code)\*\*\*<br>0010 The operation failed because of a nonfatal channel unavailable condition; the remote channel is marked invalid, didn't have the correct user key value, or was in a fatal error state; this failure does not affect the remote channel; local processing continues with the next descriptor \*\*\*<br>0011 the operation failed because of a nonfatal connection failure condition; the hardware is unable to communicate with the remote adapter; the status of the remote adapter is unknown; local processing continues with the next descriptor\*\* |
| flags | 8 | The following flags bits are defined:<br>0 Reserved<br>1 Set by software to interrupt the local server after the operation completes<br>2 Reserved<br>3 Reserved<br>4 Set by software when the local buffer is marked.<br>5 Reserved<br>6 Reserved<br>7 Set by hardware if receive side marking discarded data\*\*\* |
| data offset | 48 | Set by software to indicate the byte offset within this channel's address space of the data to be transmitted to the remote adapter. The hardware uses the translation table associated with this channel to translate this virtual offset value to a real memory address value. |
| target channel | 16 | Set by software to indicate the channel number in the adapter targeted to receive the data. |
| target ID | 12 | Set by software to indicate the logical ID of the adapter targeted to receive the data. |
| byte count | 36 | Set by software to indicate the number of bytes to be transmitted to the target. The field may not contain a zero value. |

With respect to Table 18 above, the code point marked with "\*\*\*" is not used with the unreliable transmission protocols (as indicated in the channel's LMT mode field). Also, bits and/or code points marked with "\*\*\*" are not used with the unreliable or the reliable delivery transmission protocols (also as indicated in the channel's LMT mode field).

A source of push descriptor occupies 16 bytes in memory and is used by software to identify the local memory buffer providing data to be transmitted to a remote adapter during a push operation. The transfer is started when software within the local server issues a start message command to the channel referencing this descriptor. The descriptor identifies the remote adapter and channel number that receive the data. That channel contains one or more target of push type descriptors. The local source of push descriptor is completed when all of the data it provides is transmitted to the remote adapter and, if using the reliable acceptance mode, a response is received from the remote adapter. At this point, the local descriptor completion code field, CC, is updated with an indication that the data was successfully placed in the target's memory or identifies the reason for failure.

A source of push descriptor is preferably used only with a remote adapter processing a target of push type descriptor.

The entire push operation may use multiple descriptors in either or both sides of the transfer. It is not necessary that both sides use the same number of descriptors. Send side marking is used to transfer less data to the target than is specified in the target of push descriptor. Receive side marking is used by the remote server to limit the amount of data the target of push descriptor accepts. There is no indication recorded in either side's descriptor of how much data is discarded, if any, due to receive side marking.

It is not necessary that all source of push descriptors for a given channel identify the same target. Each descriptor sends data to a different adapter or different channel.

Setting the local buffer is marked flag bit invokes the send side marking function. This causes the target of push descriptor to be completed as soon as it updates memory with the last data byte associated with the source of push descriptor regardless of the amount of additional buffer space available.

The actual data transfer is initiated when software within the local server issues a start message command or when the processing of all previous descriptors on the list is completed. The hardware typically starts sending data for a subsequent descriptor before receiving a response to data already sent. The hardware updates the completion code fields associated with sequential descriptors in the order software created the list.

A source of push descriptor uses any type of transmission reliability. The type selected is indicated by the channel's LMT mode field. When using unreliable transmissions, the descriptor is marked completed as soon as all the data it provides is transmitted. When using the reliable delivery mode, the descriptor is marked completed only after receiving an echo packet from the targeted adapter for every data packet sent by the source of push. When using the reliable acceptance mode, the descriptor is marked completed only after receiving an echo packet from the targeted adapter for every data packet sent and after receiving a response packet indicated that the target has updated memory. See above for information related to reliability modes, as described herein. The type of reliability used also influences which condition codes and flag bits are set by the hardware.

When a channel uses the unreliable mode, software may invoke the broadcast function by setting the target ID to the special broadcast ID value of all one's. This causes the operation to be sent to all remote adapters directly attached to the switch. See above for information about broadcast operations.

Target of Push

A target of push descriptor occupies 16 bytes in memory and is used by software to identify the local memory buffer used to receive data during a push operation initiated by a remote server. The transfer is started when software within the remote server issues a start message command to the channel having one or more source of push type descriptors. The local target of push descriptor is completed when all of its buffer space is used for incoming data or when the incoming data is marked. At this point, the local descriptor completion code field, CC, is updated with an indication that the data has been successfully placed in local memory or identifies the reason for failure and the descriptor is updated with an indication of the sending adapter's logical ID and channel number.

A target of push descriptor is only used with a remote adapter processing a source of push type descriptor. The entire push operation may use multiple descriptors in either or both sides of the transfer. It is not necessary that both sides use the same number of descriptors. Send side marking may cause the target of push descriptor to be completed without using all of the data area allocated by software. Hardware updates the byte count field with the number of bytes actually used. Receive side marking is used by the local server to limit the amount of data the target of push descriptor accepts. There is no indication recorded in either

TABLE 19

| Field | Bits | Significance |
|---|---|---|
| type | 4 | Always set to 0101 by software for a target of push type of descriptor. |
| CC | 4 | This Completion Code field is set to 1111 by software and modified by the hardware when it finishes using the descriptor. The defined codes are:<br>1111 The operation has not finished.<br>0000 The operation completed successfully.<br>0011 The operation failed because of a nonfatal connection failure condition; the hardware was unable to communicate with the remote adapter; this may be the result of not being able to send a response back to the source when necessary or not receiving the next packet of a multi-packet transfer within a reasonable time; the status of the remote adapter is unknown; local processing continues with the next descriptor. |
| flags | 8 | The following flags bits are defined:<br>0 Reserved<br>1 Set by software to interrupt the local server after the operation completes.<br>2 Reserved<br>3 Reserved<br>4 Set by software when the local buffer is marked<br>5 Reserved<br>6 Reserved<br>7 Set by hardware if receive side marking (bit 4 is active) discarded data |
| data offset | 48 | Set by software to indicate the byte offset within this channel's address space of the area available to receive data from another adapter. The hardware uses the translation table associated with this channel to translate this value to a real memory address. |
| source channel | 16 | Set by hardware to indicate the remote channel that initiated the transfer. If multiple channels are involved in providing data, only the last is recorded. |
| source ID | 12 | Set by hardware to indicate the logical ID of the remote adapter that initiated the transfer. If multiple remote adapters are involved in providing data, only the last is recorded. |
| byte count | 36 | Set by software to indicate the number of bytes available in the memory area referenced by the data pointer. The field does not contain a zero value. Hardware modifies the field after the transfer to indicate the actual amount of space used. | side's descriptor of how much data is discarded, if any, due to receive side marking.

Setting the local buffer is marked flag bit invokes the receive side marking function. After the space defined by the target of push descriptor is exhausted, the hardware discards any additional data associated from the active source of push descriptor. If data is discarded the receive side marking discarded data flag bit is set in the target of push descriptor, and if using the reliable acceptance mode, it is also set in the source of push descriptor.

Push operations involving multiple packets assume that the channel receiving the data is dedicated to that operation until the push is completed. Any third party attempt to use the channel during this busy period is ignored with a fatal failed to start completion reported in the third party descriptor if using the reliable acceptance mode. A third party is defined to be any request from a different adapter or a different channel. This busy period starts from the time the channel receives the first data packet provided by a source of push descriptor to the point all of the data provided by that descriptor is transferred and the target of push descriptor is updated. If the transfer does not use all the space provided by the target of push descriptor, and send side marking is not used, then the busy period is indefinitely extended until some initiating channel does provide sufficient data or until software deallocates the target of push channel.

A target of push descriptor may use any type of transmission reliability. If an unreliable packet is received, the hardware processes the information without returning either an echo or a response packet. If a reliable request packet is received, the hardware returns an echo and, if the LMT mode field indicates usage of the reliable acceptance protocol, the hardware also generates a response packet after updating memory with all the information sent from the same source of push descriptor. Reliable transfers assume that both sides of the operation use the same type of reliability. See above for relevant more information pertaining to reliability modes.

A target of push descriptor in a channel using unreliable transmission protocols may receive a broadcast operation. The descriptor receiving a broadcast operation is updated by hardware in a manner similar to that when processing non-broadcast unreliable operations except that the source ID field is set to the special broadcast ID value of all ones. See above for relevant information pertaining to broadcast operations.

Source of Pull

TABLE 20

| Field | Bits | Significance |
|---|---|---|
| type | 4 | Always set to 0110 by software for a source of pull type of descriptor. |
| CC | 4 | This Completion Code field is set to 1111 by software and modified by the hardware when it finishes using the descriptor. The defined codes are:<br>1111 operation has not finished<br>0000 operation completed successfully - data has been delivered to the target adapter<br>0001 Operation failed due to a nonfatal insufficient space condition - the local descriptor had more data than the remote adapter could process before detecting an end of list condition or a descriptor other than branch or target of pull - the extra data is discarded with no indication of how much is discarded - local processing continues with the next descriptor (note: data discarded because of receive side marking does not use this completion code)***<br>0011 the operation failed because of a nonfatal connection failure condition - the hardware was unable to communicate with the remote adapter - the status of the remote adapter is unknown - local processing continue with the next descriptor |
| flags | 8 | The following flags bits are defined:<br>0 reserved<br>1 set by software to interrupt the local server after the operation completes<br>2 set by software if a remote start packet is required to start descriptor processing<br>3 reserved<br>4 set by software when the local buffer is marked.<br>5 reserved<br>6 reserved<br>7 set by hardware if receive side marking discarded data*** |
| data offset | 48 | Set by software to indicate the byte offset within this channel's address space of the data to be transmitted to the remote adapter. The hardware uses the translation table associated with this channel to translate this value to a real memory address value. |
| target channel | 16 | Set by hardware to indicate the remote channel that initiated the pull operation. |
| target ID | 12 | Set by hardware to the logical ID value of the adapter that initiated the pull operation. |
| byte count | 36 | The number of bytes in the local memory buffer to be transmitted to the target. The field does not contain a zero value. | the code point marked with *** is not used with the reliable delivery transmission protocol A source of pull type descriptor occupies 16 bytes in memory and is used by software to identify the local memory buffer providing data requested by a remote server initiating a pull transfer. The transfer is started when software within the remote server issues a start message command to a channel having one or more target of pull type descriptors in which the first generates a remote start packet. The source of pull descriptor is completed when all of the buffer space associated with it has been successfully delivered to the requesting adapter and, if using the reliable acceptance mode, a response is received from that adapter. At this point, the local descriptor completion code field, CC, is updated with the requesting adapter's logical ID and channel number.

A source of pull descriptor is only be used with a remote adapter processing a target of pull type descriptor. The entire pull operation may use multiple descriptors in either or both sides of the transfer. It is not necessary that both sides use the same number of descriptors. Send side marking may be used to transfer less data to the target than specified in the target of pull descriptor. Receive side marking may be used by the remote server to limit the target of pull descriptor hardware accepts. There is no indication recorded in either side's descriptor of how much data is discard, if any, due to receive side marking.

Setting the remote start flag bit prevents processing the descriptor until the remote start packet is received from the adapter initiating the operation. This enables software to add additional descriptors to an active list but prevents hardware processing of the new descriptors until software on the target side creates the target of pull descriptors necessary to receive the data. Software building the target of pull descriptors sets an equivalent flag in the first target of pull descriptor to generate the required remote start packet.

Setting either the local buffer is marked or the interrupt the remote server flag bit invokes the send side marking function. This causes the target of pull descriptor to be completed as soon as it updates memory with the last data byte associated with the source of pull descriptor regardless of the amount of additional buffer space available.

Pull operations involving multiple packets assume that the channel providing the data is dedicated to that operation until the pull operation is completed. Any third party attempt to use the channel during this busy period reports a fatal failed to start condition. A third party is defined to be any request from a different adapter or a different channel. This busy period starts from the time the channel receives a remote start packet to the point it detects an end of list condition and updates all source of pull descriptors used during the operation. A source of pull descriptor with an active remote start flag encountered after the initial source of pull descriptor is considered to be the same as an end of list condition.

A source of pull descriptor uses either type of reliable transmission. The type selected is indicated by the channel's LMT mode field. When using the reliable delivery mode, the descriptor is marked completed only after receiving an echo packet from the targeted adapter for every data packet sent by the source of pull. When using the reliable acceptance mode, the descriptor is marked completed only after receiving an echo packet from the targeted adapter for every data packet sent and after receiving a response packet indicated that the target has updated memory. Both sides of the operation use the same type of reliability. See above for relevant information pertaining to broadcast operations reliability modes. The type of reliability used also influences which condition codes and flag bits are set by the hardware.

Target of Pull

A target of pull descriptor occupies 16 bytes in memory and is used by software to identify the local memory buffer used to receive data during a pull operation initiated by the local server. The target of pull descriptor identifies the remote adapter and channel number that provides the data. The transfer is started when software within the local server issues a start message command. The target of pull descriptor is completed when all of its buffer space has been used for incoming data or the incoming data is marked. At this point, the local descriptor completion code field, CC, is updated with an indication that the data is successfully placed in local memory or identifies the reason for failure.

TABLE 21

| Field | Bits | Significance |
| --- | --- | --- |
| type | 4 | Always set to 0111 by software for a target of pull type of descriptor. |
| CC | 4 | This Completion Code field is set to 1111 by software and modified by the hardware when it finishes using the descriptor. The defined codes are:<br>1111 operation has not finished<br>0000 operation completed successfully<br>0010 the remote start portion of the operation failed because of a nonfatal channel unavailable condition - the remote channel was marked invalid, did not have the correct user key value, or was in a fatal error state - the remote channel has not been affected by this failure - local processing continues with the next descriptor***<br>0011 the operation failed because of a nonfatal connection failure condition - the hardware was unable to communicate with the remote adapter - this may be the result of not being able to send a response back to the source when necessary or not receiving the next packet of a multi-packet transfer within a reasonable time - the status of the remote adapter is unknown - local processing continues with the next descriptor |
| flags | 8 | The following flags bits are defined:<br>0 reserved<br>1 set by software to interrupt the local server after the operation completes<br>2 reserved<br>3 set by software if a remote start packet is generated when processing starts |

TABLE 21-continued

| Field | Bits | Significance |
|---|---|---|
| | 4 | set by software when the local buffer is marked |
| | 5 | reserved |
| | 6 | reserved |
| | 7 | set by hardware if receive side marking (bit 4 is active) discarded data |
| data offset | 48 | Set by software to indicate the byte offset within this channel's address space of the buffer area available to receive data from another adapter. The hardware uses the translation table associated with this channel to translate this value to a real memory address. |
| source channel | 16 | Set by software to indicate the channel number providing data for the transfer. |
| source ID | 12 | Set by software to indicate the logical ID of the adapter providing data for the transfer. |
| byte count | 36 | The number of bytes in the memory area referenced by the data pointer. It is set by software to indicate how much space is available. The field may not contain a zero value. Hardware modifies the field after the transfer to indicate the actual amount of space used. |

(In the table above, the code point marked with *** is not used with the reliable delivery transmission protocol.)

A target of pull descriptor is only be used with a remote adapter processing a source of pull type descriptor. The entire pull operation uses multiple descriptors in either or both sides of the transfer. It is not necessary that both sides use the same number of descriptors. Send side marking can cause the target of pull descriptor to be completed without using all of the data area allocated by software. Hardware updates the byte count field with the number of bytes actually used. Receive side marking is also used by the local server to limit the amount of data the target of pull descriptor accepts. There is no indication recorded in either side's descriptor of how much data is discarded, if any, due to receive side marking.

Setting the remote start flag bit causes the adapter to send a remote start packet to the channel containing the source of pull descriptor before waiting for that channel to subsequently provide data. The first descriptor in the list has the remote start bit set as should the first descriptor of any new set of descriptors added to the list while the channel is active. Failure to set this bit causes channel activity to be suspended without starting the pull operation. A remote start issued to a channel that cannot find a source of pull descriptor results in a fatal failed to start condition being reported in the target channel.

Setting the local buffer is marked flag bit invokes the receive side marking function. After the space defined by the target of pull descriptor is exhausted, the hardware discards any additional data associated from the active source of pull descriptor. If data is discarded the receive side marking discarded data flag bit is set in the target of pull descriptor, and if using the reliable acceptance mode in the source of pull descriptor.

Pull operations involving multiple packets require that the channel receiving the data be dedicated to that operation until the pull is completed. Any third party attempt to use the channel during this busy period reports a fatal failed to start completion. A third party is defined to be any request from a different adapter or a different channel. This busy period starts from the time the channel either issues a remote start packet or receives the first data packet provided by a source of push descriptor to the point all of the data provided by that descriptor is transferred and the target of pull descriptor is updated. If the transfer does not use all the space provided by the target of pull descriptor, and send side marking is not used, then the busy period is extended indefinitely until some initiating channel does provide sufficient data or until software deallocates the target of pull channel.

A target of pull descriptor uses either type of reliable transmission. The type selected is indicated by the channel's Local mapping table mode field. Both sides of the transfer use the same mode. For either reliability mode, an echo is returned for each packet received. If the reliable acceptance mode is used, a response packet is generated after processing all packets associated with the same source of pull descriptor and a response packet is generated if a remote start packet cannot be processed. See above for information relevant to reliability modes.

Preload Data

TABLE 22

| Field | Bits | Significance |
|---|---|---|
| type | 4 | Always set to 1000 by software for a preload data type of descriptor |
| byte count | 36 | Set by software to indicate the number of bytes to be transmitted to the target. |
| data offset | 48 | Set by software to indicate the byte offset within this channel's address space of the data to be transmitted to the remote adapter. The hardware uses the translation table associated with this channel to translate this virtual offset value to a real memory address value. |

A preload data type of descriptor uses 16 memory bytes and is used to identify one of two disjoint memory segments that is to be transmitted to a remote adapter as a single packet. The descriptor is followed by a source of push descriptor that identifies both the last region to be transmitted and the normal condition code, flags, target channel and target ID fields. In the presently preferred implementation, up to two branch descriptors may be placed between the preload data and source of push descriptors.

The combination of preload data and source of push descriptors is intended to be used when the target channel is shared by multiple sources and it is desired that the data be gathered from two separate memory regions. Constraints which are imposed on software when sharing a receive channel, one of which is that software understands and controls how individual packets are constructed, are described below. A single packet does not include data from multiple source of push descriptors. However, it can be constructed from a preload data descriptor followed by a source of push descriptor if the total amount of data specified does not exceed 2,048 bytes. The packet may use either the reliable or unreliable transmission protocol and if unreliable may use the broadcast function if desired. This combination can be thought of as effectively a single descriptor capable of gathering data from multiple regions of memory and producing a single message passing packet.

A fatal failed to start condition is reported if the preload data descriptor references more than 2,047 data bytes or if a source of push descriptor is not found after the preload data or if the combination of preload data and source of push reference more than 2,048 bytes when using unreliable transmission protocols.

Branch

TABLE 23

| Field | Bits | Significance |
|---|---|---|
| type | 4 | Always set to 0001 by software for a branch type descriptor |
| descriptor offset | 48 | Set by software to indicate the byte offset within the message passing address space of the next descriptor element. The hardware uses the translation table associated with this channel to translate this virtual offset value to a real memory address value.<br>Note: the 4 least significant bits of this field are 0000. |

A branch uses 16 memory bytes and indicates an alternative address for the next descriptor to be processed. After completing a given descriptor, the hardware normally fetches the next descriptor from the virtual memory address immediately following the one just completed. A branch descriptor modifies this pattern. It indicates the offset within the channel's address space of the next descriptor. The presence of more than two consecutive branch descriptors invokes a failed to start condition.

Every adapter includes a path table containing one entry for every remote adapter with which it communicates. This may be a subset of the total number of adapters in the system. The table records the status and characteristics associated with individual connections including information about the four routes available for sending packets to a given target. The table is indexed by a logical ID value obtained either from the target ID field within a local descriptor or from the source logical ID field of a packet received from another adapter. The logical ID is a value from 0 to the maximum number of logical ID values supported by the adapter. A special logical ID value of all one's represents a broadcast ID used only during broadcast operations (see above). The broadcast operations do not use the path table (nor the route table). They instead use the Broadcast Registers described elsewhere herein.

The valid bit indicates if the there is information defined for this logical ID value. Any operation referencing a logical ID value having a valid bit value of "0" reports a failed to start condition (see below). When possible, the adapter sends packets using a randomly selected path among the four paths provided. (The number of paths is a design choice and does not constitute a critical aspect of the present invention.) This spreads work over several paths reducing fabric congestion and improving overall performance. All unreliable packets are sent with a randomly chosen path. Reliable packets insure in-order delivery and thus use a random path only if the adapter is not waiting for any echo packet from the target on the intended virtual lane. Reliable packets otherwise use the same route used by last packet sent to that target. The current path bits identify this last path used by a reliable request or response packet. The random algorithm selects among the preferred paths that have not encountered a path failure if possible (see below). Other paths are tried only if necessary to avoid reporting a connection failure (see below).

Path Table

| Field | Bits | Significance |
|---|---|---|
| flags | 14 | The following flags bits are defined:<br>0–1 Current path A - last path used by a reliable request packet (virtual lane 5)<br>2 Valid - any use of this logical ID reports a failed to start condition unless this bit is "1"<br>3 Unused<br>4–7 Identifies paths that are preferred<br>8–11 Identifies paths that have encountered a path failure<br>12–13 Current path B - last path used by a reliable response packet (virtual lane 6) |
| logical ID | 12 | The logical ID (path table entry) of this adapter in the target adapter. This field is included in all message passing packets sent to the target. It tells the receiving adapter the path back to this sending adapter. It also identifies the send, receive and echo sequence numbers used to insure in-order packet delivery. The receiving adapter also records this value in the descriptor associated with a target of push operation or a source of pull operation.<br>Note: One embodiment of the present invention implements only 10 bits for this field forcing the high order 2 bits to '00'. Another embodiment of the present invention also only implements 10 bits of this field setting the high order 2 bits to the value found in bits 4–5 of the physical ID register. |
| physical ID | 16 | The physical ID value assigned to the target adapter. Each adapter is assigned a system wide unique value by the service processor and service network. This field is included in all packets sent to the target from the local server. The receiver discards any incoming packet that does not have the correct physical ID value for that adapter. |

The logical ID value obtained from the Path Table is the designation that a remote adapter and software using that adapter use to reference the local adapter. This value is included in outgoing packets so that the target can identify who generated the packet. See above 16 for information relevant to logical ID values.

All packets sent from the local adapter include a field specifying the physical ID value of the intended target as obtained from the path table. The receiving adapter includes a 16 bit physical ID register uniquely identifying that adapter within the system. It discards a received packet that it determines has been misrouted. A value of all one's represents a universal ID. An adapter with this value in its physical ID register accepts all packets. A packet with this target physical ID value is accepted by all adapters.

TABLE 25

Route Table

| Field | Bits | Significance |
|---|---|---|
| 0000 | 4 | Field contains the value "0000" indicating non-adaptive, non-broadcast routing. |
| route nibbles | 13 × 4 | Field describes the exact path the packet takes through various external switches or adapters to get to the targeted adapter. There are 13 separate nibbles, starting from the left, with each containing a value from "0000" to "0111" to indicate the next switch or adapter send port in the path or the special code of "1111" indicating the end of useful information. |
| port | 8 | Field indicates which adapter output port to use.<br>00000000 send non-broadcast packets out adapter port 0<br>00000001 send non-broadcast packets out adapter port 1 |

The route table is used to define the route field for all non-broadcast packets. The table is not used for broadcast operations. They instead use the Broadcast Registers described below. The information in the route table is used to direct a packet through a particular sequence of switches, cables and adapters during non-broadcast operations (which instead use the Broadcast Registers). There are four separate routes in this table for every remote adapter that is targeted. The 56 bit route field used for all non-broadcast packets is obtained directly from bytes 0–6 of the route table for each the four possible paths.

Route table entries are defined by service processor software during adapter initialization. Service processor software can later modify selected entries while the adapter is operational through write configuration commands. However, if a series of message passing operations is simultaneously using that route table entry, the hardware may deliver a packet out of order thus invoking a packet retransmission. The retransmission is typically successful, thus avoiding a somewhat more serious path failure condition.

TABLE 26

Broadcast Registers

| Field | Bits | Significance |
|---|---|---|
| lookup table index | 16 | Field identifies the route table entry in all switch chips processing the packet. The switch chip entry defines which switch output port(s) should be used. It is an 8 bit field containing a "1" in bit positions associated with output ports that process the packet and "0" in ports that do not. |

TABLE 26-continued

Broadcast Registers

| Field | Bits | Significance |
|---|---|---|
| port | 4 | Field indicates which adapter output port to use.<br>0000 Send broadcast packets out adapter port 0<br>0001 Send broadcast packets out adapter port 1 |

Broadcast operations do not use the path or route tables associated with non-broadcast packets. Broadcast operations do not have the equivalent of the path table flags field and use hard coded equivalents of the logical ID and physical ID fields.

Broadcast packets use the broadcast ID value of all one's to specify the target logical ID. They use the universal ID value of all one's to specify the target physical ID.

The packet route field generated by the adapter during broadcast operations uses a predefined format understood by the adapter. The adapter builds the route based on a random selection among 1 of 4 broadcast registers. Bits 16–31 of the packet route field are obtained from the lookup table index field in that register. Bit 0 is set to "1" and all remaining bits of the 56 bit route field are set to "0." The adapter uses the port field in the selected broadcast register to identify the adapter's output port to launch the packet.

Broadcast operations assume that the service network initializes the route tables within each switch chip plus the broadcast registers within each adapter chip in a consistent manner.

TABLE 27

Sequence Table

| Field | Bits | Significance |
|---|---|---|
| send | 8 | The next packet sequence number to insert in a request or response packet sent to the remote adapter known locally with this logical ID value. |
| receive | 8 | The next packet sequence number to expect in a request or response packet received from the remote adapter known locally with this logical ID value. A request or response packet received with a packet sequence number equal to this value is processed and an echo packet is returned to the remote adapter. A request/response packet received with a sequence number less than this value is discarded without processing after an echo packet is generated (apparently an old echo was lost). A request or response packet received with a sequence number greater than this value is discarded without generating an echo. The echo packet includes the packet sequence number of the packet being echoed. Incoming packets include the logical ID value used by this adapter. |
| echo | 8 | The next packet sequence number to expect in an echo packet received from the remote adapter known locally with this logical ID value. The echo packet indicates whether it is echoing a request packet or a response packet. Any other packet is discarded. Incoming echo packets include the logical ID value used by this adapter. |

The sequence table is used by the message passing transport logic to insure that packets using the reliable transport protocol are transferred between adapters in a fixed reliable order. The unreliable transport protocol does not use the table. A set of sequence numbers is maintained for every virtual lane. (A virtual lane is the logical partitioning of a single physical channel into a plurality of virtual channels, that is, virtual lanes, via dividing access time on the physical channel amongst the virtual lanes.) A set of sequence numbers is maintained for every virtual lane against every pair of adapters that can exchange information. One lane carries request packets while another carries response packets. Every packet includes a sequence number that a receiving adapter can check to detect lost packets, duplicate packets or packets that arrive out of order. This, along with normal packet Cyclic Redundancy Check (CRC) error checking, redundant cabling, and the fact that adapters respond to incoming packets with an echo back to the sender within a fixed time period, allows the system to detect and recover from essentially any kind of transmission failure.

Sequence numbers normally use values x'00' (where the "x" denotes a hexadecimal representation) through x'FE'. The value x'FF' indicates the special reset sequence code used to establish communication with a target. The table is initialized to this value during adapter initialization. The adapter also forces selected table entries to this value after detecting a connection failure. This allows the connection to be reestablished without service processor intervention.

The content of the sequence table is not available to either server or service processor software (except possibly for debug purposes).

Exception Handling

Exceptional conditions may prevent successful message transfers. These conditions include simple recoverable link events of statistical interest, transient programming conditions requiring software to re-attempt a transfer, programming failures, and unrecoverable hardware failures. These conditions may be recorded in the descriptor completion code field, the channel's LMT channel status field, or in status registers presented to the service processor.

All hardware failures and partition protection software failures (considered to be a potential security exposure) are reported to the service processor. This includes reporting of exceptional link conditions that may or may not actually represent a failure, such as links becoming operational or non-operational due to remote servers being power on or off.

Exception conditions are classified as either fatal or nonfatal. A fatal condition stops all further activity on the channel affected while a nonfatal condition does not. Fatal conditions may be caused by programming errors or severe hardware failures. They are always reported to server software (except for checkstop). They are also reported to service processor software if the condition is due to a hardware failure. Nonfatal conditions may be the result of a normal operating condition of interest only to server software (and thus presented only to server software) or due to the occurrence a recoverable hardware condition of interest only to service processor software (and thus presented only to service processor software).

Fatal conditions are reported to server software by recording a code in the channel status field within the affected channel's LMT entry. A processor interrupt is produced and the channel number is recorded in an interrupt queue. The condition may have been detected while attempting to fetch a descriptor or while processing a descriptor. Any descriptor active at the time of the fatal condition is left unmodified. The LMT descriptor offset field points to the next unmodified descriptor, which the hardware was either attempting to fetch or was processing at the time the condition was detected. Until software clears the LMT channel status field, the hardware discards any user command or incoming packet directed to that channel.

Nonfatal conditions are reported to server software by recording a code in the completion code field of the descriptor being processed when the condition is detected. Operations on that descriptor are aborted with processing continuing with the next descriptor, if any, in the channel's descriptor list. A processor interrupt is generated only if that descriptor requested an interrupt following completion of that descriptor.

Service Network

The service network includes service processors controlling individual adapters or switches physically located throughout the system plus one of more central controlling elements (referred to as the HSC or Hardware Service Console). The service network provides two functions used in message passing. It initializes hardware prior to server software using message passing and it then monitors the system for the occurrence of hardware exception conditions. It is, however, not required to participate in any dynamic recovery process. It may choose to modify routes as it learns about fabric conditions thus preventing future problems or may choose to remove an adapter from the configuration. But, its major role is simply to initialize and report failing components. The hardware informs the service network, through the local service processor, whenever any condition occurs that indicates a hardware component is defective or has experiences a "soft" failure. The service processor may select a subset of conditions about which it is to be notified.

Link Conditions

All links are continuously monitored for any potential loss of integrity. They automatically go through a retiming procedure that adjusts skew between individual signals of the interface when necessary to insure that data transmissions are not corrupted. If either side of a link determines that the interface can not reliably be used, it disables the interface and reports a link disabled condition to the service processor controlling that component's operation. While the link is in a disabled state it discards any packets that attempt to use it. It also continuously attempts to reestablish a reliable connection and reports to the service processor a link enabled condition if it is successful. These actions may or may not occur while the adapter is actually transmitting a packet.

Reliable transmission protocols may encounter three additional scenarios. An adapter sending a reliable request or response packet, expects to receive an echo packet verifying that the targeted adapter did correctly receive the information. An adapter failing to receive this verification within a timely manner resends the information over the same physical path to the target and reports a packet retried condition to its service processor. This failure may be caused by a link disabled condition associated with one of the links used by the packet. If this retransmission also fails, it resends the information over a different physical path and reports to the service processor a path failure condition. The adapter marks the failing path in its Path Table as being potentially unusable and only tries to use it again if all other paths are found to be defective.

If all attempts over all available paths to the target fail, the adapter reports that a connection failure has occurred. This is a serious condition. The hardware cannot determine the exact state of the communication between the failing adapters. In a system with redundant switch paths, it probably indicates that the target server has checkstopped or has been powered off. Server software may continue to attempt communication with the target. This results in the adapter attempting to restore communications using any one of the four paths and resynchronizes the internal sequence number tables maintained by the two adapters if successful.

Flit Retried

A flit retried indication is sent to the service processor whenever a link retransmits a 32 byte "flit" lost signal due to noise, excessive skew between signals, or another failure condition. If the retry is successful, the affected flit is delayed by approximately 100 ns. If the retry is not successful after two attempts, the condition is escalated to link retimed. The number of retime attempts allowed before escalating the condition is modifiable by the service processor. The indication to the service processor can be masked off if desired. Server software is not informed of this event. (As used herein, the term "flit" is used to indicate the smallest unit of data processed by the switch fabric; in the presently preferred design, a flit is 32 bytes of data.)

Link Retimed

A link retimed indication is sent to the service processor whenever the hardware determines that a link is encountering excessive flit retry events. This may be caused by excessive skew between signals. If true, the link is restored to normal operation by temporarily halting link activity and performing a link timing sequence to readjust the skew between individual signals. If the retime is successful, the affected packet is delayed by approximately 400 microseconds ($\mu$m). If the retime is not successful after four attempts, the condition is escalated to a link disabled condition and all packets using that link are discarded. The indication to the service processor can be masked off if desired. Server software is not informed of this event.

Link Enabled

A link enabled indication is sent to the service processor whenever a link transitions from a non-operational state to an operational state. When using reliable protocols, packets automatically resume using the now available link when it becomes necessary to avoid losing a packet. The indication to the service processor can be masked off if desired. Server software is not informed of this event.

Link Disabled

A link disabled indication is sent to the service processor whenever a link transitions from an operational state to a non-operational state. When using reliable protocols, packets attempting to use the now non-usable link are automatically rerouted to an alternate link, if an alternate exists. While disabled, the hardware continuously attempts to retime the link. If successful, the hardware reports a link enabled condition. The indication to the service processor can be masked off if desired. Server software is not informed of this event.

Packet Retried

A packet retried indication is sent to the service processor whenever a packet is resent by an adapter because it did not receive an expected echo packet within approximately 1 millisecond of sending a request or response packet. If the retry is not successful, the condition is escalated to a path failure condition. The indication to the service processor can be masked off if desired. Server software is not informed of this event.

Path Failure

A path failure indication is sent to the service processor whenever an adapter believes that a path to a remote adapter is defective. This event occurs when a packet is sent twice over a path without receiving an echo from the target adapter. The hardware only attempts to use the failed path again if necessary to avoid a connection failure. After reporting the path failure condition, the hardware attempts to transmit the information using another path. If all attempts over all paths fail, the condition is escalated to a connection failure condition. The indication to the service processor can be masked off if desired. Server software is not informed of this event.

Connection Failure

A connection failure is an indication that a reliable packet may not have been delivered to a targeted adapter. The indication is sent to the service processor whenever all attempts to send a reliable request packet to a remote adapter have failed to return an echo packet using all available paths multiple times, or when an expected request or response packet is not received within a time out period, or when an incoming packet does not have either the expected descriptor or data sequence number. A failure to receive an echo to a reliable response packet may not necessarily invoke a connection failure. The event is also reported to server software as a nonfatal condition and set in the active descriptor of the channel encountering the failure if it is associated with a request packet. A channel reporting a connection failure pauses long enough for any remote channel involved in the operation to time out the operation. The indication to the service processor can be masked off if desired. The connection failure does not provide any information about the status of the remote adapter.

Adapter Failures

The detailed procedures for handling internal adapter hardware failures are largely implementation dependent, however there are basic guidelines that should be followed. The adapter reports all internal hardware failures and/or exceptional conditions to the local service processor. Because of the fairly high soft error rate associated with on-chip or off-chip SRAM components, the adapter can tolerate single bit failure in these components. Other internal failures may also impact the adapter's ability to operate reliably. If a failure is isolated to processing of a single channel then operations on that channel are aborted and a channel failure condition is reported to server software. Software redefines that channel's LMT entry before continuing operations with that channel. If the failure cannot be isolated to a particular channel, but can be isolated to the message passing function, then the adapter stops processing all message passing activity and reports a messaging failure condition to server software. A failure that is isolated to the message passing function should not impact other operations. However, a hardware failure that cannot be so isolated causes the adapter and server to checkstop.

Channel Failure

A channel failure is caused by an internal adapter hardware failure that can be isolated to the operation of a single channel. That channel has the fatal channel failure condition recorded in its LMT channel status field. This condition indicates that the adapter lost track of what it was doing and cannot determine the exact status of activity associated with the channel. While the condition is present in the LMT, the hardware discards any user command or incoming packet directed to that channel. There is no indication that a user command or incoming response packet is discarded. An incoming request packet results in a channel unavailable condition being returned to the sending channel. Any descriptors marked as complete by the adapter reflect the correct state of that operation. The error occurred while the hardware was processing the first descriptor in the descriptor list that was not marked as complete. The status of operation associated with this descriptor cannot be determined by the hardware nor, if software did not set the serialization flag in this descriptor, can it determine the status of descriptors beyond this point. If software did set the serialization flag, then work beyond this point has not started. The failure may have corrupted the descriptor offset field or any reserved field in the LMT. Software may continue operations with the channel only after it uses a series of write LMT privilege commands to reinitialize all portions of the affected LMT entry. Preferred embodiments of the present invention escalate all channel failure conditions to a messaging failure classification.

Messaging Failure

A messaging failure is caused by an internal adapter hardware failure that is isolated to the message passing function but not to a particular channel. All Interrupt Status Registers (ISRs) used by the message passing function have the condition recorded. The failure indicates that the adapter lost track of what it was doing with all channels. The message passing function is made unavailable and is reset before it does further work. While message passing is not available, the hardware discards all user commands and all incoming packets. It also returns a value of all one's to any read interrupt queue command (an empty queue indication). Before message passing operations are restored, all LMT entries are marked invalid and all interrupt queues and work queues are purged. The sequence performed by hardware detecting this condition is:

1. The hardware sets the messaging failure and resets the message passing available bit in every ISR.

Server software using message passing may enable an interrupt when the message passing function becomes unavailable due to the failure or again becomes available after being reset. Software not using message passing need not receive an interrupt and may ignore both the messaging failure and message passing available bits.

Server software resets the messaging failure bit when it has recognized the condition.

Applications using the failed adapter may be terminated or have their operations directed to another adapter.

2. The hardware stops all message processing activity and discards packets received while the message passing function is not available. This may cause other adapters in the network to report a connection failure condition.

3. Adapter hardware, with or without service processor assistance, resets hardware state machine latches and set all bits of all LMT entries to a "0" value. This indicates that all entries are in the invalid state, there are no channel groups defined and all interrupt and work queues are empty. The adapter includes configuration information originally defined by the service processor. Most of these facilities are protected from single bit failures using Error Correction Coding (ECC) or other redundancy techniques. Recovery from double bit errors, if desired, employs service processor assistance to reestablish the original contents.

4. Service processor software or adapter hardware, depending on the implementation, sets the message passing available bit after it has reset the adapter. Server software only uses the adapter when this bit indicates that the function is available.

5. Server software recognizing that message passing is again available, may redefine channels and resume operations.

Message Passing Unavailable

The message passing unavailable condition is not itself an adapter failure, but can exist either due to a messaging failure, as described above, or because the service network has not yet initialized the adapter or has shut down adapter operations. In all cases the availability of message passing is indicated by the value of the message passing available bit in every ISR. When message passing is unavailable, the adapter can perform a limited set of actions. It cannot send or receive message passing packets nor process any kind of channel activity. Although it continues to service many types of MMIO commands, it discards selected types of write operations and returns all one's to selected read operations. The following table identifies the adapter behavior while message passing is unavailable:

TABLE 28

Command Behavior When Message Passing is Unavailable

| Command | Action |
|---|---|
| start message | all user commands are discarded |
| step message | |
| prefetch user | |
| suppress interrupt | |
| enable interrupt | |
| clear condition | |
| read ISR | return ISR value |
| write ISR | modify ISR value |
| read interrupt queue | return all one's |
| read TOD | return TOD value |
| read physical ID | return physical ID value |
| stop channel | command discarded |
| restart channel | command discarded |
| reset channel | command discarded |
| select channel | command discarded |
| test channel | return all one's |
| read SRAM address | read address value |
| write SRAM address | modify address value |
| read SRAM data & increment address | return SRAM value & increment address |
| write SRAM data & increment address | discard data & increment address after message passing becomes available, command continues to discard data until write SRAM address command is issued |

Checkstop

A checkstop condition is caused by an internal adapter hardware failure that cannot be isolated to the message passing function. The failure may be associated with the adapter's server interface, service processor interface, interrupt generation logic or function not associated with message passing. The condition causes all operations in the adapter and server to halt. Service processor intervention is required to re-IPL (Initial Program Load) the system.

Programming Conditions

Insufficient Space

A nonfatal insufficient space condition is recorded in a source of push descriptor if a reliable packet is targeted to a channel having a descriptor other than branch or target of push. A processor interrupt is generated only if the associated descriptor requested an interrupt. Any data that could not be processed is discarded without recording any indication of how much is discarded. Local activity continues with the next descriptor. The condition is not reported to the target server nor to the service processor on either server.

Channel Unavailable

A nonfatal channel unavailable condition is recorded in a reliable source of push, target of pull, remote read, or remote write descriptor if the target channel in the invalid state, has a different user key value than the local channel, or has a fatal condition in it's LMT channel status field. A processor interrupt is generated only if the associated descriptor requested an interrupt. Local activity continues with the next descriptor. The condition is not reported to the target server nor to the service processor on either server.

Failed to Start

A fatal failed to start condition is recorded when a channel with a remote read, remote write, source of push, or target of pull descriptor cannot initiate a transfer with a target server because of an incorrectly defined entry in either the local or remote descriptor, LMT, or address translation table. A processor interrupt is unconditionally generated and activity halts on the affected channel. The condition is not reported to either the target server nor to the service processor. A failed to start condition is reported rather than a failed to complete condition if the error does not impact the target thus not changing the target's LMT entry nor descriptor list.

Failed to Complete

A fatal failed to complete condition is recorded when a channel with a remote read, remote write, source of push, or target of pull descriptor cannot complete a transfer with a target server because of an incorrectly defined entry in either the local or remote descriptor, LMT, or address translation table. A processor interrupt is unconditionally generated. Local activity halts on the affected channel. The condition is not reported to the service processor on either server. A failed to complete condition is reported rather than a failed to start condition when the error may impact the target thus changing the target's LMT entry or descriptor list. A target server that is impacted also reports the failed to complete condition.

Channel Stopped

A fatal channel stopped condition is recorded when a channel processing a source of pull, target of pull, source of push, target of push, remote read, or remote write descriptor receives a reliable packet while in the stopped state or sends a reliable packet to a channel that is in the stopped state. A processor interrupt is unconditionally generated and activity halts on the affected channel. The condition is not reported to the service processor. A channel unavailable condition has priority over a simultaneous channel stopped condition.

Reporting

Preferred implementations of the present invention include many error checkers with many separate error indications providing a high degree of exactly what type of hardware or software exception condition is detected. The implementation specification includes information about individual checkers and the information recorded. This detailed information is available through the service processor or to server software for development debug purposes. Architecturally, groups of similar error conditions are combined. The following table shows the failure classification available along with the code point each sets in the descriptor condition code field or the channel's channel status field and whether an indication is sent to the service processor.

TABLE 29

Report Types

| Type | Reason | Descriptor CC field | LMT channel status field | Service processor notified |
| --- | --- | --- | --- | --- |
| none | The current descriptor and channel have no active error condition. | 1111 | 0000 | na |
| completed | The current local descriptor has successfully completed. | 0000 | 0000 | na |
| flit retried | A flit is being retransmitted across an individual link | na | na | yes |
| link retimed | A link is being retimed | na | na | yes |
| link enabled | A non-operational link directly attached to the adapter has become operational. | na | na | yes |
| link disabled | An operational link directly attached to the adapter has become non-operational. All packets using that link is discarded. | na | na | yes |
| packet retried | The adapter has not received an expected echo packet. The adapter is resending the associated request or response packet. | na | na | yes |
| path failure | The adapter has failed to receive an expected echo packet over the same path twice. The adapter selects an alternate path and resend the associated request or response packet. | na | na | yes |
| insufficient space | A source of push reliable transfer had more data than the remote adapter could process before detecting a descriptor other than branch or target of push. The excess data is discarded. Local processing continues with the next descriptor. | 0001 | na | no |
| channel unavailable | A remote channel is marked as invalid or stopped, does not have the correct user key value or has a fatal condition in its channel status field. Other fields in the remote channel's LMT entry are ignored. Local processing continues with the next descriptor. The remote channel is not modified. | 0010 | na | no |
| connection failure | A failure has occurred preventing communication with the remote adapter. This includes transmission failures over all available paths, internal adapter failures confined to communication with the remote adapter, and remote server failures preventing a response being returned. Local processing continues with the next descriptor. The status of the remote adapter/channel is not known. | 0011 | na | no |
| failed to start | Conflicting information in either the local or remote channel's LMT entry (other than that reported as channel unavailable). Processing of the local channel is halted with a fatal condition. The remote channel is not modified. | na | 0100 | no |
| failed to complete | Hardware detected invalid or conflicting information in either the local or remote channel's LMT entry, descriptor or TCE preventing completion of a message passing transfer. Processing of the local channel is halted with a fatal condition. The status of the remote channel is not known. | na | 0101 | no |
| channel failure | A server or adapter failure has occurred that can be isolated to the current channel. Processing of the local channel is halted with a fatal condition. The status of the remote channel is not known. | na | 0110 | yes |

TABLE 29-continued

Report Types

| Type | Reason | Descriptor CC field | LMT channel status field | Service processor notified |
|---|---|---|---|---|
| channel stopped | A reliable transfer was attempted while in the stopped state. The condition is recorded and activity is halted in both the local and remote channel. | na | 0111 | yes |
| messaging failure | The adapter has detected an internal failure restricted to message passing operations but can not be isolated to a connection failure or a channel failure. While the adapter is resetting itself due to this failure, it accepts and discard commands received from server software, stops all internal operations, and discards all incoming message passing packets. It processes service processor activity. When the adapter has finished this process, it generates a special message interrupt to every interrupt level used by the adapter. | na | na a bit is set in the adapter ISR | yes |
| checkstop | The server or adapter has detected an internal failure that can not be isolated to message passing hardware. The adapter stops all non-service processor activity. | na | na | yes |

Usage Considerations

Sharing a Receive Channel

A channel defined as the target of push operations is used to receive data from multiple independent sources if certain software restrictions are followed. These restrictions account for the fact that once receiving hardware starts to process a push operation involving multiple packets, it rejects packets sent from another source until the operation transfers all of the data associated with a single source of push descriptor. The rejected packets get marked with a nonfatal failed to start condition. Although software can retry the failed operation there is no guarantee that it won't also encounter a busy condition. It is recommended that this situation be avoided by restricting push operations targeted to a shared channel to a single packet.

The receiving channel processes incoming packets strictly in the order that they arrive without recognizing that they might originate from several independent sources. This means that the receiving memory buffer may contain a series of packets from one source interleaved with a series of packets from other sources. The data from a given source is placed in memory in the same order as sent and data from a single packet uses consecutive locations; however, data from multiple packets may not be stored consecutively. This means that the software is given the job of understanding how hardware constructs packets during push operations and includes sufficient information in each packet to enable receive side software to reconstruct the information sent from each source.

The hardware formats packets with up to 2K bytes of data. A packet only includes data specified by a single source of push descriptor or a series of preload data descriptors and a single source of push descriptor. As described above, the combination of preload data followed by a source of push descriptor effectively extends the definition of the source of push to gather data from disjoint memory regions into a single packet. A packet includes 2K bytes if there are at least 2K bytes left to send for a single preload data, source of push combination. If there are less than 2K bytes left, it sends all of it in a single packet. The position of the data in memory does not affect the number of packets generated. A channel defined to use the unreliable mode, may not specify more than 2K bytes in the combination of preload data and source of push descriptors.

Each descriptor on the receive side should, ideally, only reference up to a 2K data area. Although not absolutely necessary, this does allow receive side software to recognize individual packets immediately as they arrive and enables software to use the source ID and source channel fields in the descriptor to identify the initiating adapter and channel. Use of both the send side and receive side marking functions described above, are also recommended, although not absolutely required.

All channels sending information to a common receive channel use the same user key value as the receiving channel, or deactivate the user key protection mechanism by specifying the universal key value of all one's in either the sending or receiving channel.

Partitioning

There are several support tasks that are performed by the operating system rather then user level code. They include allocation of channels with the associated processor page table modification, updating the LMT, and maintenance of the message passing address translation table. Prior to the introduction of logical partitioning (LPAR) such tasks were performed by kernel code or code running as an extension to the kernel. This code was trusted to manage all of the resources contained within the server, including memory management through the maintenance of processor page tables and the I/O equivalent TCE tables. This is a logical division of labor. Resources needed to be controlled from a single agent and that's exactly the purpose for which operating systems were designed. LPAR changes this model. Multiple operating system can run under LPAR with each unaware of the other, but protected from the other's behavior. The service processor hides some of the characteristics of this new model from individual operating systems. However, traditional kernel level code can longer be trusted with certain functions, such as the maintenance of page tables. This requires moving some functions to new 'more-trusted' hypervisor software.

When running in an LPAR environment, hypervisor assistance is provided for use in the message passing function. The hypervisor has knowledge of the architecture and is the only software allowed to allocate channels, update processor page tables, update the LMT, or maintain the message passing address translation tables. In addition, it is not possible to create a trusted user, other than the hypervisor, capable of generating real addresses to avoid the message passing address translation process.

The adapter implementing message passing may be entirely assigned to a single operating system by the hypervisor, or it may be shared by multiple operating systems with the hypervisor allocating separate groups of channels to each.

Command Ordering

The PowerPC architecture provides a weakly consistent storage model. This means that the order that a processor performs storage accesses, the order in which those accesses complete in main storage, and the order in which those accesses can be viewed by a third party such as another processor or I/O adapter, may all be different. The advantage of a weakly consistent model is that it allows the processor to run very fast for most storage accesses. It does, however, require software to perform additional steps when sharing storage data with another processor or hardware device. This means that message passing software is given the task of insuring the following:

1. Software may not issue a start message or prefetch user command until it insures that the adapter recognizes any previous changes it has made to descriptors or data buffers. It may issue the PowerPC sync instruction between the memory update and the start message or prefetch command to accomplish this.

2. When software is adding new descriptors to the end of an active descriptor list it can only remove the original end of list indication after all other changes to the list are made visible to the adapter. It may accomplish this by issuing either the PowerPC lwsync or sync instruction just before the store instruction changing the type field. (While these instructions are specifically mentioned as the preferred mechanism for providing this function, it should be understood that other processors possess instruction sets that are capable of providing this same functionality using one or more other or different instructions.)

The PowerPC architecture classifies the MMIO load/store instructions used to implement user and privileged commands as being directed to "device memory." These real address values have the caching inhibited and guarded PowerPC attributes. Because of this, a series of MMIO store instructions, such as user commands, are delivered to the adapter in the same order as perceived by the issuing software. However, the internal adapter design point allows them to be physically processed in a different order. To insure correct behavior, software follows the following rules:

1. Software may not modify the LMT or address translation table unless the test channel command indicates that the channel is in the stopped or invalid state.

2. Software may not issue a user command after modifying the LMT unless the test channel command indicates that the channel is in the valid state.

3. Software insures that changes associated with the write interrupt status command have actually taken place before issuing additional commands that may cause the hardware to change the interrupt status. It may accomplish this by immediately following the command with a read interrupt status command.

The PowerPC architecture does not require the hardware to maintain any ordering between MMIO load instructions or between MMIO load and store instructions unless the instructions are issued to the same address. There are six privileged commands implemented as MMIO load operations. These commands do not usually require specific software ordering. However, each usage should be reviewed. Software can enforce ordering by placing either the PowerPC eieio or sync instruction between the commands of concern. The eieio instruction is used for "enforcing in-order execution of I/O." While these specific instructions are mentioned here as a preferred mechanism for enforced ordering, it should be understood that the present invention is not limited in this regard. Various processors have their own instruction sets that are capable of providing this function. The obvious cases that do require attention are:

1. Any privileged command following a read interrupt status command;

2. The sequence select channel followed by a test channel; and

3. Any combination of address or data accesses to the LMT

Unreliable Transmission

As identified above, a channel used for push operations may indicate in its LMT entry that the hardware should use unreliable, rather than reliable, transmission protocols. This mode is provided to eliminate the extra link activity required by hardware guaranteeing reliable in-order delivery when the function isn't needed. The mode limits the amount of data that is sent using a single source of push descriptor to a maximum of 2,048 bytes—the current maximum size of a single packet. The hardware using unreliable transmission protocols does not guarantee delivery nor does it indicate if a transfer is successful or unsuccessful. The determination of success or failure and the recovery of failed transmissions is performed using software.

Special Values

The specific design of the present invention typically reserves a descriptor, LMT, or packet field value of all one's as an indication of something special. These cases are:

1. a logical ID value of x'FFF' defines a broadcast ID value. Software places this value in the target ID field of an unreliable source of push descriptor to initiate a broadcast operation. Hardware then places this value in the broadcast packet's source logical ID field and in the source ID field of the target of push descriptor.

2. a physical ID value of x'FFFF' defines a universal ID value. Hardware normally uses a physical ID field within a packet to identify the packet's intended target. The receiving adapter discards the packet if it doesn't contain the unique value service processor software assigned to it. Hardware places the universal ID value in a broadcast packet to deactivate this test. Service processor software may prevent this test for all packets received by an adapter by placing the universal ID value in that adapter's physical ID register. It may also prevent the test for all packets sent from a particular adapter to a particular receiving adapter by placing the universal ID value in the physical ID field of the corresponding path table entry within the sending adapter.

3. a user key value of x'FFFFFFFF' defines a universal key value. The hardware only allows channels to accept packets from channels having a common user key value indicating that both channels belong to the same application. Privileged server software may set a channel's LMT user key field to the universal key value to deactivate this test.

4. a packet sequence value of x'FF' defines a synchronization value. The hardware normally generates and accepts reliable packets with a logically increasing sequence number between x'00' and x'FE'. The hardware uses the synchronization value to establish a common sequence number value between a sender and a receiver during adapter initialization or following a connection failure. This special value is always accepted and resets the next expected value to x'00'.

Fabric Interface

This section describes the packet formats, transfer sequences and rules used to communicate between message passing adapters.

Packet Types

Message passing defines four packet types referred to as request packet, response packet, echo packet and an unreliable packet. Request packets either include data or ask for the targeted adapter to return data to the issuer. Response packets are produced by an adapter receiving a request packet asking for data or to indicate that the operation has completed while using the reliable acceptance transmission mode. Echo packets are issued whenever a request or response packet is correctly received by a target adapter. An unreliable packet is a special variation of a request packet associated with push operations using channels providing unreliable transfers. It does not have an associated response or echo packet.

In currently preferred embodiments of the present invention, all packets contain a packet header of 32 or 48 bytes. The header format is identical for all packet types, although some fields may be unused in each packet type. Request, response, and unreliable packets may include packet payload or data of up to 2048 bytes. Echo packets contain 32 bytes of header with no data.

All packets are checked for transmission failures, a correct target physical ID and a non-stale time stamp value while reliable packets are also checked for an expected packet sequence field before being accepted by a receiving adapter. Every source/target adapter pair maintains a set of packet sequence numbers for each virtual lane. They are used to detect missing or duplicated packets and along with a time out mechanism managed by the sender allows the hardware to provide reliable in-order exactly once type packet delivery. Use of a special synchronization value allows the adapter pair to establish a common set of packet sequence numbers. This synchronization process occurs with the first reliable packet sent to the target following system initialization or following a connection failure. The hardware may not always be able recover from transmission failures during this synchronization process. Three additional fields, associated with source/target channels, allow the hardware to report a connection failure if it cannot recover from such a failure. The pull sequence field is incremented for each new remote start type of request packet and is copied into all subsequent packets transmitting pull data. The data sequence field is incremented for each new packet sent from the same channel. The descriptor sequence field is incremented each time the sender processes a new descriptor and allows multiple descriptors to be active simultaneously during the reliable acceptance mode. The rules associated with generating and using these fields are provided below.

Links transmit payload information plus error detection, retry, clocking, and flow control information in sideband signals. Links also support the transmission of TOD (Time of Day) synchronization packets and service packets.

Request Packet

A request packet is used either to send data to a targeted adapter or to tell that adapter to send data back to the requester. All request packets use virtual lane 5. All request packets accepted by the target result in an echo packet being returned.

A single descriptor may produce multiple request packets. The first packet is marked as "first" while the last packet is marked "last." A transfer that cannot complete successfully because of an error detected after the first packet generates a "last" packet with the completion code field indicating the type of abnormal condition detected.

TABLE 30

| DW | Bits | Size | Label | Significance | |
|----|------|------|-------|--------------|---|
| 0 | 0–55 | 56 | route | identifies path through fabric | packet header |
|   | 56–63 | 8 | packet type | x'0C'- packet expecting echo | |
| 1 | 0–15 | 16 | target physical ID | system wide target identifier - used to identify misrouted packets | |
|   | 16–27 | 12 | source logical ID | identifies adapter, as known by target, initiating the packet | |
|   | 28–29 | 2 | echo path | indicates the path to return an echo | |
|   | 30–32 | 3 | header size | number of 16 byte units in the header over 32<br>000 - if operation is a push, pull or remote start<br>001 - if operation is a read or write | |
|   | 33–63 | 31 | time stamp | used to identify stale packets (incremented every 27.2 us) | |
| 2 | 0–7 | 8 | retry buffer entry | copied to echo to identify packet being echoed | |
|   | 8–15 | 8 | packet sequence | used to identify out of sequence packets | |
|   | 16–19 | 4 | data sequence | used to identify lost packets within single descriptor | |
|   | 20–23 | 4 | packet subtype | 0000 - request packet | |
|   | 24–27 | 4 | packet flags | bit 0: first packet generated by descriptor<br>bit 1: last packet generated by descriptor<br>bits 2–3: undefined | |
|   | 28–31 | 4 | pull sequence | used to identify packets associated with a given remote start | |
|   | 32–47 | 16 | target channel | identifies channel that processes this packet | |
|   | 48–51 | 4 | descriptor sequence | copied from issuing channel's LMT descriptor sequence field | |
|   | 52–55 | 4 | operation | 0010 - write with data<br>0011 - read without data<br>0100 - push with data<br>0110 - pull with data<br>0111 - remote start without data | |
|   | 56–63 | 8 | descriptor flags | copied from sender's descriptor | |
| 3 | 0–15 | 16 | source channel | identifies the channel initiating this packet | |
|   | 16–19 | 4 | completion code | indicates any abnormal condition | |
|   | 20–31 | 12 | data count | number of data bytes included with or requested by the packet | |
|   | 32–63 | 32 | user key | copied from issuing channel's LMT user key field | |

TABLE 30-continued

| DW | Bits | Size | Label | Significance | |
|---|---|---|---|---|---|
| 4 | 0–15 | 16 | not defined | unused | remote read/write only |
| | 16–63 | 48 | target data offset | copied from remote read or remote write descriptor | |
| 5 | 0–27 | 28 | not defined | unused | |
| | 28–63 | 36 | message byte count | copied from remote read descriptor | |
| N | 0–2K bytes | | data | optional data plus padding - extra bytes are padded on to the end of the field such that the packet includes a multiple of 32 bytes | packet data |

Response Packet

A response packet provides data or indicates the final status of an operation started by a previously received request packet. All response packets use virtual lane 6.

A request packet may produce multiple response packets. The first packet is marked as "first" while the last is marked "last." A transfer that cannot complete successfully because of some kind of error detected after the first packet was sent generates a "last" packet with the completion code field indicating the type of abnormal condition detected.

TABLE 31

| DW | Bits | Size | Label | Significance | |
|---|---|---|---|---|---|
| 0 | 0–55 | 56 | route | identifies path through fabric | packet header |
| | 56–63 | 8 | packet type | x'0C'- packet expecting echo | |
| 1 | 0–15 | 16 | target physical ID | system wide target identifier - used to identify misrouted packets | |
| | 16–27 | 12 | source logical ID | identifies adapter, as known by target, initiating the packet | |
| | 28–29 | 2 | echo path | indicates the path to return an echo | |
| | 30–32 | 3 | header size | 000 - for all defined response packets | |
| | 33–63 | 31 | time stamp | used to identify stale packets (incremented every 27.2 µs) | |
| 2 | 0–7 | 8 | retry buffer entry | copied to echo to identify packet being echoed | |
| | 8–15 | 8 | packet sequence | used to identify out of sequence packets | |
| | 16–19 | 4 | data sequence | used to identify lost packets within single descriptor | |
| | 20–23 | 4 | packet subtype | 0001 - response packet | |
| | 24–27 | 4 | packet flags | bit 0: first packet generated by descriptor bit 1: last packet generated by descriptor bits 2–3: undefined | |
| | 28–31 | 4 | pull sequence | unused | |
| | 32–47 | 16 | target channel | copied from request packet source channel field | |
| | 48–51 | 4 | descriptor sequence | copied from request packet descriptor sequence field | |

TABLE 31-continued

| DW | Bits | Size | Label | Significance | |
|---|---|---|---|---|---|
| | 52–55 | 4 | operation | 0010 - write without data 0011 - read with data 0100 - push without data 0110 - pull without data 0111 - remote start without data | |
| | 56–63 | 8 | descriptor flags | copied from local descriptor if send-receive model | |
| 3 | 0–15 | 16 | source channel | copied from request packet target channel field | |
| | 16–19 | 4 | completion code | indicates any abnormal condition | |
| | 20–31 | 12 | data count | number of data bytes included with packet (0 to 2048) | |
| | 32–63 | 32 | user key | unused | |
| N | 0–2K bytes | | data | optional data plus padding - extra bytes are padded on to the end of the field such that the packet includes a multiple of 32 bytes | packet data |

Echo Packet

An echo packet is produced for every request or response packet received with correct CRC, target physical ID and time stamp fields along with a packet sequence value greater than or equal to the receiving sequence number it has recorded for the adapter issuing the request or response. It tells the remote adapter that the request or response packet was successfully received, that the sender can stop the time out mechanism waiting for the echo and can remove the request/response packet from any retransmission buffer. The echo does not necessarily indicate that the operating requested can be performed—only that the request or response packet was correctly delivered. Echo packets include a copy of the time stamp determined by the initiating adapter when the associated request/response packet was sent. The request/response packet travels from the initiating adapter to the target and an echo packet returned back within a time-out period in order to be accepted. An echo packet received after this period is considered "stale" and is discarded. All echo packets use virtual lane 4.

TABLE 32

| DW | Bits | Size | Label | Significance |
|---|---|---|---|---|
| 0 | 0–55 | 56 | route | identifies path through fabric |
| | 56–63 | 8 | packet type | x'nF' - echo packet, - n indicates virtual lane being echo'ed |
| 1 | 0–15 | 16 | target physical ID | system wide target identifier - used to identify misrouted packets |
| | 16–27 | 12 | source logical ID | identifies adapter, as known by target, initiating the packet |
| | 28–29 | 2 | echo path | unused |
| | 30–32 | 3 | header size | 000 - for all echo packets |
| | 33–63 | 31 | time stamp | copied from request/response packet being echoed |
| 2 | 0–7 | 8 | retry buffer entry | copied from request/response packet being echoed |
| | 8–15 | 8 | packet sequence | used to identify out of sequence packets |
| | 16–19 | 4 | data sequence | unused |
| | 20–23 | 4 | packet subtype | |
| | 24–27 | 4 | packet flags | |

TABLE 32-continued

| DW | Bits | Size | Label | Significance |
|---|---|---|---|---|
|  | 28–31 | 4 | pull sequence |  |
|  | 32–47 | 16 | target channel |  |
|  | 48–51 | 4 | descriptor sequence |  |
|  | 52–55 | 4 | operation |  |
|  | 56–63 | 8 | descriptor flags |  |
| 3 | 0–15 | 16 | source channel |  |
|  | 16–19 | 4 | completion code |  |
|  | 20–31 | 12 | data count |  |
|  | 32–63 | 32 | user key |  |

Unreliable Packet

An unreliable packet provides a function similar to a push type request packet except that the hardware does not guarantee delivery to the target and the target does not return either an echo or a response packet after receiving the unreliable packet. Unreliable packets are only generated when processing a source of push descriptor for a channel where the LMT transmission mode bit indicates unreliable transfers. Unreliable packets, along with request packets, use virtual lane 5.

The target adapter accepts and processes an unreliable packet having correct CRC, target physical ID and time stamp and the target channel's transmission mode bit indicates unreliable transfers and there is a suitable target of push type descriptor.

The descriptor initiating the unreliable packet is marked completed as soon as the associated data is transmitted. That descriptor is not allowed to specify a byte count that would result in multiple packets. Therefore an unreliable packet is marked as both the "first packet generated by descriptor" and the "last packet, generated by descriptor."

The contents of an unreliable packet differ from the contents of a request packet used for push operations in the following:

1. the packet type and packet subtype values are different; and
2. the echo path, retry buffer entry, packet sequence, and descriptor sequence fields are not used.

TABLE 33

| DW | Bits | Size | Label | Significance |  |
|---|---|---|---|---|---|
| 0 | 0–55 | 56 | route | identifies path through fabric | packet header |
|  | 56–63 | 8 | packet type | x'0B' - packet expecting echo |  |
| 1 | 0–15 | 16 | target physical ID | system wide target identifier - used to identify misrouted packets |  |
|  | 16–27 | 12 | source logical ID | identifies adapter, as known by target, initiating the packet |  |
|  | 28–29 | 2 | echo path | unused |  |
|  | 30–32 | 3 | header size | 000 - for all unreliable packets |  |
|  | 33–63 | 31 | time stamp | used to identify stale packets (incremented every 27.2 µs) |  |
| 2 | 0–7 | 8 | retry buffer entry | unused |  |
|  | 8–15 | 8 | packet sequence | unused |  |
|  | 16–19 | 4 | data sequence | unused |  |

TABLE 33-continued

| DW | Bits | Size | Label | Significance |  |
|---|---|---|---|---|---|
|  | 20–23 | 4 | packet subtype | 0100 - unreliable packet |  |
|  | 24–27 | 4 | packet flags | bit 0 = 1: first packet generated by descriptor bit 1 = 1: last packet generated by descriptor bits 2–3: undefined |  |
|  | 28–31 | 4 | pull sequence | unused |  |
|  | 32–47 | 16 | target channel | identifies channel that processes this packet |  |
|  | 48–51 | 4 | descriptor sequence | unused |  |
|  | 52–55 | 4 | operation | 0100 - push - packet does not include data |  |
|  | 56–63 | 8 | descriptor flags | copied from sender's descriptor |  |
| 3 | 0–15 | 16 | source channel | identifies the channel initiating this packet |  |
|  | 16–19 | 4 | completion code | indicates any abnormal condition |  |
|  | 20–31 | 12 | data count | number of data bytes included with the packet |  |
|  | 32–63 | 32 | user key | copied from issuing channel's LMT user key field |  |
| N | 0–2K bytes |  | data | optional data plus padding - extra bytes are padded on to the end of the field such that the packet includes a multiple of 32 bytes | packet data | note: the target physical ID and source logical ID fields contain the special broadcast ID value of all one's during a broadcast operation.

Transfer Sequences

Unreliable Push Operation Examples

1. Sending and receiving software identify each other's channel and logical ID values and agree on the type of transfer and maximum amount of data involved. This process may occur outside of the message passing architecture using some sideband capability or may use previously established message passing parameters.

2. Sending side software defines one or more source of push descriptors, each pointing to a region of local memory where hardware obtains the data to be transferred. Each descriptor identifies the channel and adapter intended to receive the data Preload data descriptors may also be used but are not included in this example.

3. Receiving side software defines one or more target of push descriptors, each pointing to a region of local memory where hardware places the data transferred from the siding side.

4. Sending side software issues a start message command supplying a local channel ID value that it received from the operating system when the channel was created. The command invokes an MMIO store instruction with the virtual address field set to the channel ID value.

5. Sending side hardware uses the processor's address translation logic and page table to verify that the software task is authorized to issue the command and directs the command to a specific message passing adapter. The translated real address value identifies the MMIO as a start message command, selects one message passing adapter, and indicates the channel number that adapter should use.

6. The adapter receiving the start message command verifies that the command and the channel it references are valid. The adapter then either starts processing the channel immediately or schedules it for later processing by placing the channel number in one of the two work pending lists. The channel's LMT entry indicates which list to use.

7. When the sending side processes the channel it reads the LMT entry and the descriptor it points to. It gathers all the information it needs into working registers including address translation and descriptor entries plus any translated real addresses it may later need.

8. The sending side verifies that the descriptor references no more than 2,048 bytes and transmits one unreliable packet to the specified target. After sending the packet, the source of push descriptor is updated with the completion code set to "completed" and a local processor interrupt is generated if the descriptor requested it.

9. When the receive side detects the unreliable packet it verifies that the packet is acceptable (correct CRC fields, correct target physical ID, satisfactory time stamp) and then examines the indicated channel's LMT entry and descriptor list. It verifies that the operation can be performed, saves the data portion of the packet in memory and updates working registers originally obtained from the LMT and descriptor. If the transfers completes a target of push descriptor it updates that descriptor's completion code, source channel, source logical ID, and byte count fields.

Reliable Delivery Push Operation Examples

1. Sending and receiving software identify each other's channel and logical ID values and agree on the type of transfer and maximum amount of data involved. This process may occur outside of the message passing architecture using some side band capability or may use previously established message passing parameters.

2. Sending side software defines one or more source of push descriptors, each pointing to a region of local memory where hardware obtains the data to be transferred. Each descriptor identifies the channel and adapter intended to receive the data. Preload data descriptors may also be used but are not included in this example.

3. Receiving side software defines one or more target of push descriptors, each pointing to a region of local memory where hardware places the data transferred from the sending side.

4. Sending side software issues a start message command supplying a local channel ID value that it received from the operating system when the channel was created (that is, initiated). The command invokes an MMIO store instruction with the virtual address field set to the channel ID value.

5. Sending side hardware uses the node's address translation logic and page table to verify that the software task is authorized to issue the command and directs the command to a specific message passing adapter. The translated real address value identifies the MMIO as a start message command, selects one message passing adapter, and indicates the channel number that the adapter should use.

6. The adapter receiving the start message command verifies that the command and the channel it references are valid. The adapter then either starts processing the channel immediately or schedules it for later processing by placing the channel number in one of the two work pending lists. The channel's LMT entry indicates which list to use.

7. When the sending side processes the channel, it reads the LMT entry and the descriptor to which it points. It gathers all of the information it needs into working registers including address translation and descriptor entries plus any translated real addresses it may later need plus status information modified during the sending process such as the number of bytes remaining to be sent. The adapter may periodically exchange information between these registers and the LMT to process other unrelated activity. The LMT thus serves as a level of caching eliminating the need to refetch descriptors and/or TCE's from main memory.

8. The sending side sequentially transmits as many push request packets as needed to transfer all the data indicated in the descriptor list. Information is included in each packet enabling the receiver to identify the first and last packets associated with a individual send side descriptor along with any flag bits set in that descriptor. The sender expects to receive an echo packet for every request packet sent. It may continue sending additional packets only if it has sufficient resources to resend any packet it feels has not been echoed in a timely fashion. A failure to receive an echo within a time out period causes packet retransmission perhaps over one or more alternate paths. A failure to recover from a series of missing echo's causes the descriptor to be marked as unsuccessful due to a connection failure.

9. When the receive side detects a push request packet it verifies that the packet is acceptable (correct CRC fields, correct target physical ID, satisfactory time stamp, acceptable packet sequence number) and sends back an echo packet. The echo only indicates that the packet was delivered correctly. It does not imply that the receiver can perform the operation requested.

10. When the send side detects an echo packet, it removes the matching push request packet from it's retry facilities and stops the associated time out monitor and retransmission mechanism. When the send side determines that all request packets needed by the source of push descriptor have been sent and each has been echoed, it updates the descriptor with the appropriate completion status and if necessary generates a local processor interrupt.

11. After sending an echo packet, the receive side adapter examines the indicated channel's LMT entry and descriptor list. It verifies that the operation can be performed, saves the data portion of the packet in memory and updates working registers originally obtained from the LMT and descriptor. As individual receive side descriptors are exhausted, they may trigger a local processor interrupt. The receiving adapter is assumed to always have sufficient resources to move the data it receives to local memory. It may do so slowly, but cannot stall for an indefinite period without making progress.

12. As each packet is received, the adapter verifies that all contain an identical descriptor sequence number and that each contains a data sequence number one greater than the previous number. These checks insure that the receiver learns of any temporary connection failure occurring during the operation. The packet sequence, descriptor sequence, and data sequence number fields work together to enable both adapters to identify connection failures impacting one operation but still enabling subsequent operations to reestablish communications without service software intervention.

13. When the receive side determines that it has received and processed all of the data a given target of push descriptor can accept, it updates the descriptor, generates a local processor interrupt if necessary, fetches the next descriptor from memory, and continues processing if there is any unprocessed push data.

Reliable Acceptance Push Operations

1. Sending and receiving software identify each other's channel and logical ID values and agree on the type of transfer and maximum amount of data involved. This process occurs outside of the message passing architecture using some side band capability or, alternatively uses previously established message passing parameters.

2. Sending side software defines one or more source of push descriptors, each pointing to a region of local memory where hardware obtains the data to be transferred. Each descriptor identifies the channel and adapter intended to receive the data. Preload data descriptors may also be used but are not included in this example.

3. Receiving side software defines one or more target of push descriptors, each pointing to a region of local memory where hardware places the data transferred from the siding side.

4. Sending side software issues a start message command supplying a local channel ID value that it received from the operating system when the channel was created. The command invokes an MMIO store instruction with the virtual address field set to the channel ID value.

5. Sending side hardware uses the node's address translation logic and page table to verify that the software task is authorized to issue the command and directs the command to a specific message passing. The translated real address value identifies the MMIO as a start message command, selects one message passing adapter, and indicates the channel number that adapter uses.

6. The adapter receiving the start message command verifies that the command and the channel it references are valid. The adapter then either starts operating or controlling the channel immediately or schedules it for later processing by placing the channel number in one of the two work pending lists. The channel's LMT entry indicates which list to use.

7. When the sending side processes the channel it reads the LMT entry and the descriptor to which it points. It gathers all of the information it needs into working registers including address translation and descriptor entries plus any translated real addresses it needs later plus status information modified during the sending process such as the number of bytes remaining to be sent. The adapter periodically exchanges information between these registers and the LMT to process other non-related activity. The LMT thus serves as a level of caching eliminating the need to refetch descriptors and/or TCE's from main memory.

8. The sending side sequentially transmits as many push request packets as needed to transfer all of the data indicated in the descriptor list. Information is included in each packet enabling the receiver to identify the first and last packets associated with a individual send side descriptor along with any flag bits set in that descriptor. The sender expects to receive an echo packet for every request packet sent. It continues sending additional packets only if it has sufficient resources to resend any packet that it feels has not been echoed in a timely fashion. It also expects to receive a response packet after the target has processed all the data associated with a single send side descriptor. A failure to receive an echo within a time out period causes packet retransmission perhaps over one or more alternate paths. A failure to receive a response within a second time out period or failure to recover from a series of missing echo's causes the descriptor to be marked as unsuccessful due to a connection failure.

9. When the receive side detects a push request packet it verifies that the packet is acceptable (correct CRC fields, correct target physical ID, satisfactory time stamp, acceptable packet sequence number) and sends back an echo packet. The echo only indicates that the packet was delivered correctly. It does not imply that the receiver can perform the operation requested.

10. When the send side detects an echo packet, it removes the matching push request packet from it's retry facilities and stops the associated time out monitor and retransmission mechanism.

11. After sending an echo packet, the receive side adapter examines the indicated channel's LMT entry and descriptor list. It verifies that the operation can be performed, saves the data portion of the packet in memory and updates working registers originally obtained from the LMT and descriptor. As individual receive side descriptors are exhausted, they may trigger a local processor interrupt on the receive side or may request a remote processor interrupt to be triggered when the send side descriptor is exhausted. The receiving adapter should always have sufficient resources to move the data it receives to local memory. It may do so slowly, but can not stall for an indefinite period without making progress.

12. As each packet is received, the adapter verifies that all of the packets contain an identical descriptor sequence number and that each packet contains a data sequence number one greater than the previous. These checks insure that the receiver learns of any temporary connection failure occurring during the operation. The packet sequence, descriptor sequence, and data sequence number fields work together to enable both adapters to identify connection failures impacting one operation but still enabling subsequent operations to reestablish communications without service software intervention.

13. Eventually the receive side determines that it has received and processed all the data for a given send side descriptor. It insures that all memory updates are complete and then updates the target of push descriptor condition code, source channel, source ID, and byte count fields. It then transmits a push response packet back to the send side indicating that the operation was (or perhaps was not) successful. It transmits the packet only if it has sufficient resources to resend it later if an echo isn't returned in a timely fashion. If it can not transmit the packet due to insufficient resources, it schedules the transmission for later processing by placing the channel number in a work queue. The receive side descriptor indicates that the response packet should request a send side processor interrupt.

14. When the send side detects the push response packet it verifies that the packet is acceptable (correct CRC fields, correct target physical ID, satisfactory time stamp) and sends back an echo packet. Again, the echo only indicates that the packet was delivered correctly. It does not imply that the information can be processed (although nothing, other than a hardware failure, can prevent processing a response packet). It then checks the information, updates the source of push descriptor, and may trigger a local processor interrupt. If the send side does not receive the response within a given time out period it records a connection failure completion code in the descriptor.

15. When the receive side detects the echo packet, it removes the push response packet from it's retry facilities and stops the associated time out monitor and retransmission mechanism.

Figure 33:
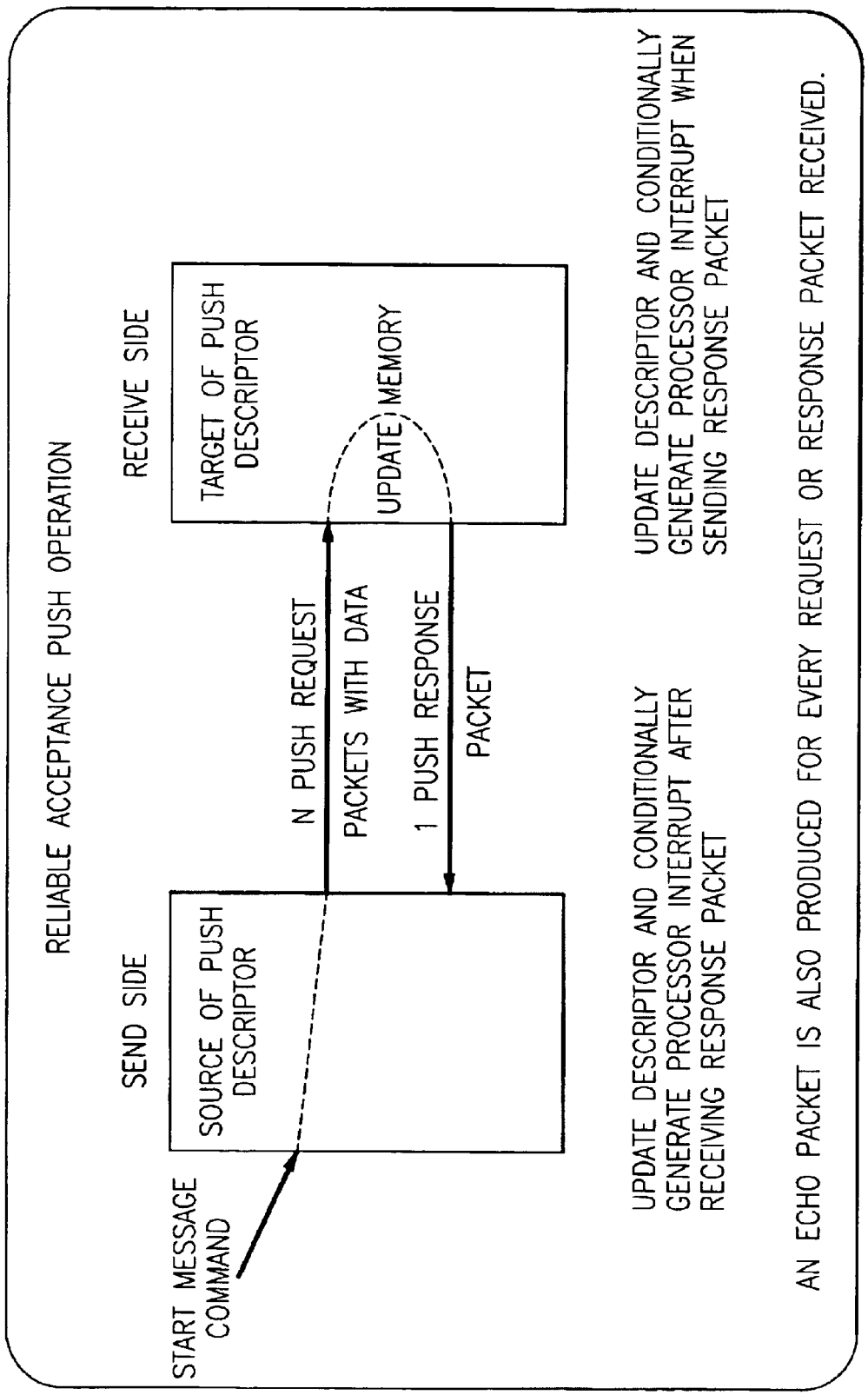
FIG. 33 is a block diagram illustrating the steps that occur in a reliable acceptance push operation.

See FIG. 33.

Reliable Delivery Pull Operation

1. Sending and receiving software identify each other's channel and logical ID values and agree on the type of transfer and on the maximum amount of data involved. This process may also use other channels allocated to such activity.

2. Sending side software defines one or more source of pull descriptors, each pointing to a region of local memory where hardware obtains the data to be transferred.

3. Receiving side software defines one or more target of pull descriptors, each pointing to a region of local memory where hardware places the data transferred from the siding side. Each descriptor identifies the channel and adapter intended to provide the data. The first descriptor has the remote start flag set.

4. Receiving side software issues a start message command supplying a local channel ID value that it received from the operating system when the channel was created. The command invokes an MMIO store instruction with the virtual address field set to the channel ID value.

5. Receiving side hardware uses the processor's address translation logic to verify that the task is authorized to issue the command and directs the command to a specific adapter. The translated real address value identifies the MMIO as a start message command, selects one adapter, and indicates the channel number that adapter should use.

6. The adapter receiving the start message command verifies that the command and the channel it references are valid and then either starts processing the channel immediately or schedules it for later processing by placing the channel number in a work pending list.

7. When the receiving side processes the channel it reads the LMT and descriptor pointed to by the LMT and gathers all information it needs to process the channel. A target of pull descriptor with the remote start flag bit set, causes a remote start request packet to be transmitted to the channel identified in the descriptor. It expects to receive an echo packet indicating that the packet was received and later a response packet indicating that a valid source of pull descriptor was detected.

8. When the send side detects the remote start request packet it verifies that the packet has correct CRC fields, correct target physical ID, satisfactory time stamp, acceptable packet sequence number and sends back an echo packet.

9. When the receive side detects the echo packet, it removes the matching remote start request packet from it's retry facilities and stops the associated time out monitor and retransmission mechanism.

10. The send side adapter examines the indicated channel's LMT entry and descriptor list. It verifies that the operation can be performed and saves the information contained in the remote start packet identifying the receive side channel and adapter LID (Logical ID). A remote start response packet is generated only if it can't perform the operation. If the operation can proceed it behaves very similar to having received a local start message command. It either starts processing the channel immediately or schedules it for later processing by placing the channel number in one of two work pending lists.

11. When the sending side processes the channel, it reads the LMT entry and the descriptor to which it points. It gathers all the information it needs into working registers including address translation and descriptor entries plus any translated real addresses it may later need plus status information modified during the sending process such number of bytes remaining to be sent. The adapter periodically exchanges information between these registers and the LMT to process other non-related activity.

12. The sending side sequentially transmits as many pull request packets as needed to transfer all the data indicated in the descriptor list. The sender expects to receive an echo packet for every request packet sent. A failure to receive an echo within a time out period causes packet retransmission perhaps over one or more alternate paths. A failure to recover from a series of missing echo's causes the descriptor to be marked as unsuccessful due to a connection failure.

13. When the receive side detects a pull request packet it verifies that the packet is has correct CRC fields, correct target physical ID, satisfactory time stamp, acceptable packet sequence number and sends back an echo packet.

14. When the send side detects an echo packet, it removes the matching pull request packet from it's retry facilities, stops the associated time out monitor and retransmission mechanism, updates the source of pull descriptor, and generates a local processor interrupt if necessary.

15. After sending an echo packet, the receive side adapter examines the indicated channel's LMT entry and descriptor list. It verifies that the operation can be performed, saves the data portion of the packet in memory and updates working registers originally obtained from the LMT and descriptor. As individual receive side descriptors are exhausted, they trigger a local processor interrupt on the receive side or may request a remote processor interrupt to be triggered when the send side descriptor is exhausted. The receiving adapter should always have sufficient resources to move the data it receives to local memory. If busy, it may do so slowly, but it cannot stall for an indefinite period without making progress. As each packet is received, the adapter verifies that all of the packets contain an identical descriptor sequence number and that each packet contains a data sequence number one greater than the previous sequence number. A failure results in reporting a connection failure.

16. Went receive side determines that it has received and processed all the data a given target of push descriptor can accept, it updates the descriptor, generates a local processor interrupt, if necessary, fetches the next descriptor from memory, and continues processing if there is any unprocessed push data.

Figure 34:
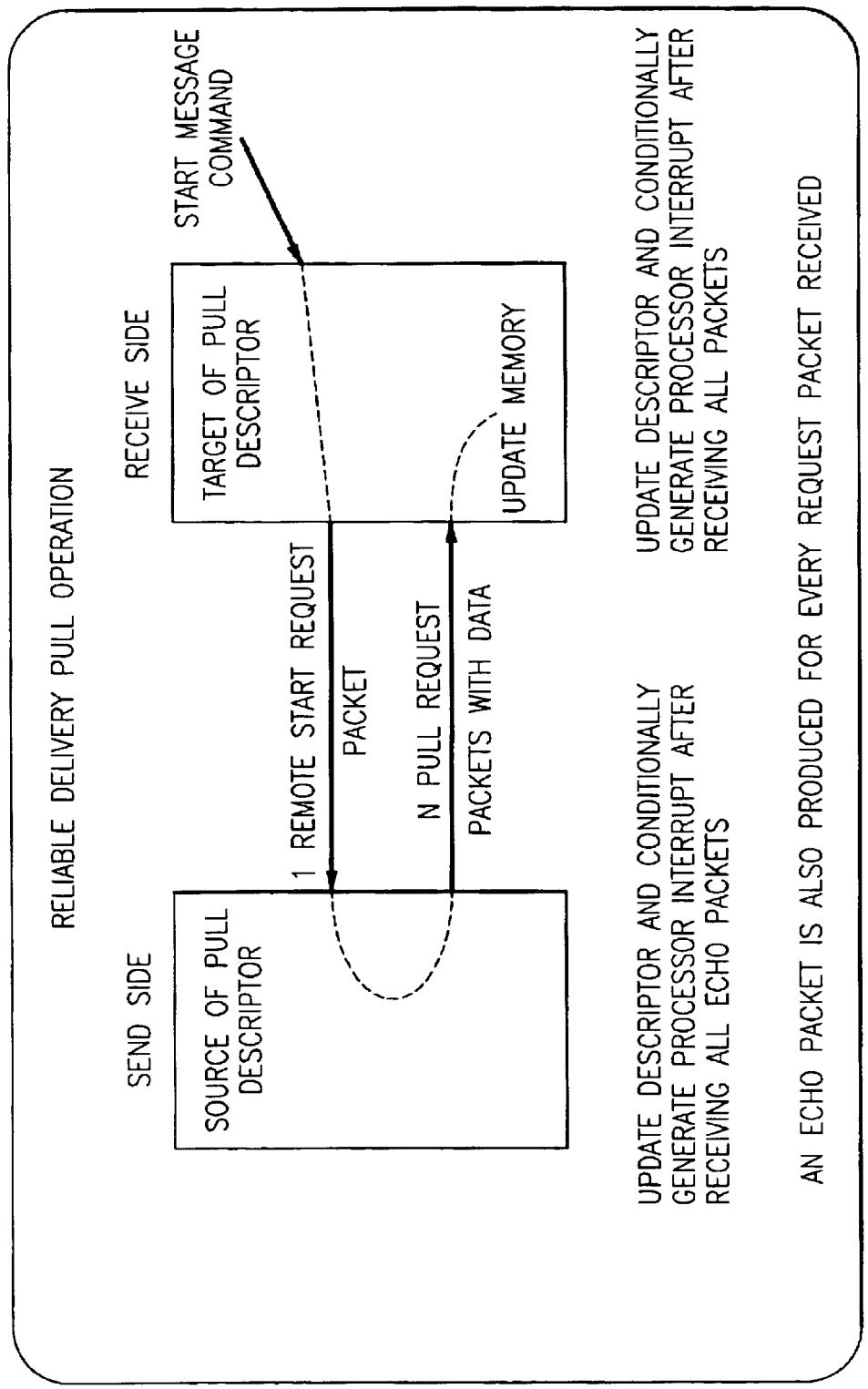
FIG. 34 is a block diagram illustrating the steps that occur in a reliable delivery pull operation.

See FIG. 34.

Reliable Acceptance Pull Operation

1. Sending and receiving software identify each other's channel and logical ID values and agree on the type of transfer and maximum amount of data involved. This process may use other channels allocated to such activity.

2. Sending side software defines one or more source of pull descriptors, each pointing to a region of local memory where hardware obtains the data to be transferred.

3. Receiving side software defines one or more target of pull descriptors, each pointing to a region of local memory where hardware places the data transferred from the siding side. Each descriptor identifies the channel and adapter intended to provide the data. The first descriptor has the remote start flag set.

4. Receiving side software issues a start message command supplying a local channel ID value that it received from the operating system when the channel was created. The command invokes an MMIO store instruction with the virtual address field set to the channel ID value.

5. Receiving side hardware uses the processor's address translation logic to verify that the task is authorized to issue the command and directs the command to a specific adapter. The translated real address value identifies the MMIO as a start message command, selects one adapter, and indicates the channel number that adapter should use.

6. The adapter receiving the start message command verifies that the command and the channel it references are valid and then either starts processing the channel immediately or schedules it for later processing by placing the channel number in a work pending list. The work pending list resides in the Local Mapping Table which is found with in the SRAM in the adapter. See reference numeral 201 in FIG. 38.

7. When the receiving side processes the channel it reads the LMT and descriptor pointed to by the LMT and gathers all information it needs to process the channel. A target of pull descriptor with the remote start flag bit set, causes a remote start request packet to be transmitted to the channel identified in the descriptor. It expects to receive an echo packet indicating that the packet was received and later a response packet indicating that a valid source of pull descriptor was detected.

8. When the send side detects the remote start request packet it verifies that the packet has correct CRC fields, correct target physical ID, satisfactory time stamp, acceptable packet sequence number and sends back an echo packet.

9. When the receive side detects the echo packet, it removes the matching remote start request packet from it's retry facilities and stops the associated time out monitor and retransmission mechanism.

10. The send side adapter examines the indicated channel's LMT entry and descriptor list It verifies that the operation can be performed and saves the information contained in the remote start packet identifying the receive side channel and adapter LID (Logical ID). A remote start response packet is generated only if it cannot perform the operation. If the operation can proceed it behaves like it would have if it had received a local start message command. It either starts operating the channel immediately or schedules it for later processing by placing the channel number in one of two work pending lists 11. When the sending side operates the channel it reads the LMT entry and the descriptor to which it points. It gathers all the information it needs into working registers including address translation and descriptor entries plus any translated real addresses it may later need plus status information modified during the sending process such number of bytes remaining to be sent. The adapter periodically exchanges information between these registers and the LMT to process other non-related activity. The LMT thus serves as a level of caching eliminating the need to refetch descriptors and/or TCE's from main memory.

12. The sending side sequentially transmits as many pull request packets as needed to transfer all the data indicated in the descriptor list. The sender expects to receive an echo packet for every request packet sent. It also expects to receive a response packet after the target has processed all of the data associated with a single send side descriptor. A failure to receive an echo within a time out period causes packet retransmission perhaps over one or more alternate paths. A failure to receive a response within a second time out period or a failure to recover from a series of missing echo's causes the descriptor to be marked as unsuccessful due to a connection failure. An individual packet can only include data from a single descriptor.

13. When the receive side detects a pull request packet it verifies that the packet is has correct CRC fields, correct target physical ID, satisfactory time stamp, acceptable packet sequence number and sends back an echo packet.

14. When the send side detects an echo packet, it removes the matching pull request packet from its retry facilities and stops the associated time out monitor and retransmission mechanism.

15. After sending an echo packet, the receive side adapter examines the indicated channel's LMT entry and descriptor list. It verifies that the operation can be performed, saves the data portion of the packet in memory and updates working registers originally obtained from the LMT and descriptor. As individual receive side descriptors are exhausted, they trigger a local processor interrupt on the receive side or may request a remote processor interrupt to be triggered when the send side descriptor is exhausted. The receiving adapter should always have sufficient resources to move the data it receives to local memory. If busy, it may do so slowly, but it can not stall for an indefinite period without making progress.

16. As each packet is received, the adapter verifies that all contain an identical descriptor sequence number and each contain a data sequence number one greater than the previous. A failure results in reporting a connection failure.

17. Eventually the receive side determines that it has received and processed all of the data for a given send side descriptor. It insures that all memory updates have completed and then updates the target of pull descriptor condition code and byte count fields. It then transmits a pull response packet back to the send side indicating that the operation was (or perhaps was not) successful.

18. When the send side detects the pull response packet it verifies that the packet has correct CRC fields, correct target physical ID, satisfactory time stamp and sends back an echo packet.

19. When the receive side detects the echo packet, it removes the push response packet from its retry facilities and stops the associated time out monitor and retransmission mechanism.

20. When the send side processes the information in the response packet it updates the source of pull and generates a local processor interrupt if necessary. If the send side does not receive the response within a given time out period it records a connection failure completion code in the descriptor.

Figure 35:
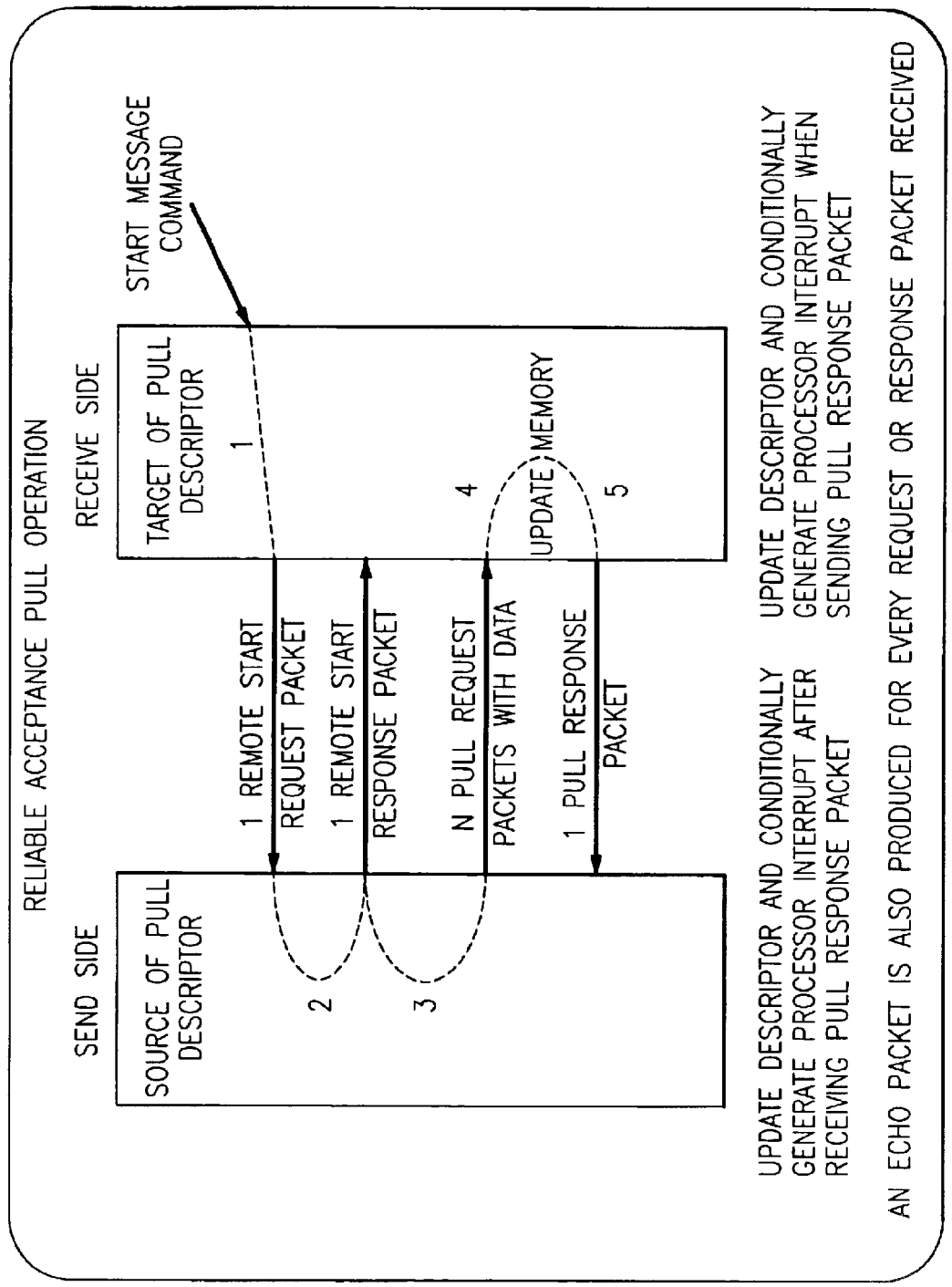
FIG. 35 is a block diagram illustrating the steps that occur in a reliable acceptance pull operation.

See FIG. 35.

Remote Write Operation

1. Master and Slave software agree that a remote type of operation may be performed. Master side software identifies the channels and the slave logical ID value to be used. Slave side software sets up a channel, without a descriptor list, that defines the local memory area that is referenced externally. This process may occur outside of the message passing architecture using some side band capability or may use previously established message passing parameters.

2. Master side software defines one or more remote write descriptors, each pointing to a region of local memory where hardware obtains data to be transferred. Each descriptor identifies the channel and adapter intended to receive the data plus the buffer offset in the slave where data is placed.

3. Master side software issues a start message command supplying a local channel ID value that it receives from the operating system when the channel is created. The command invokes an MMIO store instruction with the virtual address field set to the channel ID value.

4. Master side hardware uses the processor's address translation logic and page table to verify that the software task is authorized to issue the command and directs the command to a specific message passing adapter. The translated real address value identifies the MMIO as a start message command, selects one message passing adapter, and indicates the channel number which that adapter should use.

5. The adapter receiving the start message command verifies that the command and the channel it references are valid. The adapter then either starts processing the channel immediately or schedules it for later processing by placing the channel number in one of the two work pending lists. The channel's LMT entry indicates which list to use.

6. When the master side processes the channel it reads the LMT entry and the descriptor to which it points. It gathers all of the information it needs into working registers including address translation and descriptor entries plus any translated real addresses it may later need plus status information modified during the sending process such number of bytes remaining to be sent. The adapter periodically exchanges information between these registers and the LMT to process other non-related activity. The LMT thus serves as a level of caching eliminating the need to refetch descriptors and/or TCE's from main memory.

7. The master side sequentially transmits as many write request packets as needed to transfer all of the data indicated in the descriptor list. Information is included in each packet enabling the receiver to identify the first and last packets associated with an individual send side descriptor along with any flag bits set in that descriptor plus a buffer offset value where the slave should place the data. The master expects to receive an echo packet for every request packet sent. It continues sending additional packets only if it has sufficient resources to resend any packet it feels has not been echoed in a timely fashion. It also expects to receive a response packet after the target has processed all of the data associated with a single master side descriptor. A failure to receive an echo within a time out period causes packet retransmission, perhaps over one or more alternate paths. A failure to receive a response within a second time out period or failure to recover from a series of missing echoes causes the descriptor to be marked as unsuccessful due to a connection failure. An individual packet can only include data from a single descriptor.

8. When the slave side detects a write request packet it verifies that the packet is acceptable (correct CRC fields, correct target physical ID, satisfactory time stamp) and sends back an echo packet. The echo only indicates that the packet was delivered correctly. It does not imply that the receiver can perform the operation requested.

9. When the master side detects the echo packet, it removes the matching write request packet from its retry facilities and stops the associated time out monitor and retransmission mechanism.

10. After sending an echo packet, the slave side adapter examines the indicated channel's LMT entry. It verifies that the operation can be performed, saves the data portion of the packet in memory and updates working registers originally obtained from the LMT. The adapter, similar to the master side, periodically exchanges information between these registers and the LMT in order to process other non-related activity.

11. Eventually the slave side determines that it has received and processed all the data for a given master side descriptor. It then transmits a write response packet back to the master side indicating that the operation was (or perhaps was not) successful. It transmits the packet only if it has sufficient resources to resend it later if an echo isn't returned in a timely fashion.

12. When the master side detects the write response packet it verifies that the packet is acceptable (correct CRC fields, correct target physical ID, satisfactory time stamp) and sends back an echo packet. Again, the echo only indicates that the packet was delivered correctly. It does not imply that the information can be processed (although nothing, other than a hardware failure, can prevent processing a response type packet).

13. When the slave side detects the echo packet, it removes the write response packet from its retry facilities and stops the associated time out monitor and retransmission mechanism.

14. When the master side processes the information in the response packet it updates the remote write descriptor with the completion code determined by the slave side and may trigger a local processor interrupt. If the master side does not receive the response within a given time out period it records a connection failure completion code in the descriptor.

Figure 36:
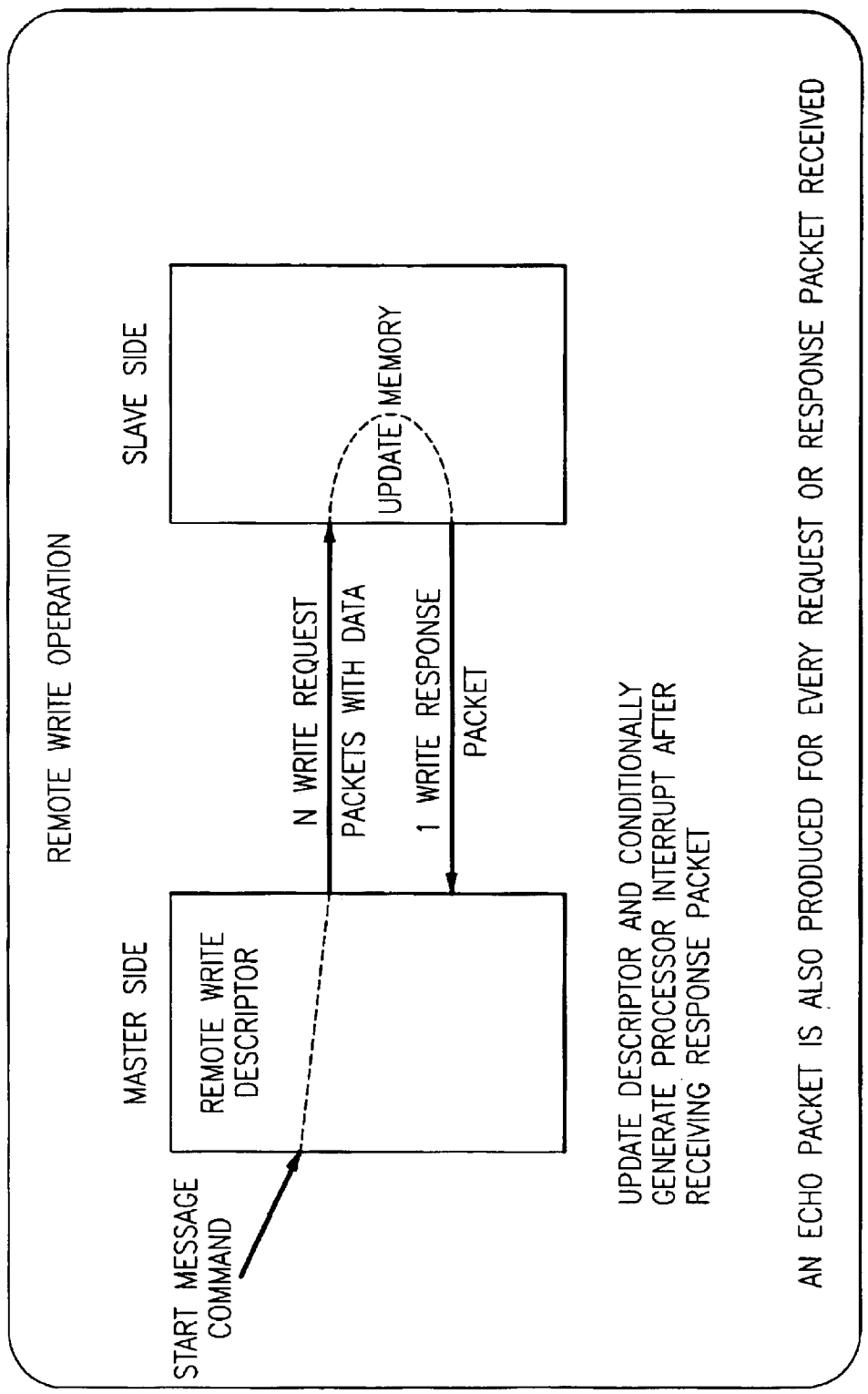
FIG. 36 is a block diagram illustrating the steps that occur in a remote write operation.

See FIG. 36.

Remote Read Operation

1. Master and Slave software agree that a remote type of operation may be performed. Master side software identifies the channels and slave logical ID value to be used. Slave side software sets up a channel, without a descriptor list, that defines the local memory area that is referenced externally. This process occurs outside of the message passing architecture using some side band capability or may use previously established message passing parameters.

2. Master side software defines one or more remote read descriptors, each pointing to a region of local memory where hardware places the data transferred from the slave. Each descriptor identifies the channel and adapter intended to provide the data plus the buffer offset in the slave where data is obtained.

3. Master side software issues a start message command supplying a local channel ID value that it received from the operating system when the channel is created. The command invokes an MMIO store instruction with the virtual address field set to the channel ID value.

4. Master side hardware uses the processor's address translation logic and page table to verify that the software task is authorized to issue the command and directs the command to a specific message passing adapter. The translated real address value identifies the MMIO as a start message command, selects one message passing adapter, and indicates the channel number which that adapter should use.

5. The adapter receiving the start message command verifies that the command and the channel it references are valid. The adapter then either starts processing the channel immediately or schedules it for later processing by placing the channel number in one of the two work pending lists. The channel's LMT entry indicates which list to use.

6. When the master side processes the channel it reads the LMT entry and the descriptor to which it points. It gathers all of the information it needs into working registers including address translation and descriptor entries plus any translated real addresses it may later need plus status information modified during the sending process such number of bytes remaining to be sent. The adapter periodically exchanges information between these registers and the LMT to process other non-related activity. The LMT thus serves as a level of caching eliminating the need to refetch descriptors and/or TCE's from main memory.

7. The master side transmits one read request packet to the target. The packet identifies the targeted channel number, amount of data to transfer and the initial buffer offset value. The slave channel's address translation table converts this to a real memory address value. The master side expects to receive an echo packet plus one or more packets containing the requested data. It sends the request packet only if it has sufficient resources to resend the packet if it feels an echo packet has not been returned in a timely fashion. A failure to receive an echo within a time out period causes packet retransmission perhaps over one or more alternate paths. A failure to receive data within a second time out period or failure to recover from a series of missing echoes causes the descriptor to be marked as unsuccessful due to a connection failure. All of the requested data is delivered back to the master side before the master starts processing the next descriptor in the list. This serial operation restriction allows the slave LMT to record information for only a single request. This is important given the fairly large amount of information needed to process remote reads.

8. When the slave side detects a read request packet it verifies that the packet is acceptable (correct CRC fields, correct target physical ID, satisfactory time stamp) and sends back an echo packet. The echo only indicates that the packet was delivered correctly. It does not imply that the receiver can perform the operation requested.

9. When the master side detects an echo packet, it removes the matching read request packet from it's retry facilities and stops the associated time out monitor and retransmission mechanism.

10. After sending an echo packet, the slave side adapter updates the selected LMT entry with the information received from the master side. The adapter should always have sufficient resources to at least do this update without stalling indefinitely for unrelated activity to complete. It then either starts processing the channel immediately or schedules it for later processing by placing the channel number in one of the two work pending lists. The channel's LMT entry indicates which list to use.

11. When the slave side processes the channel, it reads the LMT entry and gathers all of the information it needs into working registers including address translation and descriptor entries plus any translated real addresses it may later need plus status information modified during the sending process such number of bytes remaining to be sent. The adapter periodically exchanges information between these registers and the LMT to process other non-related activity. The LMT thus serves as a level of caching eliminating the need to refetch descriptors and/or TCE's from main memory.

12. The slave side sequentially transmits as many request response packets as needed to transfer all the data requested. It expects to receive an echo packet for every response packet sent. It continues sending additional packets only if it has sufficient resources to resend any packet it feels has not been echoed in a timely fashion. A failure to receive an echo within a time out period causes packet retransmission perhaps over one or more alternate paths. A failure to recover from a series of missing echoes causes the LMT to be marked with a fatal connection failure. After all the data is sent, the LMT clears the operation from the LMT making it available for another operation.

13. When the master side detects a read response packet it verifies that the packet is acceptable (correct CRC fields, correct target physical ID, satisfactory time stamp) and sends back an echo packet. The echo only indicates that the packet was delivered correctly. It does not imply that the information can be processed (although nothing, other than a hardware failure, can prevent processing a response packet).

14. When the slave side detects an echo packet, it removes the matching read response packet from it's retry facilities and stops the associated time out monitor and retransmission mechanism 15. When the master side competes the transfer of all the data requested to memory. It updates the remote read descriptor and advances to the next descriptor in the list.

Figure 37:
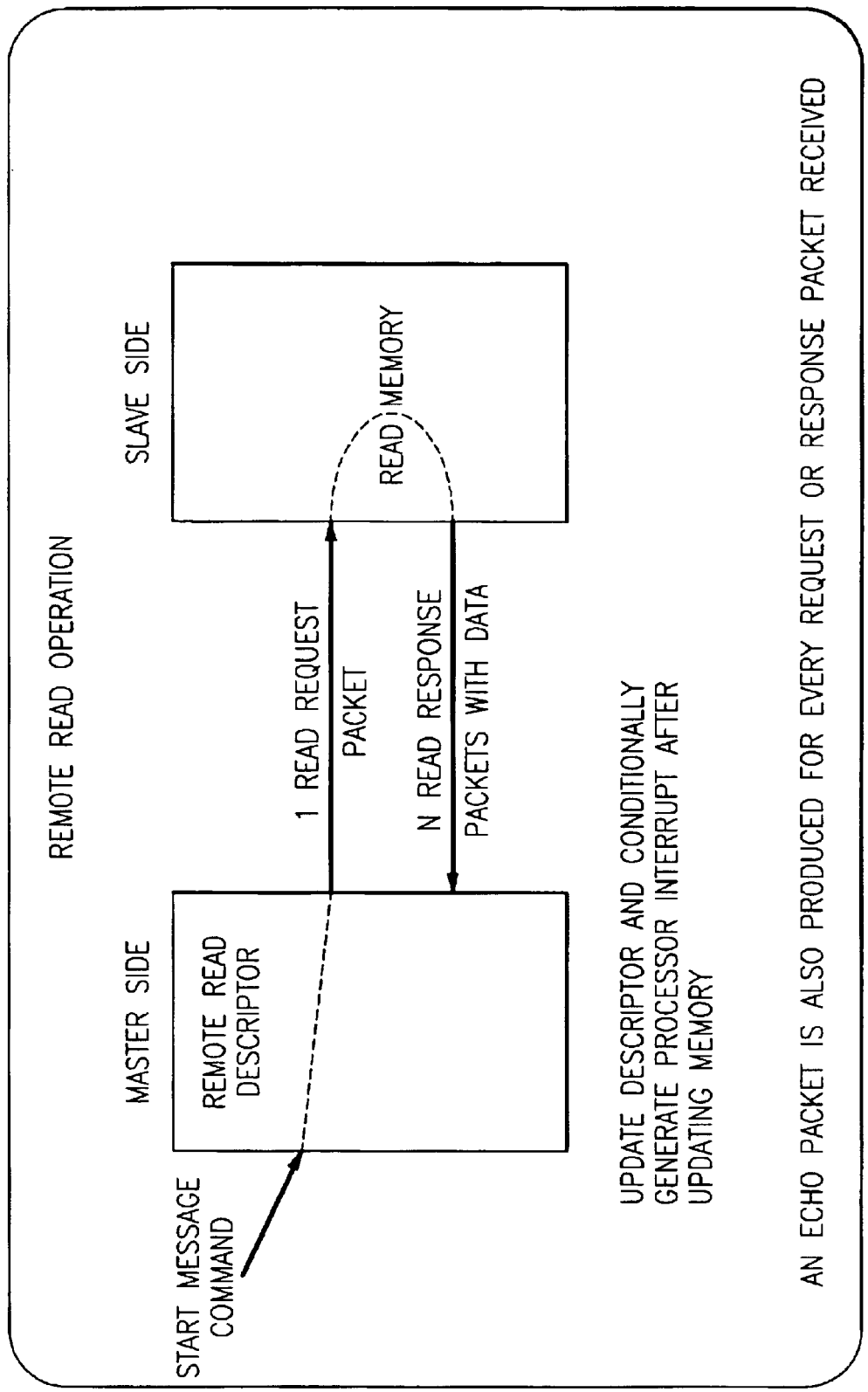
FIG. 37 is a block diagram illustrating the steps that occur in a remote read operation.

See FIG. 37.

Hardware Considerations

Left Hand Side Macro (Logical Interface)

Figure 38:
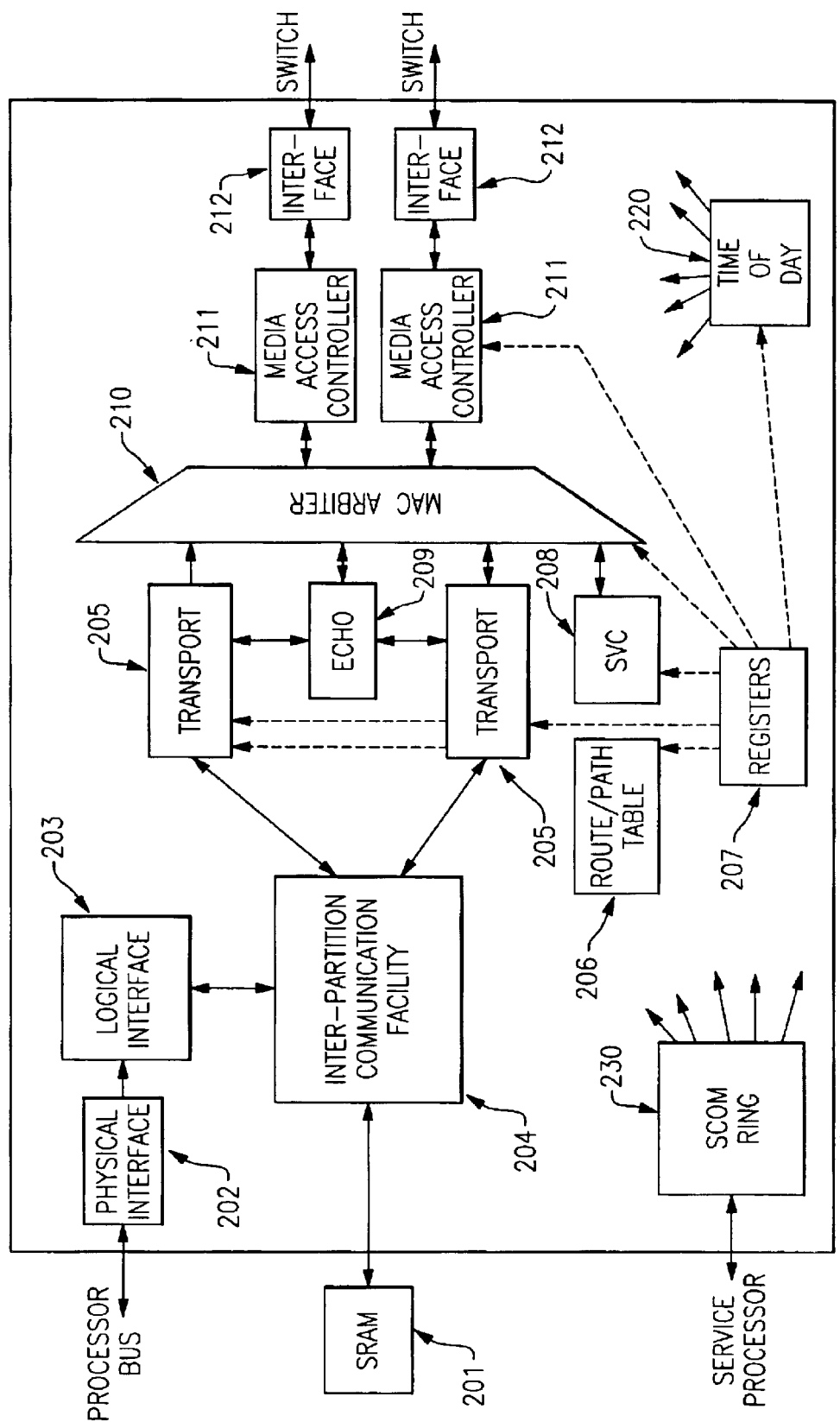
FIG. 38 is a block diagram illustrating the components of an adapter designed to carry out the message passing operations described herein.
Figure 39:
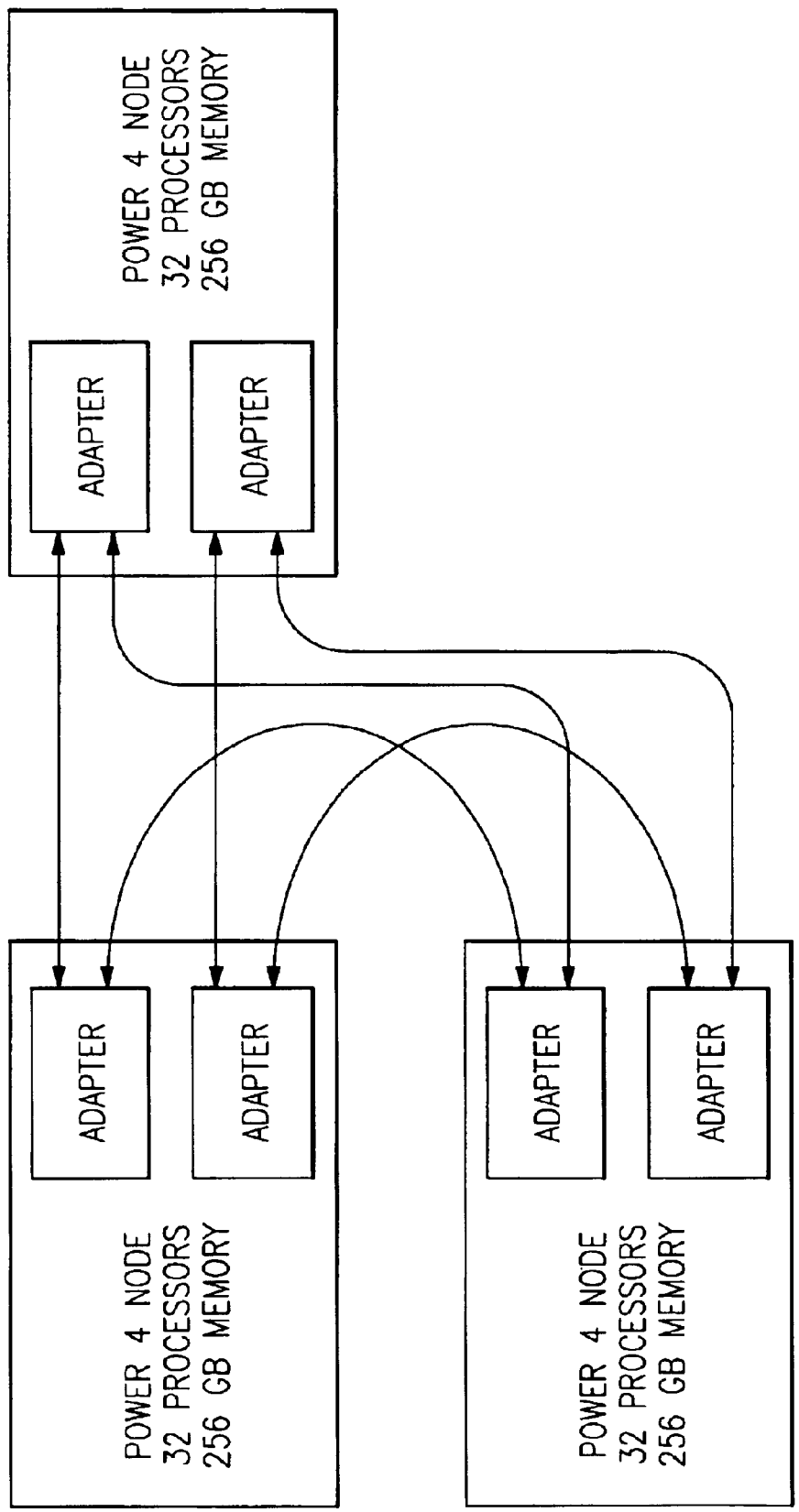
FIG. 39 is a block diagram illustrating a configuration of servers and adapters employed in a data processing system.

The so-called Left Hand Side logic, also referred to as the Logical Interface 203 is broken out separately in FIG. 38 to illustrate that it is through this logic that the Interpartition Communication (IPC) macro 204 is connected to the processor bus. In order to achieve this connection, the logic within the LHS accommodates an interface to IPC 204 in addition to its register interface. This register interface is provided through the SCOM ring which is shown in FIGS. 38 and in more detail in FIG. 49. The LHS logic is broken into two blocks. The first block, which is the one that receives commands from the processor bus is called the From_Processor_Bus_Portion. This logic decodes the address and determines where the command is to be forwarded. The possible destinations are: a register within the adapter chip or the IPC microcode. In the case of a register within the adapter, the bus command is placed on the internal register ring called the SCOM (Scan COMmunication) ring. See FIGS. 38 and 49. Finally, in the case of an address corresponding to the local DMA logic, the bus command is forwarded to the DMA logic directly. The logic block that transmits data to the processor bus is called the To_Processor_Bus_Portion. This logic handles the transmission of data onto the processor bus from the SCOM register ring and from the IPC.

Media Access Controller (MAC)

Figure 40:
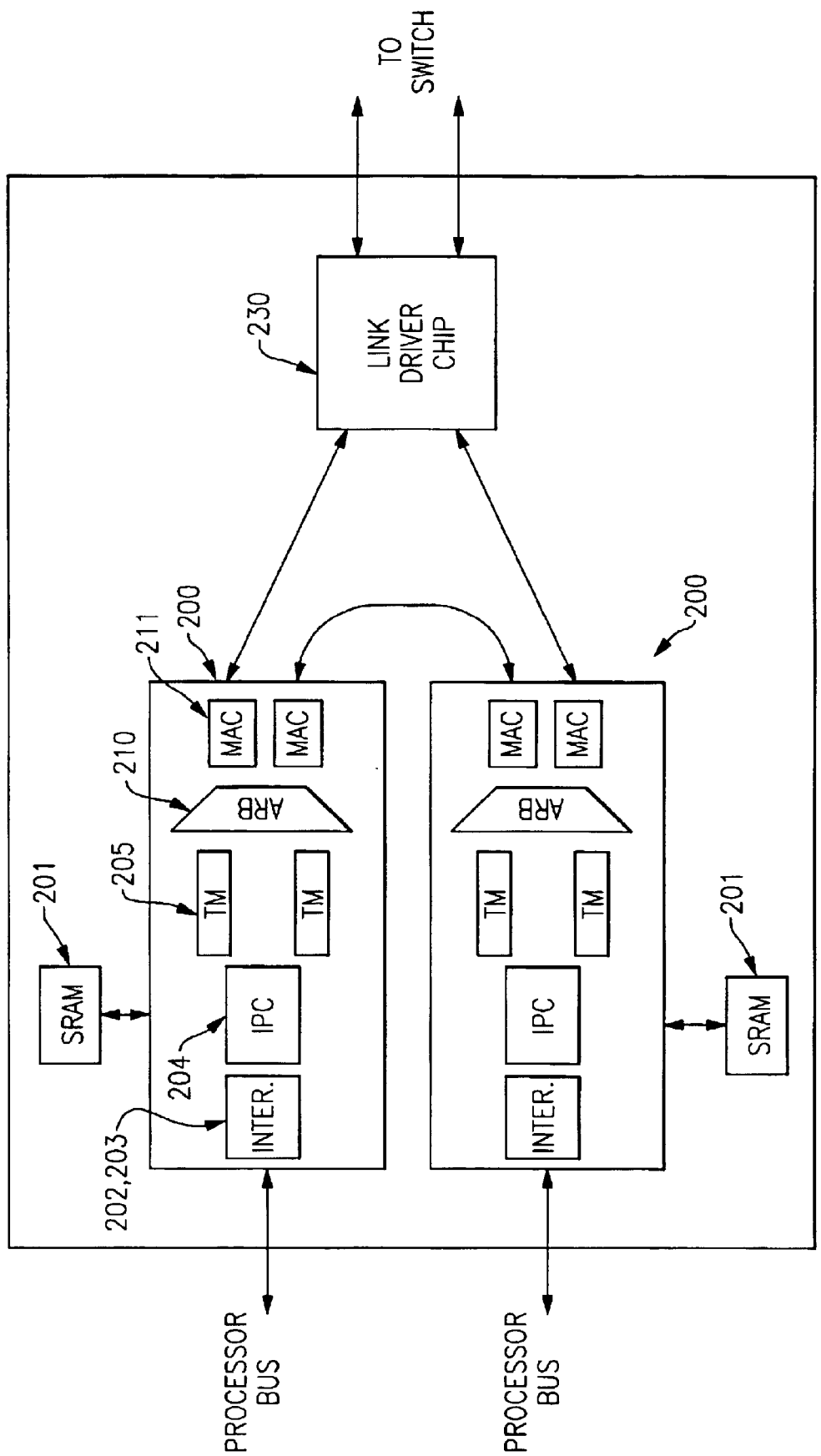
FIG. 40 is a block diagram illustrating the role and function of the Link Driver Chip.
Figure 41:
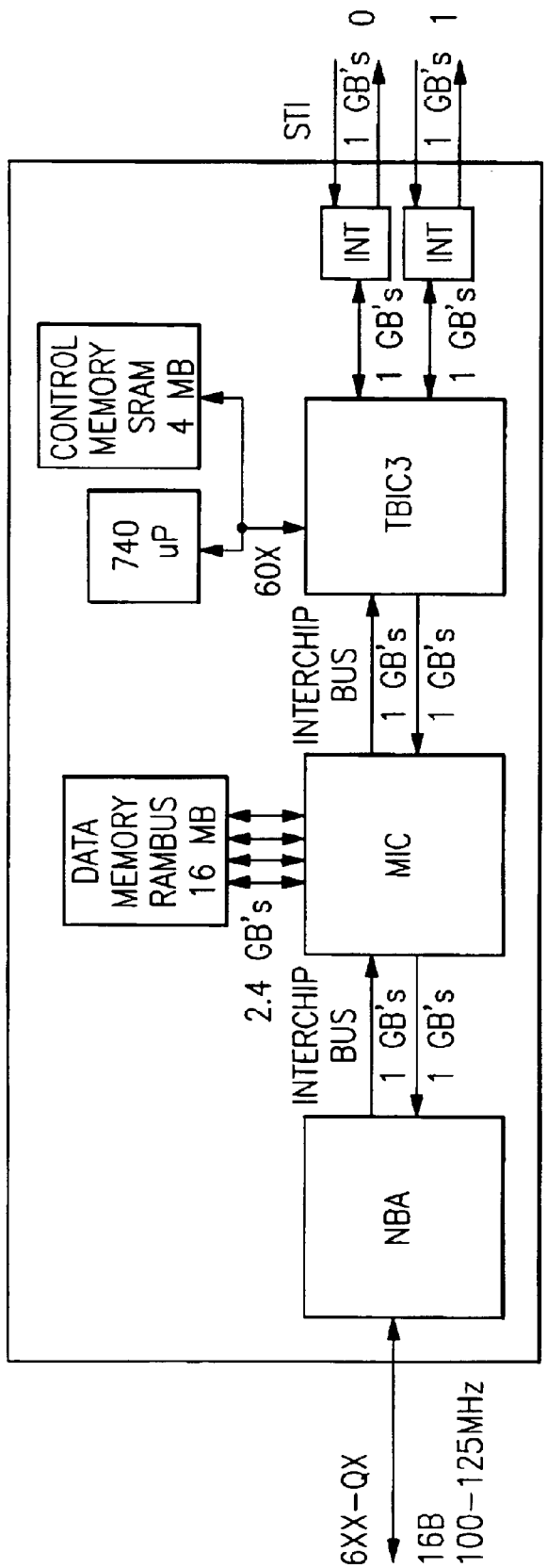
FIG. 41 is a block diagram illustrating the components employed in a different, earlier, less sophisticated communications adapter.
Figure 42:
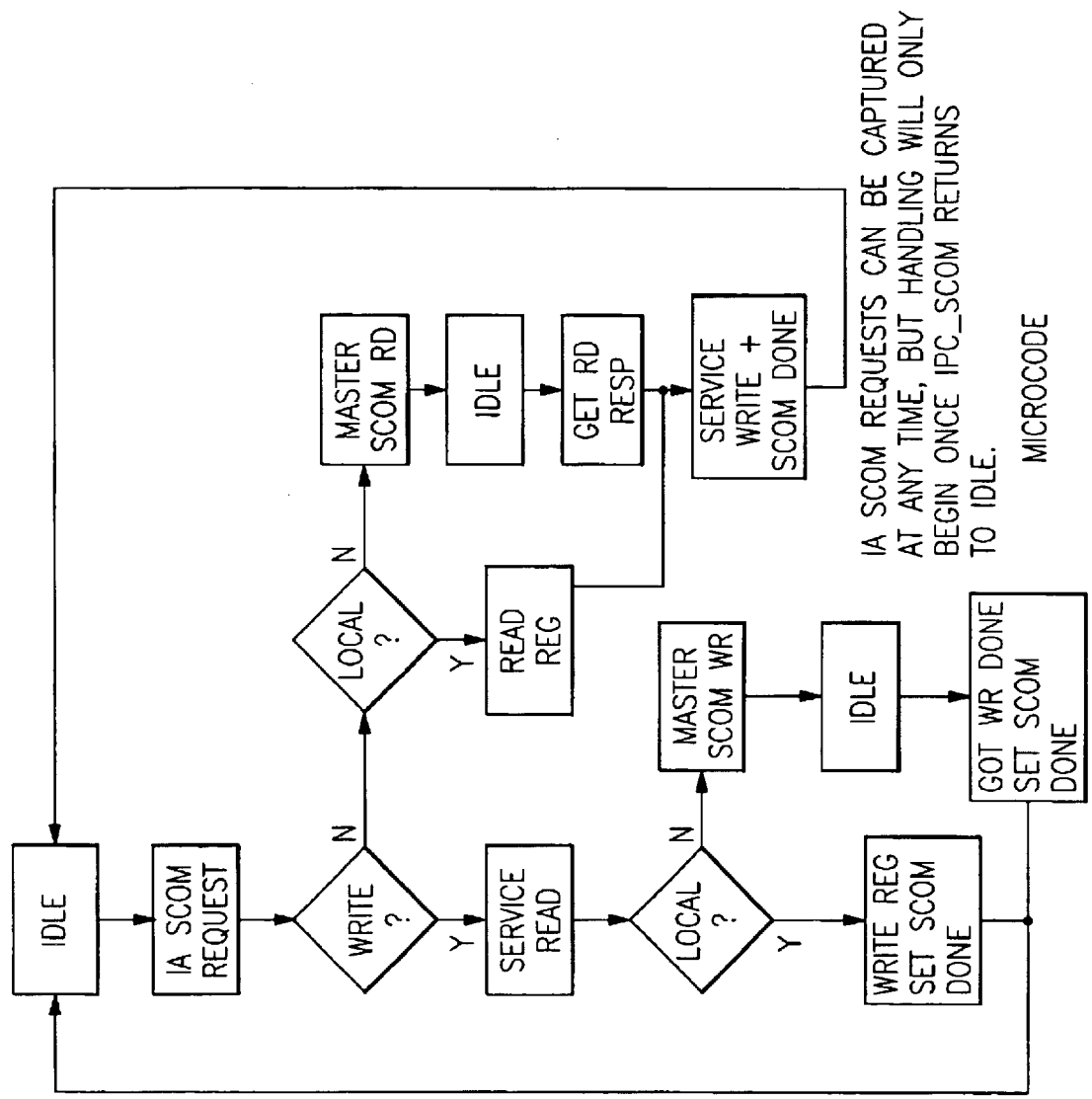
FIG. 42 is a flow chart illustrating the operations performed by microcode controlled portions of the communications adapters of the present invention.
Figure 43:
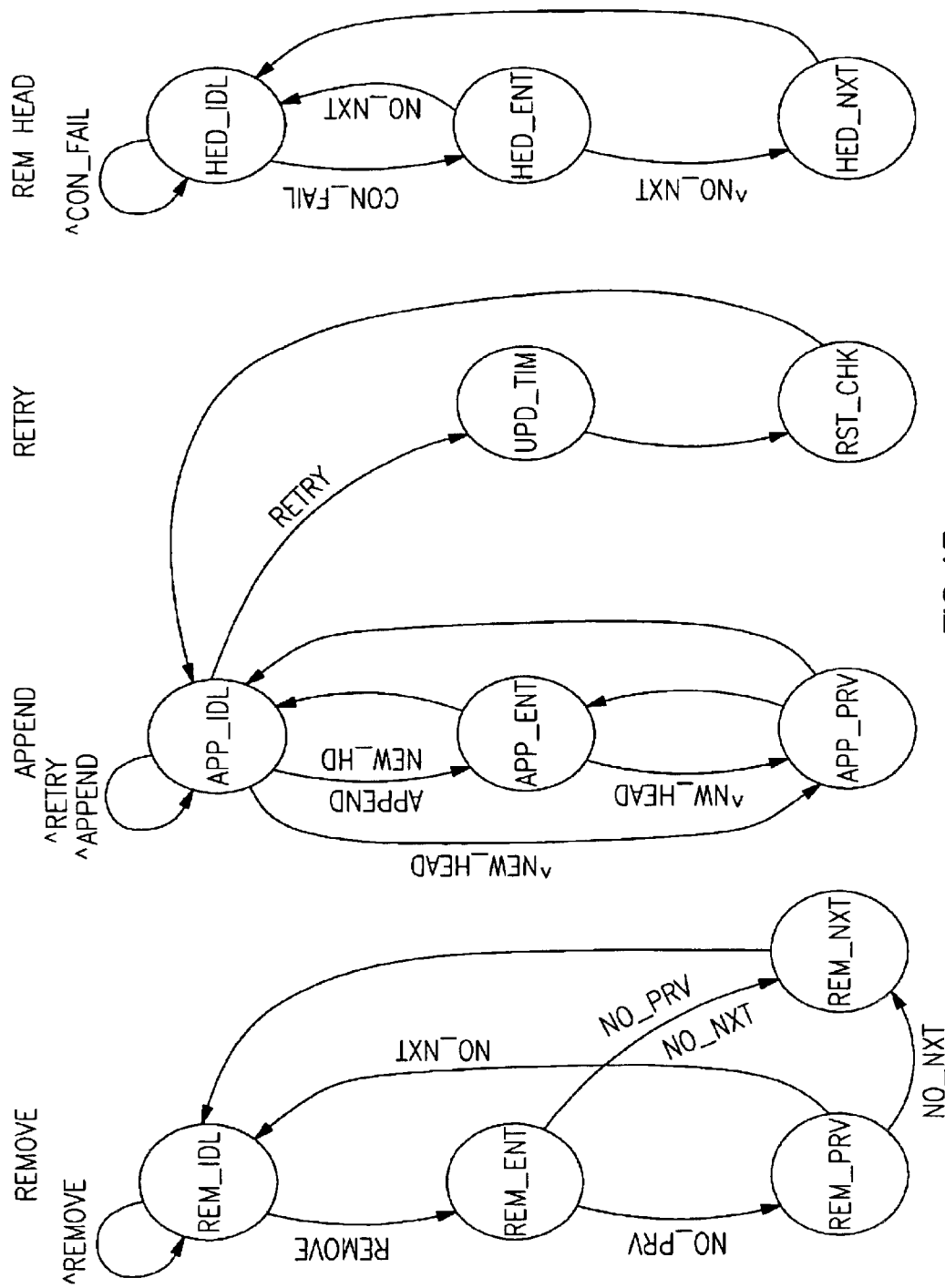
FIG. 43 is a set of state diagrams illustrating state transitions that occur during the automatic tracking of bad communication paths.

The Media Access Controller (MAC) (reference numeral 211 in FIG. 38) provides the adapter with a connection to the LDC (Link Driver Chip—see reference numeral 230 in FIG. 40). This implements the link level protocol to communicate with the switch fabric including the reliable physical layer connection from end-to-end (node-to-node) of flit granules of data. (As used herein, the term "flit" refers to the smallest amount of data that is passed through the fabric of the switch). There are two ports in the current adapter design, so there are two instances of the MAC logic. The MAC transmits packets using virtual lanes. The concept of virtual lanes is that different "virtual" lanes of traffic are evenly multiplexed over a single "real" lane. In the case of the current implementation, eight virtual lanes are transmitted over a single real interface. Each of the virtual lanes has its own flow control mechanism, so that if one of the lanes gets backed up, it does not affect the flow of the other lanes. The MAC is split into a send block and a receive block. The interface between the adapter logic and the send block consists of a single data interface with a sideband control interface to indicate the virtual lane over which the data is transmitted. The interface between the adapter logic and the receive block comprises eight data interfaces corresponding to the eight virtual lanes.

MAC Arbiter Macro

The Media Access Control (MAC) Arbiter 210 is comprises two portions: a send block and a receive block. Each block is designed for minimal latency. The send block arbitrates between eight virtual lanes for access to the two send MACs. Even though the Send MAC transmits the data using the virtual lane concept, the input port is a single interface with a sideband control interface which indicates which virtual lane on which the data is to be sent. The smallest unit of transmission into the MAC block (macro) is a flit, which is currently designed for 32 bytes. The arbitration is programmable so that the lanes which transmit NUMA non-uniform memory architecture) traffic can be set up to arbitrate on a packet basis (a single NUMA packet is up to 5 flits) and the lanes carrying DMA traffic can be set up to arbitrate on a single flit basis. The Receive portion of the MAC Arbiter block 210 presents the traffic from all eight virtual lanes simultaneously over eight interfaces. There is a receive arbitration block on each separate virtual lane. This logic arbitrates on a packet basis between the two incoming signal lines from MACs 211. See FIG. 38.

Time of Day (TOD)

The Time of Day functional block 220 provides a mechanism for packet identification and cross-network data synchronization. The Time of Day logic 220 is provided separately herein so that it is easily shared with other portions of the adapter design. It includes a Time-of-Day register, used to time stamp packets, a synchronism mechanism to maintain a common value in all TOD registers in all adapter chips within the system, plus a Reference Clock generator used by the node to keep all node timer facilities consistent within the entire system

Service

The Service buffer 208 is simply a 40 byte register that is written to or read directly by a processor as an entity within the chip's address space. The service logic uses one of the virtual lanes for transmission across the switch links. Even the route code for the service packet is written in by the processor. The result is that a service packet is always a single 32 byte flit.

Transport Macro

The adapter Transport Macro (TM) is a pluggable entity that implements the transport layer for a single virtual channel across the switch. While the MAC guarantees point-to-point in-order delivery over a cable between two link ports, the Transport Macro guarantees end-to-end in-order delivery of data, potentially across multiple switches. The function of the Transport Macro is very similar to that of the overall adapter macro, but the Transport Macro does not have any constructs specific to the transmission of processor bus commands. An example of a bus specific construct is the Request buffer within the adapter macro. This buffer is used to record processor bus requests sent over the switch link. When the associated response returns, the entry within the Request buffer contains the bus tag for the response when it is put on to the processor bus. The Request buffer is not in the Transport Macro. Any operations specific to the protocol transported by the Transport Macro (such as the DMA protocol) are the responsibility of the logic driving the Transport Macro. The Transport Macro in-order reliable delivery of packets by assigning an incrementing sequence number to each packet and transmitting that number with the packet. At the receiving side, if the packet is received correctly and the sequence number is the next one expected, then an acknowledgment packet is sent back to the sender. At the sender, if an acknowledgment packet is not received for a packet within a time out period, then the attached protocol engine (that is, the IPC) is notified to retry the packet. See FIG. 38.

Route/Path Table

While each copy of the Transport Macro logic 205 independently implements a single virtual lane, they each have access to a set of common functions. These functions include the Timer macro and the Route Table 206. The Route Table is used only by the copies of the Transport Macro. Thus, in the current adapter design, access to the route table involves arbitrating between two Transport Macros. The logic is designed so that it can handle arbitration of up to three Transport Macros. The Route table contains control information that is common between all of the Transport Macros. This includes the switch route codes, and current path values for up to 1,024 end points in a system, the physical node numbers for all of the end points in a system, and the physical node number of the adapter chip within the system. So that the changes to the adapter logic are minimized, the adapter macro only uses its own Route table, which addresses up to 64 end points (8 nodes with 8 adapter chips each).

Interpartition Communication Facility (IPC)

One of the primary functions of the adapter chip is to provide data movement services for message passing protocols such as IP and MPI. It does this by providing hardware to move data between the server's main memory and the link through the switch. DMA packets are constructed by the Interpartition Communication facility on the chip, and are up to 2K bytes in size in the current implementation. The protocol by which the upper level software layers communicate the data movement instructions to the hardware is called the DMA Protocol Architecture and is described in detail elsewhere herein. In short, the DMA implements a large number of independent software windows which are assigned to different applications. Each window has a corresponding structure in main memory called a descriptor list which is a linked list of work items. At initialization, an MP (message passing) application is assigned a number of windows. When the application wishes to send some data over a particular window, it builds a descriptor list entry with the necessary information about where to get the data from (local address), and where to send the data to (destination node and window number). The application then accesses a control location on the adapter chip corresponding to the subject window. This action is called ringing the doorbell for the window. If the DMA engine is free, it fetches the descriptor element for the window and executes the movement of data from the specified local memory location to the specified window on a destination node via the switch links. If the DMA engine is not free, the request to move data is queued. All "receive operations" using the adapter are preposted. When an application is going to receive data over a particular window, it builds a descriptor list entry with the necessary information about where to put data received in on that window. When a packet is received in over a switch link, the DMA engine fetches the next descriptor element for the window specified in the packet header, and executes the movement of data from the switch interface to the specified location in local memory. In the past, the message passing adapters for the RS/6000 servers have been implemented with an embedded microprocessor and associated onboard firmware. This approach allowed for a flexible method of offloading from the main processor the task of data movement to and from the switch. With the newer design, the link bandwidth is increased over the previous generation by a factor of four and the number of processors in a node is doubled. Using an "off-the-shelf" embedded microprocessor is not able to sustain the traffic capable of being passed over the new processor bus. Designing hard coded state machines would satisfy the speed requirement, but would not be flexible enough to easily modify. The design point chosen for the present adapter chip is called the Interprocessor Communicator (IPC) and is a hybrid between a microprocessor and a state machines. The core of the IPC is an optimized instruction processor that executes embedded firmware to support message passing level functionality. It is composed of a 64-bit ALU (arithmetic and Logic Unit) with an associated sequencer and a hardware dispatch unit that implements 16-way hardware multithreaded operation. This means that up to 16 tasks can share execution time on the ALU, and the swapping between tasks is controlled by a hardware unit. Because it is a programmable element its functionality is modifiable. It also implements complex recovery functions difficult to achieve in a pure hardware solution. The function of a task is to move a packet of data according to the instructions contained within a descriptor element. Within the IPC there are buffers in which the packet headers are contained and manipulated, and data buffers through which the data portions of packets are either gathered or scattered. Programmable data movers support the sequencer in moving data in/out of the buffers. The instructions for the IPC are contained on chip in a small on-chip 16 KB SRAM (around 16 kilobytes). The control store for the software windows is called the local mapping table (LMT), and is contained in 8 MB of SRAM external to the adapter chip, but on the same logic card. This amount of memory is enough space for 16k windows plus additional paging space for the IPC instruction store.

Link Driver Chip

The LDC, or Link Driver Chip, provides the physical connection to the switch links. This design also allows versions of cards to be built that connect to other physical link technologies such as fiber-optics. See FIG. 40.

Microcode

Sequencer-Issued SCOM (Scan COMmunication) Ring requests

The Sequencer has the ability to issue SCOM requests through the IPC_SCOM. The sequencer has the same rights as the CSP (Converged Service Processor) (bit 7 of the SCOM control word is "1"). When the sequencer issues an SCOM request, it drives either scom_write or scom_read high for one cycle, and puts the target address on scom_address during the same cycle. The IPC_SCOM unit handles this request immediately if it is idle, or at the end of the current request if it is currently processing a request. When IPC_SCOM finishes the SCOM request on behalf of the sequencer, it sets scom_done high for one cycle, signifying that the sequencer is free to issue another request. The sequencer is on its honor not to issue more than one scom request at a time—if the sequencer attempts to issue more than one request at a time, no guarantee can be made that both requests are fulfilled (one request may be lost). The source/target of all scom requests the sequencer issues is register 0 of the Global Register High file (GRH0). Therefore, on an scom_write, IPC_SCOM reads GRH0 through the sequencer service unit, then issues an SCOM request on the scom ring (if the destination register is not local), and uses the data it read from GRH0 as the data to be written. When IPC_SCOM receives the write done SCOM response, it sets the scom_done signal to notify the sequencer the operation has completed. Similarly, on an scom_read, IPC_SCOM reads the appropriate SCOM register (either through the ring, or by reading a local register), then writes the data into GRH0 through the sequencer's service port. When the service port transaction has completed, IPC_SCOM drives scom_done high for one cycle to signify that the transaction completed. A flowchart is shown in FIG. 37.

AMAC Adapter Trace Memory

A portion of the Adapter Memory is preferably configured to function as a trace FIFO queue for microcode. The register which defines this area is the AMAC (Adapter Memory Access Controller) Adapter Trace Memory Range Register. When the microcode writes to the AMAC Adapter Trace Memory Access Register, IPC_SCOM causes a service access to the AMAC. Consecutive writes by the sequencer cause successive writes into Adapter memory, wrapping back around to the beginning of the Adapter Trace Memory range. For instance, if the Adapter Trace Memory Range Register is set to "0x010," then the first 16 doublewords of Adapter Memory is used for the sequencer's trace area. The first write by the sequencer to the Adapter Trace Memory Access Register writes into address 0, the second to 1, etc., wrapping around after 16 writes.

Time of Day

TOD Slave Mode

The slave checks its TOD value with the master's value from a received broadcast to see if there is a discrepancy. If so, a slave corrects its TOD value accordingly.

TOD Value

The slaves read the broadcast packet from the MAC 211 (Receive side). The broadcast packet format is the same as the broadcast sent from the master. In between broadcasts, the slaves simply increment their TOD values whenever there is a rising edge on the clock (running at 75 MHz in the currently preferred embodiment). When the tod_control_valid_out signal line from the MAC 211 (Receive side) goes high, a slave compares the TOD value from the broadcast to its own. If it is the same, then this slave is already in sync with the master, and does nothing. If the TOD value from the broadcast is higher, the slave loads it into its own TOD value. If the TOD value from the broadcast is lower than its own, the slave loads the value from the broadcast into a copy called tod_compare. It then increments the tod_compare at full speed and its own TOD value at half speed (every other 75 MHz edge in the current embodiment) until the TOD value is equal to tod_compare. It is not desirable to simply load a lower TOD value because the TOD value would go "backwards" in time. This would confuse packets that depend on a time stamp. An exception to this final case is when the software update bit is high on the TOD control packet. In this case, the broadcast value is always loaded into the slave TOD register. After a slave has received its first valid broadcast (see Filter below for definition of valid broadcast), if it misses too many broadcasts, it sets its TOD value to invalid (bit 0="0"). This is because, if a slave misses too many broadcasts, it has not been adjusted for any drift, and cannot guarantee that its TOD value is still valid. The number of broadcasts after which a slave sets its TOD to invalid is determined by the software register trigger_bcasts_missed+1, which defaults to 22 broadcasts (16 hexadecimal). (In this example, the logic takes the appropriate actions on the 23rd missed broadcast.) If a slave mode adapter has an invalid TOD, it sets an error bit called tod_inval_err. In addition, the mp_avail signal to the message passing logic is cleared (but not the mp_avail register bit).

If the 75 MHz oscillator fails, and the enable bit in the tod_gen register is high (no_75 mhz_osc_er_en, register 0x21030), then the adapter also sets its TOD bit to invalid (bit 0="1"). This also causes the LEM (Local Error Macro) bit for the no_75 mhz_osc_err signal line to go high. This does not clear the mp_avail signal, because message passing logic can still run in a satisfactory manner. If it is a slave mode adapter, then the TOD is updated when it receives a broadcast from the master, thus creating a "coarse" TOD value. If it is a master mode adapter, then the TOD bit is set to "clear," thus causing other slaves to miss broadcasts, and causing another adapter to take over as master. Then, this adapter subsequently becomes a slave. For a complete description of the master/slave recovery scenario, see below.

Filter

It is very desirable to insure that the Time of Day (TOD) packets from the MAC are good. Since there are two MAC ports, it is also desirable to arbitrate between both. First, the following checks are performed on the broadcast from each MAC port, then, the packets from the MAC port which passes the tests is chosen. If both MAC ports pass, then port 0 is chosen. The result is redriven to both MAC send ports.

The broadcast should have good parity on both the TOD value packet and the TOD control packet.

The TOD_valid bit (bit 0) must be equal to 1 (Otherwise, this is an invalid TOD)

The master id from the broadcast should be "greater" than or equal to its own m_id_copy The control packet should contain a sequence number which is different from its own copy. If the sequence number is the same, then this means that the slave already received this broadcast and that the broadcast is rejected. The exception to this rule is if the master id from the broadcast is greater than the m_id_copy. In this case, the sequence number is ignored.

The final broadcast packet seen by the rest of the logic is contained in the internal facilities eff_tod_ctl_valid, eff_tod_ctl, and eff_tod ("Eff" stands for "effective"). For timing purposes, these facilities contain the appropriate MAC data 1 cycle after it appears on the MAC.

If neither MAC port passes the filter tests, the TOD logic counts the broadcast as a missed broadcast, and the rest of the logic acts as though no broadcast was sent The broadcast is not redriven to the MAC send ports in this case. The error bit bad_tod_packet_err is set when a broadcast is missed due to parity errors.

TOD Recovery/Failover

A recovery mechanism is provided in the event that a node or an adapter chip on the node which is configured as the TOD master goes down. The failover mechanism possesses the following aspects:

1. The slaves configured as the backup are provided with the ability to take over as master for their respective switch planes.
2. "Stale masters" (that is, master nodes which fail, but then come back online still configured as master nodes) are provided with the ability to know that they are stale and to thus relinquish control.
3. A mechanism is provided to assign a new backup node when the new master takes over.
4. If the backup slave goes down before the master, an alternate backup is provided. The responsibility for detecting that the masters have gone down rests with the backup slaves. If a master has gone down, then it cannot be trusted with this responsibility. Additionally, if only one adapter on a master node goes down, the entire node relinquishes control as the master, since the adapter chips on a node are all in either the master mode or all are in the slave mode. A backup slave node takes over as the master when any of the adapters on that node misses too many broadcasts. This value is less than the trigger value for determining that too many broadcasts on a slave adapter have been missed (trigger_beasts_missed, in register 0x21030) and in this case, the local TOD value can no longer be trusted. This is because an adapter with an invalid TOD value should not be the new master. At initialization, software chooses a node destined to function as the TOD master, and sets a register (bckup_or_mas_id, in register 0x21030) on each adapter chip on that node to the same initial value. (The exact value is left to the discretion of software.) This is the initial master id. On the first broadcast, the slaves load in this value from the TOD broadcast control packet, and keep it as m_id_copy.

Software chooses up to seven nodes to be backups at initialization by setting a backup enable bit (bckup_en, register 0x21010) and assigning a backup id to each node (bckup_or_mas_id, register 0x21030). The backup id is selected to be "higher" than the current master id, taking wrapping into account. For example, a backup id of "1" is "higher" than a master id of "E" (hexadecimal). Hardware limits the wrapping to a range of 7 backups. Therefore, an id of "D" is "lower" than an id of 5, since only 7 backups are allowed. Each switch plane has a hierarchy of several backups. For example, if the current master_id is "0," software assigns nodes to backup ids of 1, 2, 3, etc. When an adapter on a backup node misses too many broadcasts, it takes over as master, and sets the master id on its outgoing TOD broadcast equal to its own backup id. The new master also sends a signal (takeover out) to the other adapters on the node (in different planes) to tell them to take over as master on their respective planes. This signal is driven low for about 100 core logic cycles, which causes all of the takeover inputs to the other adapters on the node to be driven low as well. This is to preserve the uniform master/slave configuration, since adapter chips on a node are either all master or all slave for their respective planes. (Note: For Pass #2, an adapter takes over as master when its takeover_in input is driven low, but only if it is enabled as a backup. For Pass #1, the adapter takes over when takeover_in is driven low, even if it is not enabled as a backup.) The slaves, in turn, only accept a broadcast with a master_id value that is "higher" than its own m_id_copy, assuming a good broadcast under other conditions. The slaves then load their local copies (m_id_copy) with the new master_id value. If a stale master tries to send a packet, the slave sees the "lower" master_id value and rejects the broadcast. Once again, when determining whether or not the master_id from the broadcast is "higher" or "lower," wrapping is taken into account. A master_id of "1" from the broadcast is "higher" than a master_id copy of "E" (hexadecimal). A master_id of "D" from the broadcast is "lower" than a master_id copy of "5" since "D" is out of the range of 7 backups. Meanwhile, the master continually checks its MAC Receive ports to ensure that it is not a stale master. If the master_id value from the broadcast is "greater" than its own, it realizes that it is a stale master, and therefore is to become a slave. If it sees nothing, or possibly its own packet, then it continues normal operation. A backup node determines how many missed broadcasts to wait before takeover using the value set forth in the equation below. The number of broadcasts to wait is determined by a register called init_trig_takeov (number of broadcasts to wait before the first backup takes over), and the difference between the backup id and the current master id. Table 34 below shows an example which uses this equation.

$$takeover\_trigger = init\_trig\_takeov + 2 \times (bckup\_or\_mas\_id - m\_id\_copy - 1)$$

Example
Current Master id Is 05, Initial Trigger Is 10 Broadcasts

Using Table 34 below as an example, suppose the initial trigger is 10 broadcasts. (The first backup, whose id of "6" is only one more than the master_id "5," waits 10 broadcasts before taking over as master.) The bckup_or_mas_id is "7," and the current master_id is "5." This backup waits for 12 broadcasts before taking over, because:

$$takeover\_trigger = 10 + 2 \times (7 - 5 - 1) = 10 + 2 \times 1 = 12.$$

Therefore, if the backup with id number "6" goes down before the master goes down, backup "7" takes over. The actual switch to master mode takes place one broadcast after the takeover_trigger. For example, if the takeover_trigger=10, then the takeover occurs on the $11^{th}$ missed broadcast.

TABLE 34

Number of broadcasts to wait vs. backup ID (example)

| Backup_or_mas_id | Broadcasts |
|---|---|
| 6 | 10 |
| 7 | 12 |
| 8 | 14 |

The bckup_or_mas_id to detect if an adapter is a stale backup (that is, this backup adapter failed, and a backup adapter with a higher id took over as master.) Using the example from Table 34 above, if backup adapter "6" comes back online after backup "7" took over, it realized that it is a stale backup by comparing its backup id of "6" with the new master_id of "7." Since the new master_id of "7" is greater than "6," backup adapter "6" turns off its bckup_en bit, updates its m_id_copy value to "7," and becomes a non-backup slave adapter. Software acts to continually ensure that enough backups per plane exist such that there is always a backup to the current master.

A backup slaves switches to non-backup slave if a parity error occurs in the incoming broadcast or it the link is down. If there is a problem with the link on this adapter, then it cannot be trusted to potentially become a master. If a node takes over as master, each adapter sets its bckup_en bit to "0." This prevents unintended backup slaves if the master should subsequently become stale. An adapter sets an error bit called master_rec_err (master recovery error) whenever the adapter changes mode for hardware reasons. Any of the following conditions causes the master_rec_err bit to be set if it occurs after the first broadcast:

1. A backup takes over as master.
2. A master switches to slave mode because it is stale.
3. A backup slave switches to non-backup slave because it is stale, because a parity error occurred on the incoming broadcast, or because the link is down.

Auto Tracking of Bad Paths

Retry Algorithm

There are 3 basic reasons why a message times out and should be retried:

1. The sent packet never makes it to the destination;
2. The sent packet makes it to its destination but the destination cannot handle it; and
3. The packet makes it to its destination and the destination responds but the echo doesn't make it back.

Two of these problems are dependent on the path (route) traveled and is often corrected by changing paths. When the first time-out occurs, in order to resend this message, the protocol macro is notified with a tag and reason code. The entry that has timed-out remains at the head of the list. This means that no other entries can time-out regardless of their time stamp since they won't be checked. Other entries can be retired as echoes continue to come in by removing them from the linked list which is maintained in an array in Transport Macro 205. Other entries for this path can't be retired since their echoes (if they come) are out of order because of the missing one that timed-out. Entries for other paths can be added but it is recommended that this not be done and it is not expected that it is done.

The protocol macro reissues this packet, marking it as a resend. The Transport Macro then realizes that the retry entry for this packet is at the head of the list and simply reuses it by updating its time stamp. The packet is resent using the same sequence number and retry index by retrieving this information from the retry entry. It is sent along the same path for a second time in order to determine if the path has a hard failure. The head of the list is checked again and if it times out again the Transport Macro notifies the IPC a second time. When the protocol macro resends again, the Transport Macro's request to the path table also requests the path be changed. Again the entry in the retry table is reused and the time stamp refreshed. This continues until either the packet is successfully sent such that an echo retires this retry entry, or when attempting to send, the path table responds by indicating there are no more paths to try for the second time resulting in a connection failure (see above).

In the case where the resend is eventually successful and the retry entry is cleared the next oldest, entry appears. This entry will most likely instantly time-out and require a resend also. The same process as above starts again except that this time (hopefully) the current path works on the first try. If this one is successful, then the next oldest pops up and is dealt with in the same manner. This process has "serialized" the recovery to this "broken" destination. This is slower than what would otherwise occur if the original problem where a temporary, one-shot glitch, but if the problem is more severe then this method prevents resending extra traffic that is destined to fail.

Because the protocol macro knows when a retry is in progress, it is the case that it won't request the sending of any new packets to this destination. Packets to other targets can continue to flow. If new packets are sent to the recovering target while recovery is still in progress, they may happen upon a current path that is now working. In this case they die with an out-of-order sequence number at the receiver.

In the case where no paths have been successful and the path table responds with a no_path error, the retry entry is purged from the table and the protocol macro is notified that the packet didn't make it and that it is not worth trying again. The notification is a reason code of "no paths available"

meaning "connection failure." The sequence number for this target ID in the send seq#table is reset to a value of "FF" (hexadecimal). As in the other case, the next oldest entry now rises to the top and also meets with the path error response. The protocol macro is again notified in the same way.

If the protocol macro decides to try this target ID again, the FTM uses the "FF" sequence number which indicates that the send processor needs to "sync" this destination so that it holds up any subsequent send requests until the synchronization operation is successful. If the sync packet should time out, the send processor may need to purge any pending send requests in the send buffer in order to get a resend for the sync packet through. When the send buffer is purged (dropped until the next resend) a response is returned to the protocol macro for each aborted packet indicating a "fail to send" error code.

NOTE: Most of this function is provided in SEND processing logic. The retry logic simply supports the send logic's operations for resending and synching packets.

Formatter

Figure 47:
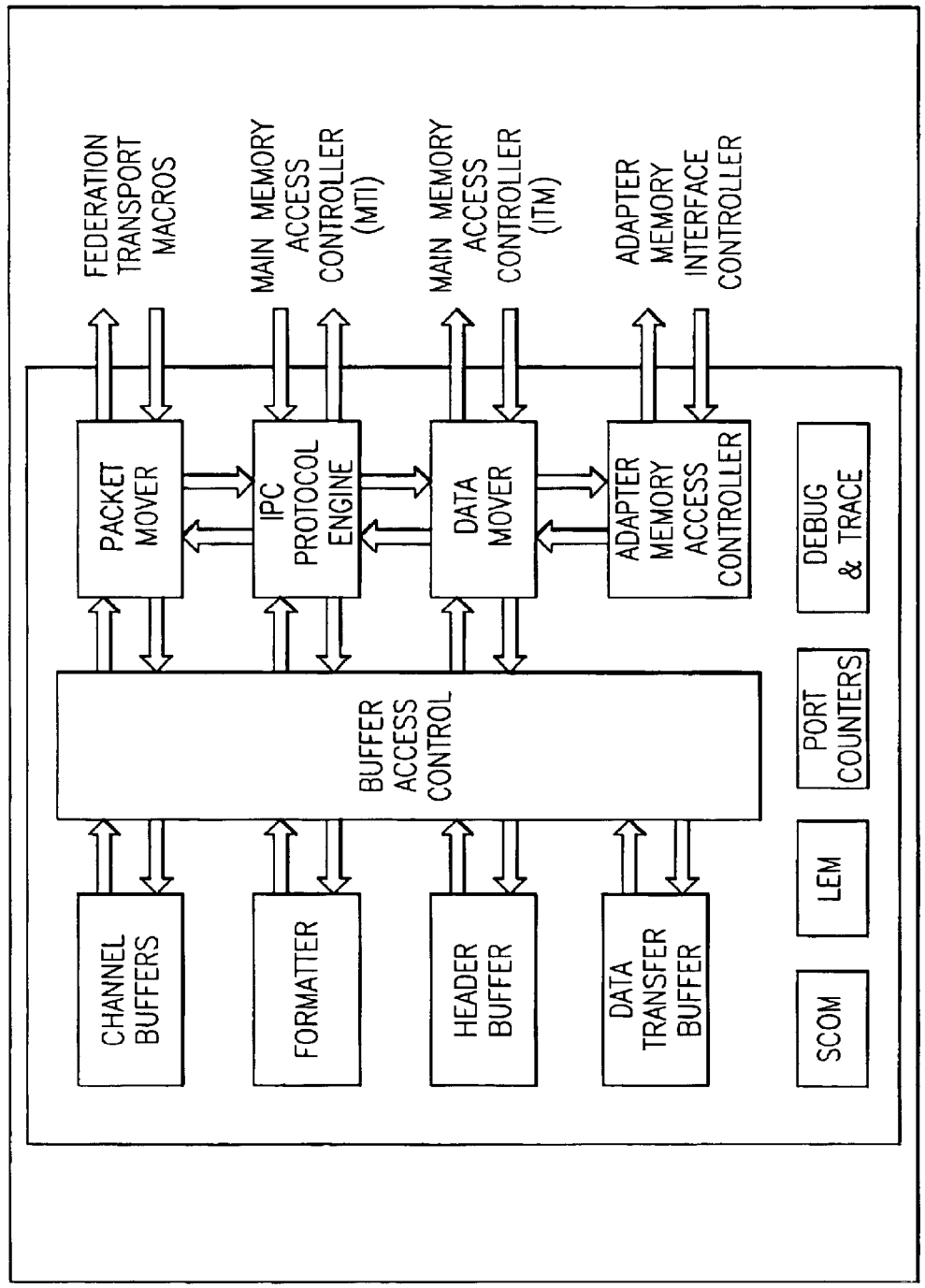
FIG. 47 is a block diagram illustrating interactions between and among various components of communications adapters of the present invention from a different perspective than that shown in FIG. 45.
Figure 48:
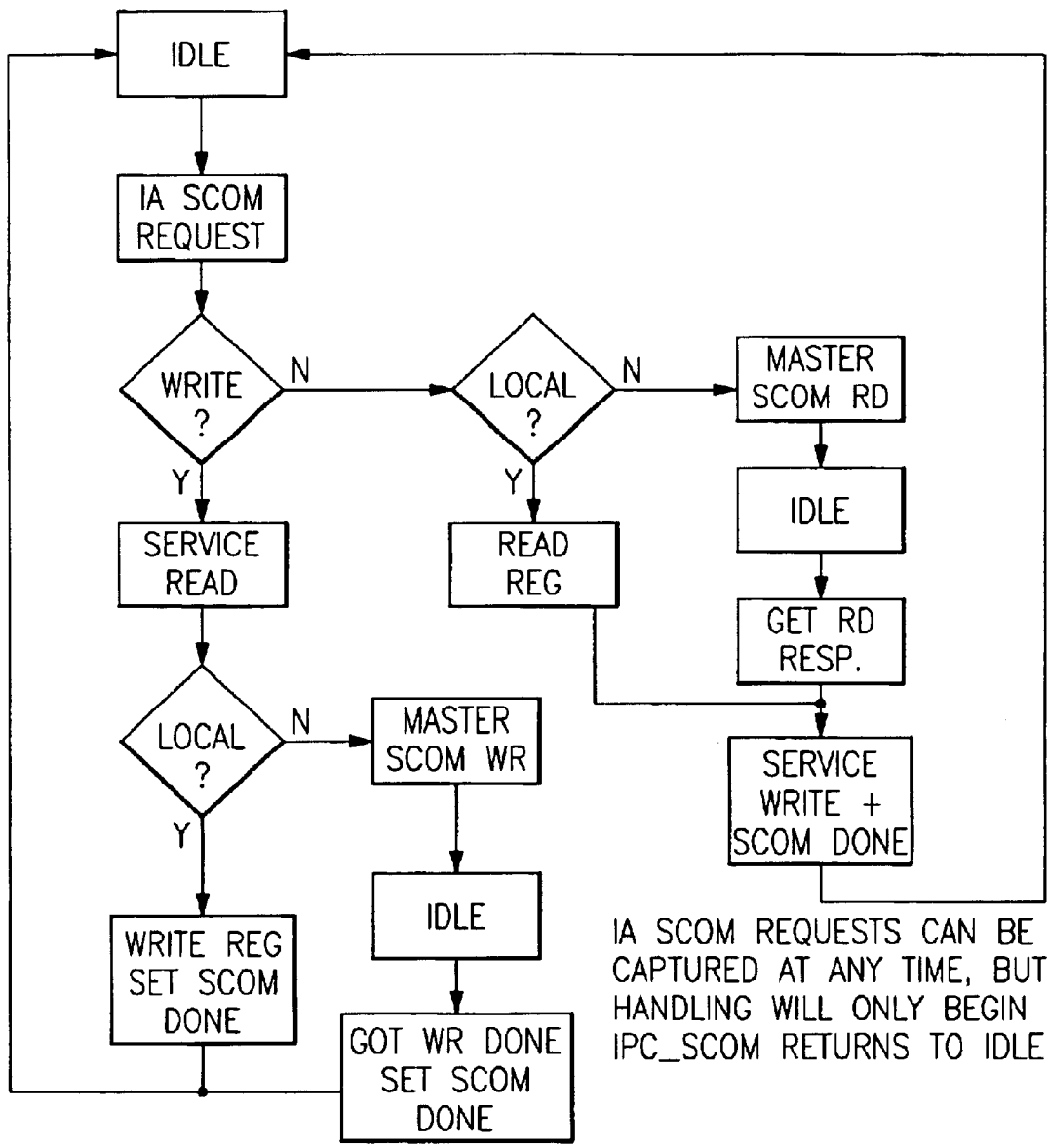
FIG. 48 is a flow chart illustrating the handling of data present on the Scan COMmunication ring (SCOM ring) used to link various portions of the communications adapter and for external communication to a service processor as well.

The Formatter unit is a hardware accelerator see FIG. 47 for the rapid formation of packet headers and completion messages. It performs high throughput modification and nibble level merging of bytes from various source buffers and arrays (a nibble is half of a byte). The formatter is a programmable engine slave device, which executes formatter scripts that are held in a script ram within the formatter unit Sequencer firmware. Formatter scripts cooperate to construct packet headers and completion messages. To do this, a sequencer pipelines one or more formatter commands to the formatter unit, each of which specifies a sequence of scripts to execute.

Figure 44:
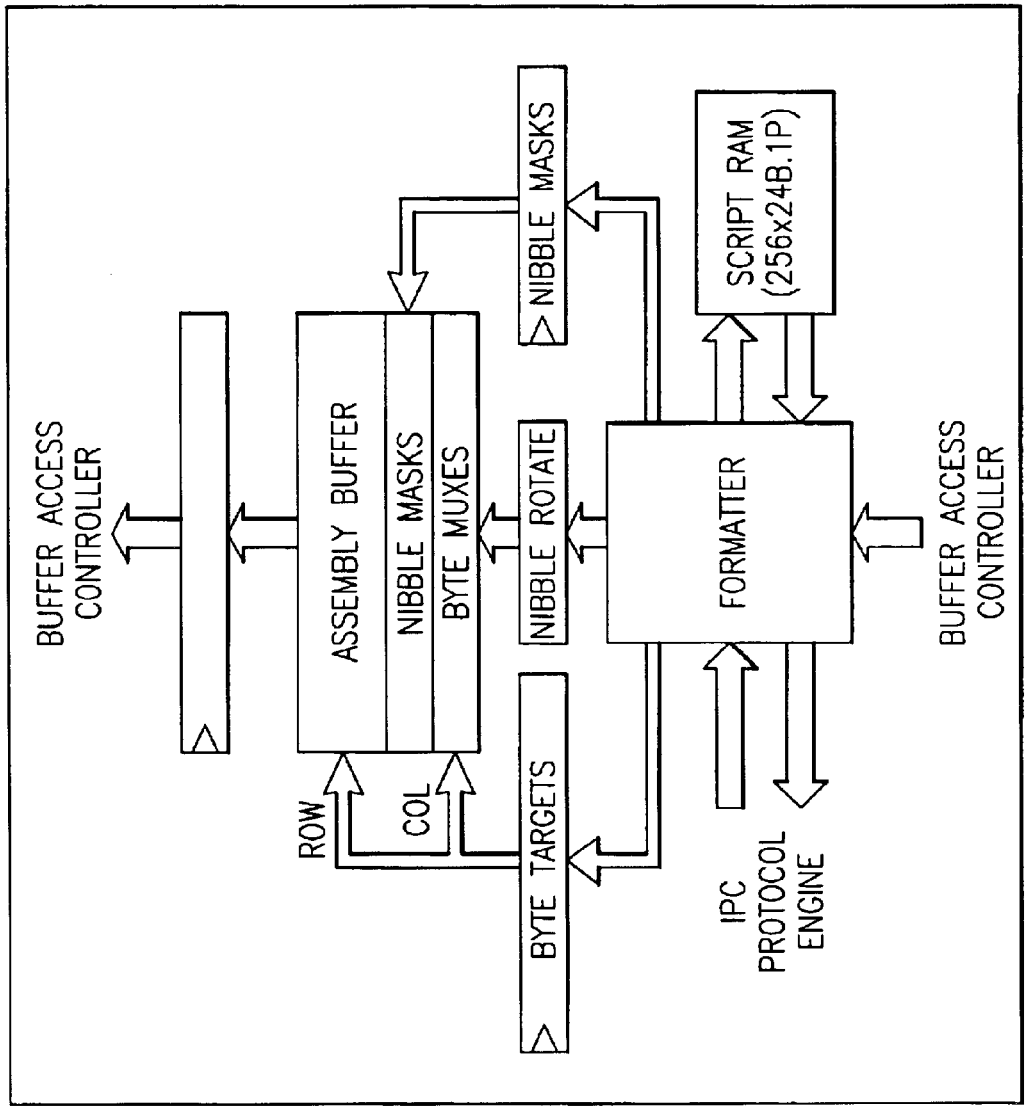
FIG. 44 is block diagram of a packet heading formatter employed within the communications adapters of the present invention.
Figure 45:
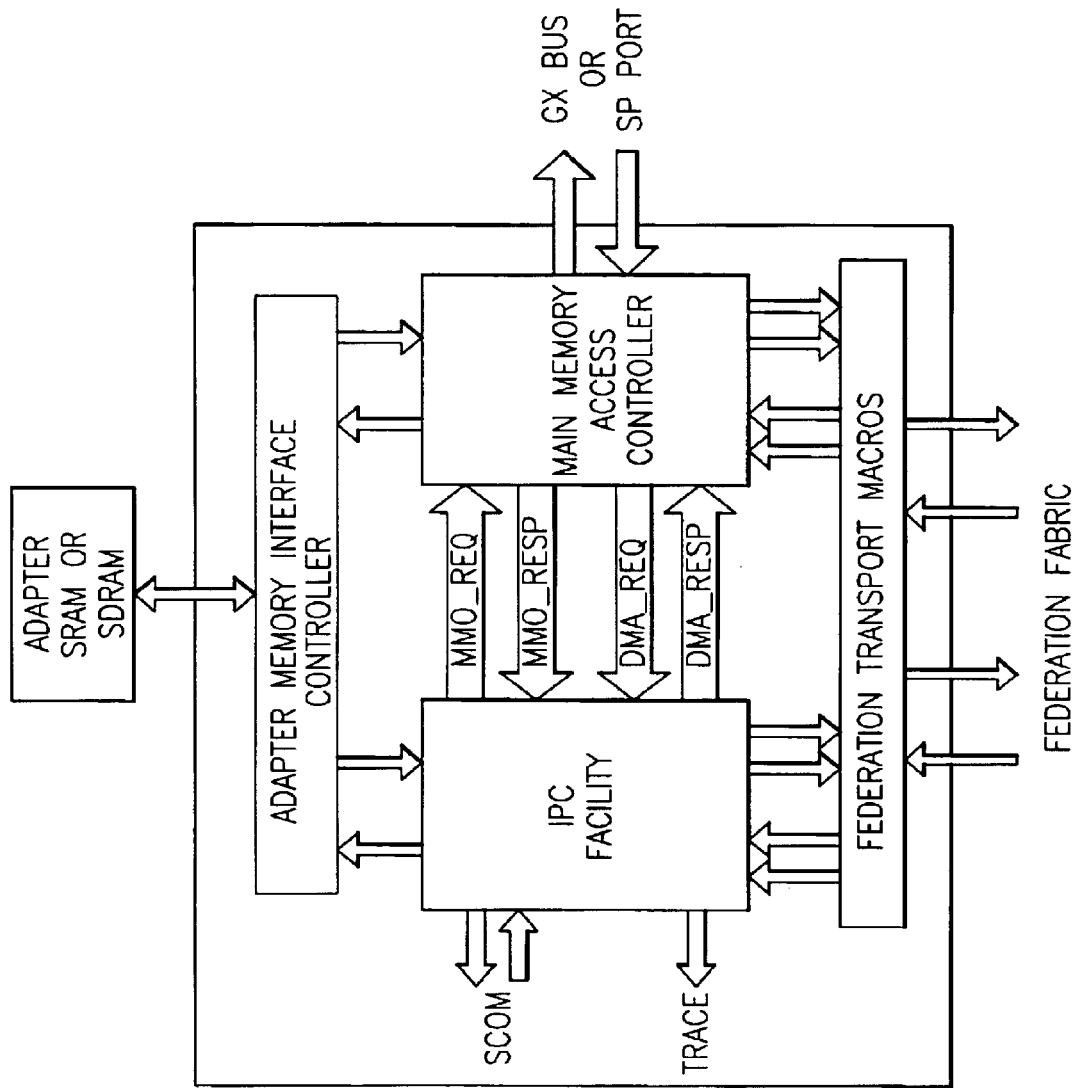
FIG. 45 is a block diagram illustrating interactions between and among various components of communications adapters of the present invention.
Figure 46:
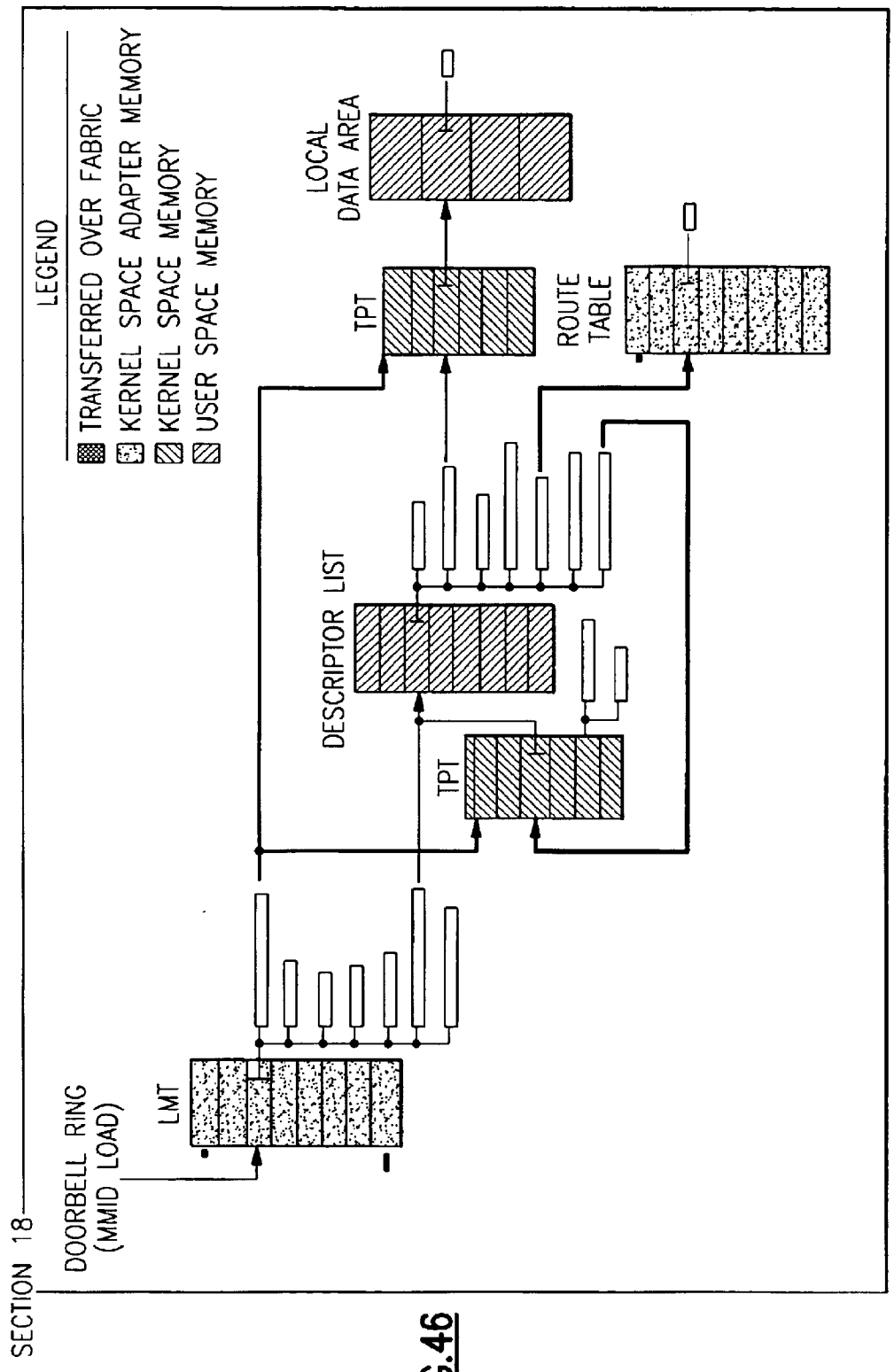
FIG. 46 is a block diagram illustrating relations and interactions employed between and among lists, tables and parameters employed to effectuate the zero copy transfer of the present invention.

The formatter unit is fully pipelined and executes one script per cycle (when there are no buffer access conflicts). Each script operates on an 8 or 16 byte chunk of some source buffer or array. When a command is received, the formatter starts fetching consecutive scripts and chunks from the source buffer. As each script and buffer section reach the head of the formatter pipeline, the source buffer bytes are scattered and merged into 16 different byte locations within a 128 byte assembly buffer within the formatter. A nibble mask is specified in formatter scripts for each of the 16 possible source bytes. Furthermore, the entire source can be rotated left by one nibble before the mask and merge. Thus, each source byte is merged into the assembly buffer byte target on a nibble basis (that is, upper nibble only, lower nibble only, both or neither). The internal organization of the formatter is shown in FIG. 44.

The assembly buffer is composed of eight rows of sixteen byte registers that can be written nibble wise. Formatter scripts specify assembly buffer locations as a row and column byte target, as shown in Table 35 below.

TABLE 35

(Formatter Script)

| Bits | Size | Name | Description |
|---|---|---|---|
| 0:2 | 3 | Source | 000 = channel buffer 0 |
| | | | 001 = channel buffer 1 |
| | | | 010 = header buffer |
| | | | 011 = eserved |
| | | | 100 = task register low file |
| | | | 101 = global register low file |
| | | | 110 = global register high file |
| | | | 111 = global parameter ram |

TABLE 35-continued (Formatter Script)

| Bits | Size | Name | Description |
|---|---|---|---|
| 3 | 1 | Chunk Size | 0 = eight bytes<br>1 = sixteen bytes |
| 4:7 | 4 | rsvd | Reserved |
| 8:15 | 8 | Source Offset | Source Offset in 8 byte units |
| 16:31 | 16 | Nibble Rotate | Rotate corresponding byte left by one nibble |
| 32:63 | 32 | Nibble Masks | Nibble Masks [16][2] |
| 64:191 | 128 | Byte Targets | Assembly Buffer Targets [16][8]<br>Target bits 6:4 = Assembly Buffer Row<br>Target bits 3:0 = Assembly Buffer Column |

Each assembly buffer target is written independently in any given cycle. The Nibble Masks provide a means of specifying which halves of the target byte are to be modified (or if the target byte should be modified at all). A script specifies the source of the data to be operated on by the script, the size of the chunk to be fetched from the source, and if any of the source bytes should be rotated left by one nibble before scattering and merging it into the assembly buffer. When a nibble rotate bit is set, the upper and lower halves of the source byte are swapped. When the source is a header or channel buffer, the chunk size is 16 bytes and the source offset is on a 16 byte boundary. For other sources the chunk size and source offset can be either 8 or 16 bytes. In any case, the first eight bytes from the source are always aligned to the upper half of the formatter pipeline. Furthermore, a formatter script always operates on a full 16 bytes regardless of the source chunk size. Hence, for 8 byte chunks, the lower 8 nibble masks should be zero.

Formatter command syntax is shown in Table 36 below. A formatter command specifies a starting script index and the number of scripts to execute. Header and Channel buffer sources and destinations are specified in two parts. The buffer to be used is specified in the script. The buffer slot is specified in the command (and applies to all the scripts associated with that command). CB Handle (that is, the Channel Buffer Handle) specifies a 256 byte offset from the base of the channel buffer (that is, channel buffer slot). HDB Handle (that is, the Header Buffer Handle) specifies a 128 byte offset from the base of the header buffer (that is, header buffer slot). When the task register file is specified as a source in a script, the register file window (64 bytes) associated with the Task ID in the command is accessed.

Typical usage of the formatter starts with a sequencer issuing a sequence of formatter commands that gather bytes from various sources, and merges them nibble wise into the assembly buffer. While the formatter is performing this task, the sequencer generates the synthesized header or completion message components in its register files. When it is finished, it issues one last formatter command that merges the synthesized components into the assembly buffer and then writes the assembly buffer contents to a destination buffer (that is, to a header or channel buffer).

TABLE 36

(Formatter Command)

| Bits | Size | Name | Description |
|---|---|---|---|
| 0:7 | 8 | BT Handle<br>CB Handle | Source Header Buffer Handle for block transfers |

TABLE 36-continued (Formatter Command)

| Bits | Size | Name | Description |
|---|---|---|---|
| 8:15 | 8 | Task ID | IPE Task ID |
| 16:23 | 8 | CB Handle | Source or Destination Channel Buffer Handle |
| 24:31 | 8 | HDB Handle | Source or Destination Header Buffer Handle |
| 32:33 | 2 | Destination | 00 = channel buffer 0<br>01 = channel buffer 1<br>10 = header buffer<br>11 = no transfer |
| 34:37 | 4 | Xfer Size | Length of transfer from the assembly buffer to the Destination buffer (in 8 byte units, 0 = 16). |
| 38 | 1 | Header Block Transfer | 0 = normal formatter command<br>1 = transferXferSizefromassembly . . . buffer or BT Handle to HDB Handle |
| 39 | 1 | Clear Assembly Buffer | 0 = don't clear assembly buffer<br>1 = clear assembly buffer |
| 40:47 | 8 | Destination Offset | Offset in destination buffer slot in 8 byte units |
| 48:55 | 8 | Script Index | Starting Script Buffer Index |
| 56:63 | 8 | Script Len | Number of Consecutive Scripts to Execute |

Figure 50:
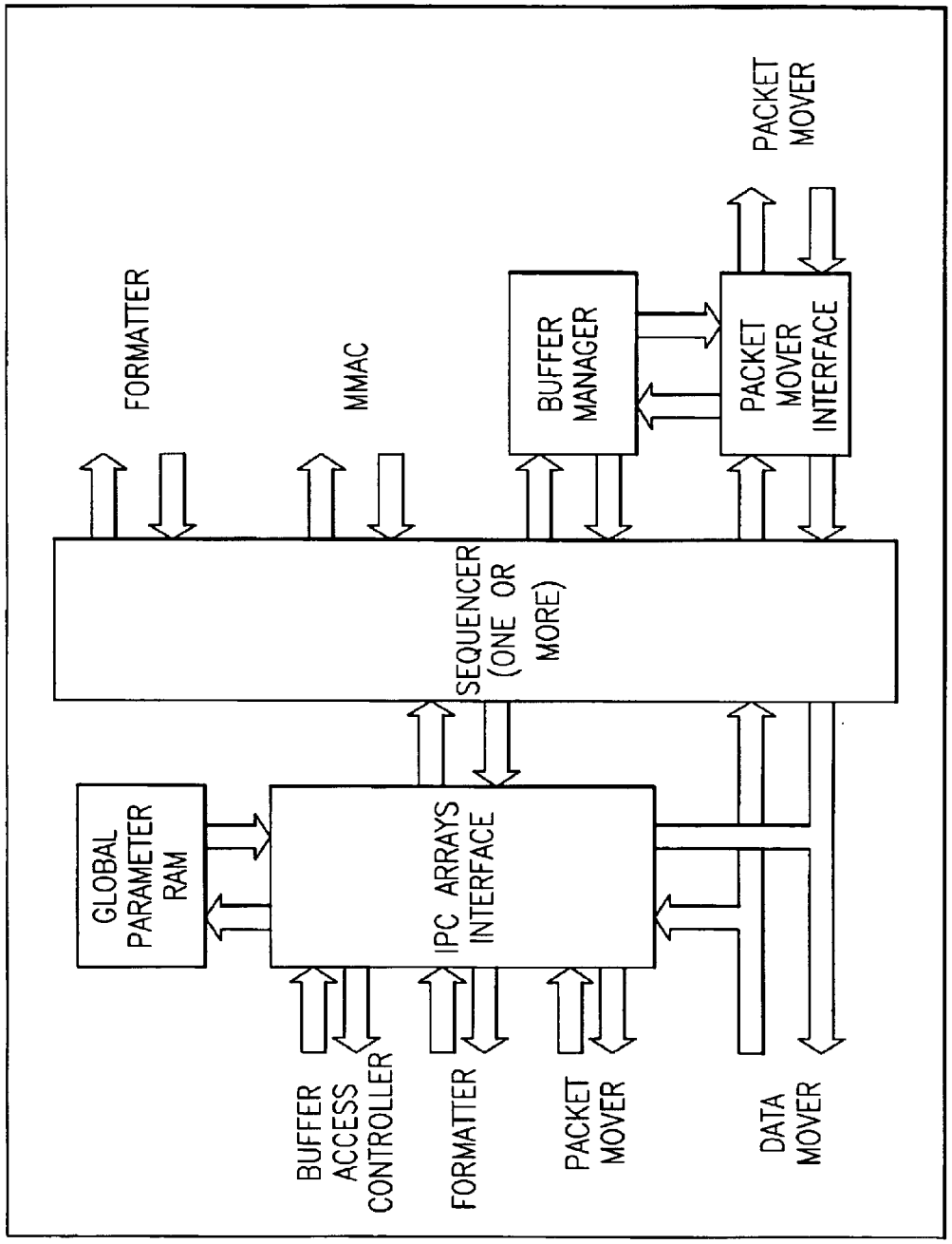
FIG. 50 is a block diagram of the IPC (InterPartition Communication facility) Protocol Engine (IPE).

The format of read requests the formatter issues to the IPE is shown in Table 36 Each request is for a single eight byte quantity, aligned on an eight byte boundary. The IPE queues up to eight requests, to facilitate pipelining and to smooth out accesses when there is contention. Address generation is illustrated in the IPC Arrays Interface section. See FIG. 50. Note that the sequencer global register files are accessible by the formatter. However, before a newly dispatched task updates them (or the part of them that firmware policy sets aside for this purpose) it verifies that the formatter has finished reading the contents, by checking the extended condition code provided for this purpose.

Except for the last command in a sequence, firmware can generate a formatter command (that doesn't push the assembly buffer out to a destination buffer) in one 32-bit immediate instruction. Sequencer hardware inserts the Task ID, CB Handle, and HDB Handle into the command. To push the assembly buffer out to a specified destination, firmware specifies a destination offset (the offset from the base of the destination buffer or buffer slot), the transfer size. Any part of the assembly buffer is written out in eight byte units. Firmware also specifies whether or not the assembly buffer is cleared (that is, set to all zero's) before processing a command.

Formatting is done on behalf of one sequencer task at a time. However, formatter hardware does assist in the synchronization required between tasks. Firmware is only required to check for formatter request queue free space and to verify that the formatter is done reading the part of the global register file(s) the formatter is accessing. Furthermore, the last formatter command issued before a task suspends itself invokes a write back of the assembly buffer. Hence the formatter processes all the scripts for one task in a group, potentially pipelining the groups back to back.

The formatter provides synchronization support in two areas. First, it stalls the pipeline when necessary, for the number of cycles required to avoid assembly buffer overrun (by commands from another sequencer). Secondly, it drives the id of the task that issued the currently pending commands on the response output associated with the sequencer that issued those commands (and an inactive code of 0xFF when idle). The packet mover and data mover stall requests with the same task id as the pending commands in the formatter. Since firmware interlocks on the formatter such that only commands from one task per sequencer are ever pending in the formatter at a time, active response outputs are always guaranteed to correspond to those tasks. Note that in a multi-sequencer implementation, separate request and response ports are provided for each sequencer. The packet mover or data mover then block request queues that match the task id on the corresponding response port.

When the formatter receives the first formatter command in a sequence of commands, it initiates processing in a three-stage pipeline: script fetch, source fetch, execute. In the execute stage the sixteen source buffer bytes are rotated and then aligned to the assembly buffer column target specified in the formatter script. Then the row targets, nibble masks, and aligned source buffer bytes are broadcast to all eight rows of the assembly buffer. Each byte target in each row contains a row target comparator and nibble mask gate. If the row target matches, the nibbles passed by the nibble gates are written to the target byte.

The formatter also supports a Header Block Transfer operation. When this operation is specified, the formatter checks to see if no scripts were executed since the last time the assembly buffer was pushed out and if the header buffer/slot to which it was pushed was the same as that indicated in BT Handle. If so, the assembly buffer is pushed out to header buffer slot specified in HDB Handle, and no scripts are fetched or processed. If not, the formatter command is executed normally, with the exception that the BT Handle is used as the source HDB Handle. Note that block transfer requests assume that Destination Offset is zero.

The formatter pipeline runs without bubbles as long as there is no contention reading the source buffers. The IPE path is only half the width of the path to the channel and header buffers. Hence, the formatter pipeline only runs at half speed when the source buffer is in the IPE. There is an 8×16 byte read data queue on the IPE read data port which is used to assemble the eight byte chunks fetched from the IPE into the 16 byte input units the formatter pipeline expects. The pipeline also stalls during the time that the assembly buffer is being written out to the destination buffer. The formatter controller minimizes pipeline stalls by initiating script and source buffer fetches prior to the entire assembly buffer being written to the destination buffer. The formatter script ram can be read or written by host software (or service processor) through the service port. Single eight byte transfers are supported.

Microcode Sequencing of Packets

In another aspect of the present invention, microcode is uses the descriptor sequence number, the data sequence number and a pull sequence number to ensure the in-order delivery of data packets.

When a Target of Pull descriptor is read, the microcode sends a Remote Start Packet to the other side in order to initiate the transfer. In this packet, the microcode sets a Pull Sequence Number. The microcode on the target side then accepts no packets that do not have a pull sequence that matches this value until this descriptor is complete.

On the remote (source) side, upon receiving the Remote Start Packet, the microcode there starts sending data from the Source of Pull descriptor. It keeps sending data until it has sent all of the data that was requested by the Remote Start Packet. This typically involves multiple Source of Pull descriptors due to the way that it is used as a "gather" mechanism by the protocol. Each packet includes several sequence numbers and flags. The Pull Sequence Number should match that of the Remote Start. The Descriptor Sequence Number is a monotonically increasing counter that increments whenever a new descriptor is used. The Data Sequence Number is a monotonically increasing counter that starts at zero at the start of each descriptor. And finally, there is a set of flags that indicate the first and/or last packet of a descriptor.

Back on the target side, as the data packets arrive, they are checked for the first packet flag, a Pull Sequence Number that matches the one expected, and for a Data Sequence Number of zero. If a packet does not match these conditions, then the packet is discarded. Once a packet is received for this channel that meets these conditions, the Descriptor Sequence Number of that packet is saved and the data transfer is assumed to have begun. Each subsequent packet received is checked for Pull Sequence Number, descriptor sequence matching expected (the expected value is incremented when a "last" flag is seen), data sequence matching expected (the expected value is incremented for each packet, but is zeroed when the "last" flag is set), and the flags are checked as per above. The transfer completes when the target receives the amount of data that is expected.

Service Processor

Figure 49:
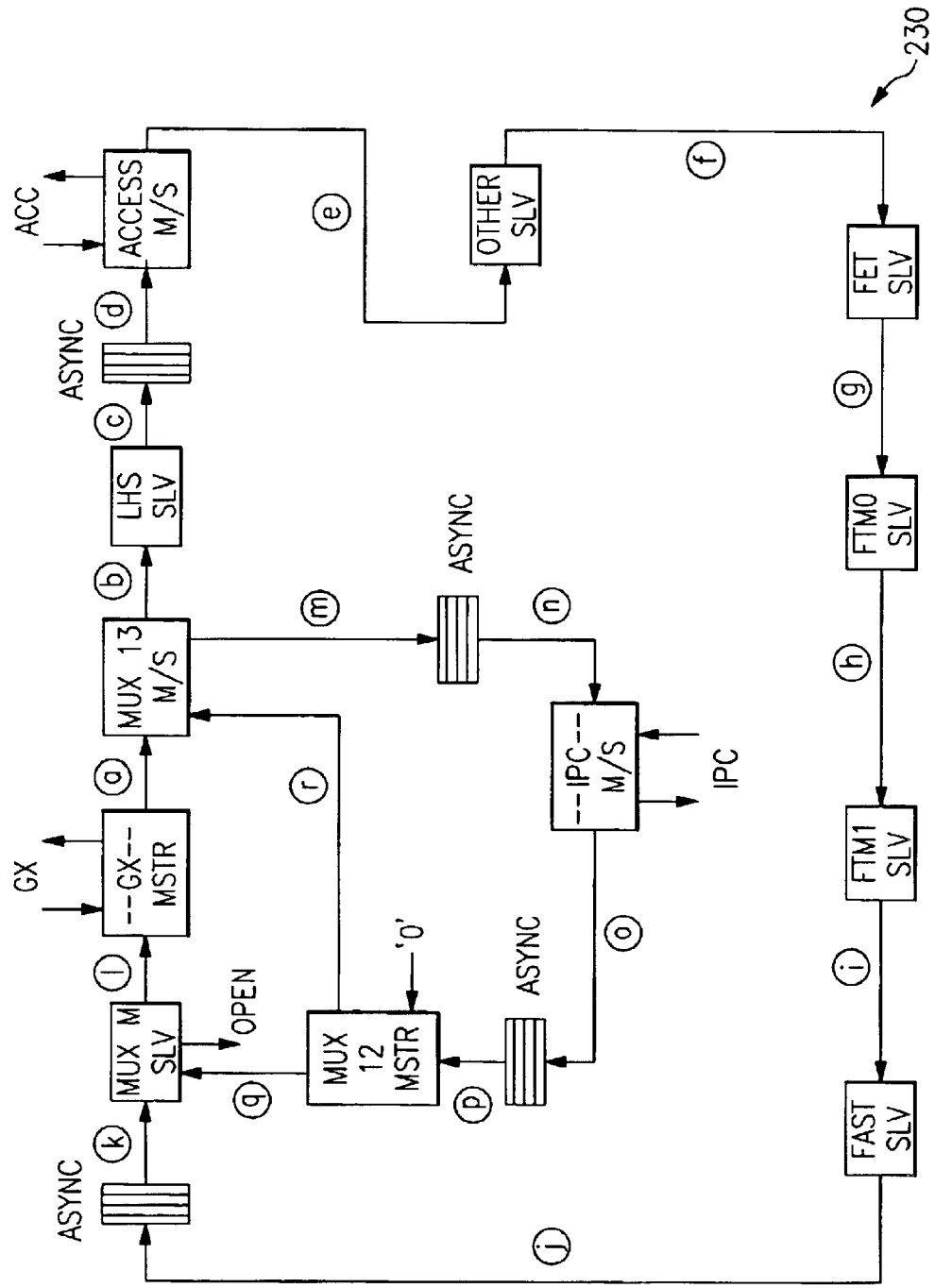
FIG. 49 is a block diagram of the SCOM ring referred to in the description above for FIG. 48.

In various aspects of the description above reference is made to the service processor. The service processor is a processor that provides various hardware functions to one or more other processors. The service processor runs commands from its own memory and provides services to a set of other processors (nodes). These services typically include manufacturer specific items such as power-on, boot up services, and hardware initialization services such as insuring that certain registers and latches are set to zero or to other desired values during node start up. As it pertains to the present invention the service processor is the interface for handling specified error conditions, typically of the hardware variety. The service processor is connected to the adapter via the ACC port in the SCOM ring 230 as shown in FIG. 49. In FIG. 49, the term GX refers to the processor bus. See also FIG. 38.

Throughout this specification, various parameters have been indicated representing currently preferred embodiments of the present invention. These indications should not in any way be construed as limitations or restrictions with respect to the claims herein. They are simply the currently best perceived mode of practicing the claimed invention. It is also noted that the present specification provides a detailed description of the present invention and also includes descriptions of related inventions with which the claimed invention are designed to work. These other inventions should also not be construed as limitations on the claimed invention, particularly in terms of the environment in which the invention operates.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for synchronizing time of day information between one communication adapters and at least one other communication adapter, said method comprising the steps of:

designating said one adapter as a master;

periodically broadcasting current time of day information from said master adapter to said at least one other adapter;

determining, from said time of day information, at said at least one other communication adapter, the number of time of day broadcasts that have been missed; and determining, from said number, whether or not drift correction is to be requested.

* * * * *